(12) United States Patent
Naito et al.

(10) Patent No.: US 11,043,125 B2
(45) Date of Patent: Jun. 22, 2021

(54) INFORMATION PROCESSING DEVICE AND RECORDING MEDIUM

(71) Applicant: Panasonic Intellectual Property Corporation of America, Torrance, CA (US)

(72) Inventors: Eiichi Naito, Kyoto (JP); Takenobu Aoshima, Osaka (JP); Shunsuke Kuhara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 249 days.

(21) Appl. No.: 16/285,933

(22) Filed: Feb. 26, 2019

(65) Prior Publication Data

US 2019/0272756 A1 Sep. 5, 2019

(30) Foreign Application Priority Data

Mar. 2, 2018 (JP) .............................. JP2018-037332
Oct. 11, 2018 (JP) .............................. JP2018-192524

(51) Int. Cl.
- *G08G 1/09* (2006.01)
- *G08G 1/16* (2006.01)
- *B60L 3/00* (2019.01)

(52) U.S. Cl.
CPC ............ *G08G 1/163* (2013.01); *B60L 3/0015* (2013.01); *G08G 1/091* (2013.01); *G08G 1/166* (2013.01)

(58) Field of Classification Search
CPC ........ G08G 1/163; G08G 1/091; G08G 1/166; G08G 1/161; G08G 1/16; G08G 1/09; G08G 1/00; B60L 3/0015; B60L 3/0007

USPC ........................................................ 701/301
See application file for complete search history.

(56) References Cited

U.S. PATENT DOCUMENTS

| 6,292,725 | B1 * | 9/2001 | Kageyama | ........... G05D 1/0297 701/23 |
| 2008/0133136 | A1 * | 6/2008 | Breed | ................... B60W 50/00 701/301 |
| 2011/0118900 | A1 * | 5/2011 | Uchida | ................ G05D 1/0297 701/2 |

(Continued)

FOREIGN PATENT DOCUMENTS

JP 2010-3157 1/2010

OTHER PUBLICATIONS

Extended European Search Report dated Jun. 28, 2019 in corresponding European Patent Application No. 19158419.2.

*Primary Examiner* — Thomas G Black
*Assistant Examiner* — Matthias S Weisfeld
(74) *Attorney, Agent, or Firm* — Wenderoth, Lind & Ponack, L.L.P.

(57) ABSTRACT

An information processing device in a first vehicle: detects a head-on approach of a second vehicle relative to the first vehicle; determines whether a meeting point is in a first section; calculates a first distance between the first section and the meeting point; when the meeting point is not in the first section, transmits the first distance to the second vehicle, and receives, from the second vehicle, a second distance between the meeting point and a second section; generates travel control information for the first vehicle according to the result of comparison between the first distance and the second distance; and outputs the travel control information to a travel controller of the first vehicle.

11 Claims, 36 Drawing Sheets

(56) References Cited

U.S. PATENT DOCUMENTS

| | | | |
|---|---|---|---|
| 2015/0148985 A1* | 5/2015 | Jo | G08G 1/163 |
| | | | 701/1 |
| 2015/0274173 A1 | 10/2015 | Ando | |
| 2017/0169709 A1* | 6/2017 | Ando | G08G 1/161 |
| 2017/0301238 A1* | 10/2017 | Brandriff | B60R 1/00 |
| 2018/0113477 A1* | 4/2018 | Rodriguez | G05D 1/0061 |

* cited by examiner

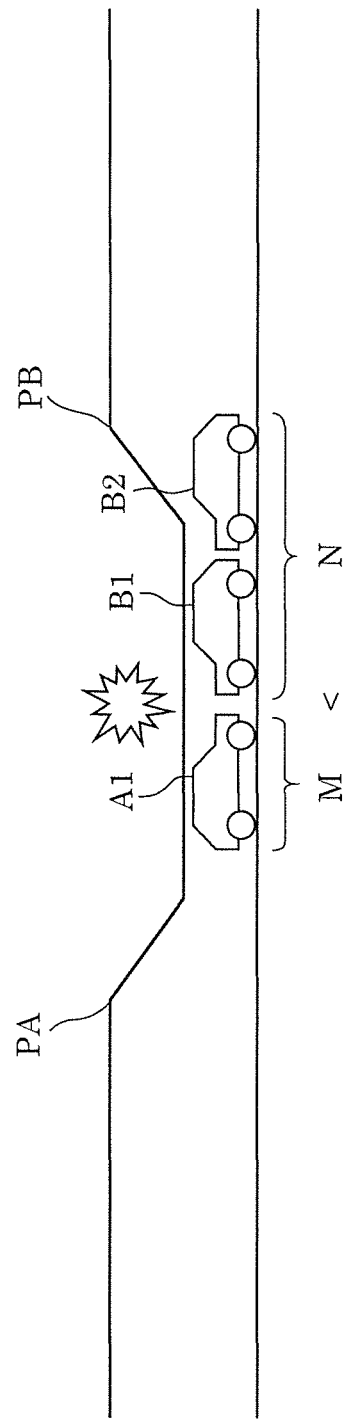
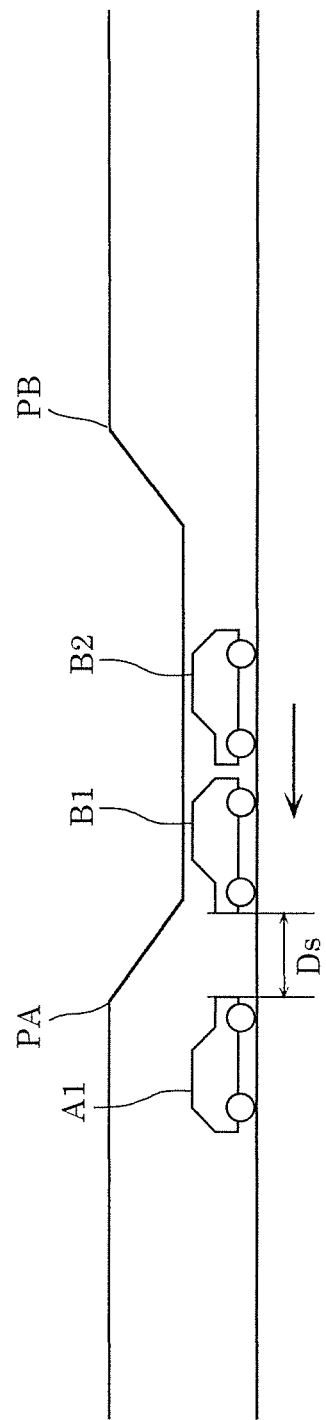

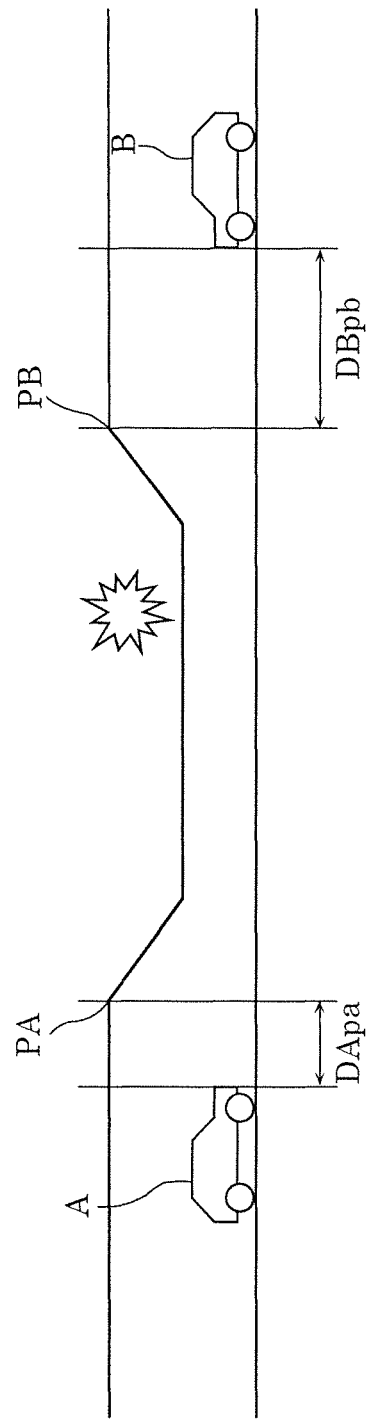
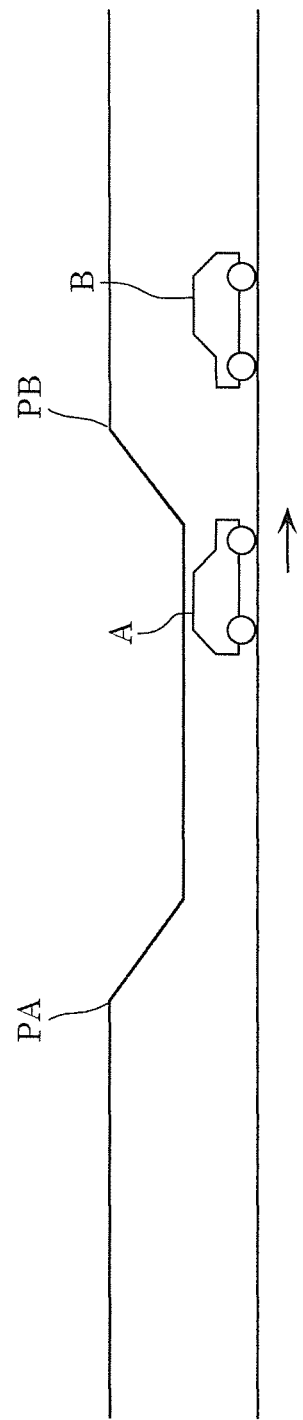

FIG. 24

| | DISPLAY EXAMPLE ON DISPLAY DEVICE | |
|---|---|---|
| | FRONT DISPLAY DEVICE | REAR DISPLAY DEVICE |
| CASE WHERE REVERSING DISTANCE OF ANOTHER VEHICLE CAN BE ESTIMATED<br><br>VEHICLE A REVERSING | THIS VEHICLE WILL REVERSE. PLEASE ADVANCE. | THIS VEHICLE WILL REVERSE. PLEASE REVERSE. |
| CASE WHERE REVERSING DISTANCE OF ANOTHER VEHICLE CAN BE ESTIMATED<br><br>VEHICLE A ADVANCING | THIS VEHICLE WILL ADVANCE. PLEASE REVERSE. | THIS VEHICLE WILL ADVANCE. PLEASE FOLLOW. |
| CASE WHERE REVERSING DISTANCE OF ANOTHER VEHICLE CANNOT BE ESTIMATED | REVERSING 50 METERS IS REQUIRED FOR THIS VEHICLE TO REACH MEETING AND PASSING SPOT. PLEASE DECIDE WHETHER TO ADVANCE OR REVERSE. | |

FIG. 25

| | DISPLAY EXAMPLE ON DISPLAY DEVICE | |
|---|---|---|
| | FRONT DISPLAY DEVICE | REAR DISPLAY DEVICE |
| CASE WHERE REVERSING DISTANCE OF ANOTHER VEHICLE CAN BE ESTIMATED<br><br>VEHICLE A REVERSING | ONCOMING VEHICLE WILL REVERSE. PLEASE ADVANCE. | LEADING VEHICLE WILL REVERSE. PLEASE REVERSE. |
| CASE WHERE REVERSING DISTANCE OF ANOTHER VEHICLE CAN BE ESTIMATED<br><br>VEHICLE A ADVANCING | ONCOMING VEHICLE WILL ADVANCE. PLEASE REVERSE. | LEADING VEHICLE WILL ADVANCE. PLEASE FOLLOW. |
| CASE WHERE REVERSING DISTANCE OF ANOTHER VEHICLE CANNOT BE ESTIMATED | REVERSING 50 METERS IS REQUIRED FOR THIS VEHICLE TO REACH MEETING AND PASSING SPOT. PLEASE DECIDE WHETHER TO ADVANCE OR REVERSE. | |

FIG. 27

| | |
|---|---|
| CASE 1 | ONCOMING VEHICLE IS APPROACHING HEAD-ON. NEED TO SWITCH TO MANUAL DRIVING? [YES] [NO] |
| CASE 2 | ONCOMING VEHICLE IS APPROACHING HEAD-ON; REVERSING DISTANCE OF THIS VEHICLE IS SHORTER. NEED TO SWITCH TO MANUAL DRIVING? [YES] [NO] |
| CASE 3 | ONCOMING VEHICLE IS APPROACHING HEAD-ON; THIS VEHICLE WILL REVERSE. NEED TO SWITCH TO MANUAL DRIVING? [YES] [NO] |

INFORMATION PROCESSING DEVICE AND RECORDING MEDIUM

CROSS REFERENCE TO RELATED APPLICATION

This application claims the benefit of priority of Japanese Patent Application Number 2018-037332 filed on Mar. 2, 2018, and Japanese Patent Application Number 2018-192524 filed on Oct. 11, 2018, the entire content of which is hereby incorporated by reference.

BACKGROUND

1. Technical Field

The present disclosure relates to information processing devices of vehicles and recording mediums.

2. Description of the Related Art

In recent years, studies have been carried out on techniques for assisting the travel of vehicles. For example, Japanese Unexamined Patent Application Publication No. 2010-003157 discloses a driving assistance device which assists the travel of a vehicle passing through a single-track alternate passing section. In this driving assistance device, a head-on approaching vehicle sensor mounted on a vehicle detects a head-on approach between vehicles entering the single-track alternate passing section from an upstream entrance and a downstream entrance. When a head-on approach between two vehicles in a single-track alternate passing section is detected, a head-on approach arbitrator mounted on a moving signal device separate from the vehicle performs head-on approach arbitration on the two vehicles. Specifically, the head-on approach arbitration is performed so that a vehicle that has entered the single-track alternate passing section later or entered the single-track alternate passing section against traffic sign regulations is forced to reverse.

SUMMARY

In the head-on approach arbitration in the driving assistance device disclosed in Japanese Unexamined Patent Application Publication No. 2010-003157, it may take long to resolve the head-on approach, or the vehicle may need to move a great distance; there are cases where it is hardly efficient.

The present disclosure provides an information processing device and a recording medium which efficiently resolve a head-on approach between vehicles.

An information processing device according to an aspect of the present disclosure is provided in a first vehicle and is configured to: detect a head-on approach of a second vehicle relative to the first vehicle; determine whether a meeting point for the first vehicle and the second vehicle is in a first section, on a travel path of the first vehicle and before the meeting point in a direction of travel of the first vehicle, which is wide enough for vehicles to pass each other; calculate a first distance between the first section and the meeting point; when the meeting point is determined as not being in the first section, transmit the first distance to the second vehicle, and receive, from the second vehicle, a second distance between the meeting point and a second section, on a travel path of the second vehicle and before the meeting point in a direction of travel of the second vehicle, which is wide enough for vehicles to pass each other; compare the first distance and the second distance; generate, according to a comparison result, travel control information for causing the first vehicle to advance or reverse; and output the travel control information to a travel controller of the first vehicle.

An information processing device according to another aspect of the present disclosure is provided in a first vehicle and is configured to: detect a head-on approach of a second vehicle relative to the first vehicle; determine whether a meeting point for the first vehicle and the second vehicle is in a first section, on a travel path of the first vehicle and before the meeting point in a direction of travel of the first vehicle, which is wide enough for vehicles to pass each other; calculate the number of vehicles following the first vehicle using information obtained from the vehicles following the first vehicle; communicate with the second vehicle and the vehicles following the first vehicle; when the meeting point is determined as not being in the first section, communicate with the vehicles following the first vehicle, obtain the information from the vehicles following the first vehicle, transmit, to the second vehicle, the number of the vehicles following the first vehicle, and receive, from the second vehicle, the number of vehicles following the second vehicle; compare the number of the vehicles following the first vehicle and the number of the vehicles following the second vehicle; generate, according to a comparison result, travel control information for causing the first vehicle to advance or reverse; and output the travel control information to a travel controller of the first vehicle.

A recording medium according to an aspect of the present disclosure is a non-transitory computer-readable recording medium having a program stored therein for causing a computer to: detect a head-on approach of a second vehicle relative to a first vehicle; determine whether a meeting point for the first vehicle and the second vehicle is in a first section, on a travel path of the first vehicle and before the meeting point in a direction of travel of the first vehicle, which is wide enough for vehicles to pass each other; when the meeting point is not in the first section, calculate a first distance between the first section and the meeting point, output the first distance to the second vehicle, and obtain, from the second vehicle, a second distance between the meeting point and a second section, on a travel path of the second vehicle and before the meeting point in a direction of travel of the second vehicle, which is wide enough for vehicles to pass each other; compare the first distance and the second distance; generate, according to a comparison result, travel control information for causing the first vehicle to advance or reverse; and output the travel control information to a travel controller of the first vehicle.

A recording medium according to an aspect of the present disclosure is a non-transitory computer-readable recording medium having a program stored therein for causing a computer to: detect a head-on approach of a second vehicle relative to a first vehicle; determine whether a meeting point for the first vehicle and the second vehicle is in a first section, on a travel path of the first vehicle and before the meeting point in a direction of travel of the first vehicle, which is wide enough for vehicles to pass each other; when the meeting point is not in the first section, obtain, from vehicles following the first vehicle, information of the vehicles following the first vehicle, calculate, using the information, the number of the vehicles following the first vehicle, output, to the second vehicle, the number of the vehicles following the first vehicle, and obtain, from the second vehicle, the number of vehicles following the second vehicle; compare the number of the vehicles following the first vehicle and the number of the vehicles following the second vehicle; generate, according to a comparison result, travel control information for causing the first vehicle to advance or reverse; and output the travel control information to a travel controller of the first vehicle.

Note that the aforementioned general or specific aspects may be implemented using a system, a device, a method, an integrated circuit, a computer program, or a computer-readable recording medium such as a recording disc, or any combination of systems, devices, methods, integrated circuits, computer programs, or recording media. The computer-readable recording medium includes, for example, a nonvolatile recording medium such as a compact disc read-only memory (CD-ROM).

With the information processing device, etc., according to the present disclosure, it is possible to efficiently resolve a head-on approach between vehicles.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6A is a schematic diagram illustrating one example of a head-on approach between vehicles according to Embodiment 2;

FIG. 6B is a schematic diagram illustrating one example of operations of a vehicle for resolving a head-on approach according to Embodiment 2;

FIG. 20A is a schematic diagram illustrating one example of a situation prior to a head-on approach between vehicles according to Embodiment 6;

FIG. 20B is a schematic diagram illustrating one example of operations of a vehicle for preventing a head-on approach according to Embodiment 6;

FIG. 24 illustrates display examples of a front presentation device and a rear presentation device;

FIG. 25 illustrates display examples on a terminal device of another vehicle;

FIG. 27 illustrates display examples of an input-output device according Variation 1;

DETAILED DESCRIPTION OF THE EMBODIMENTS

Figure 1:
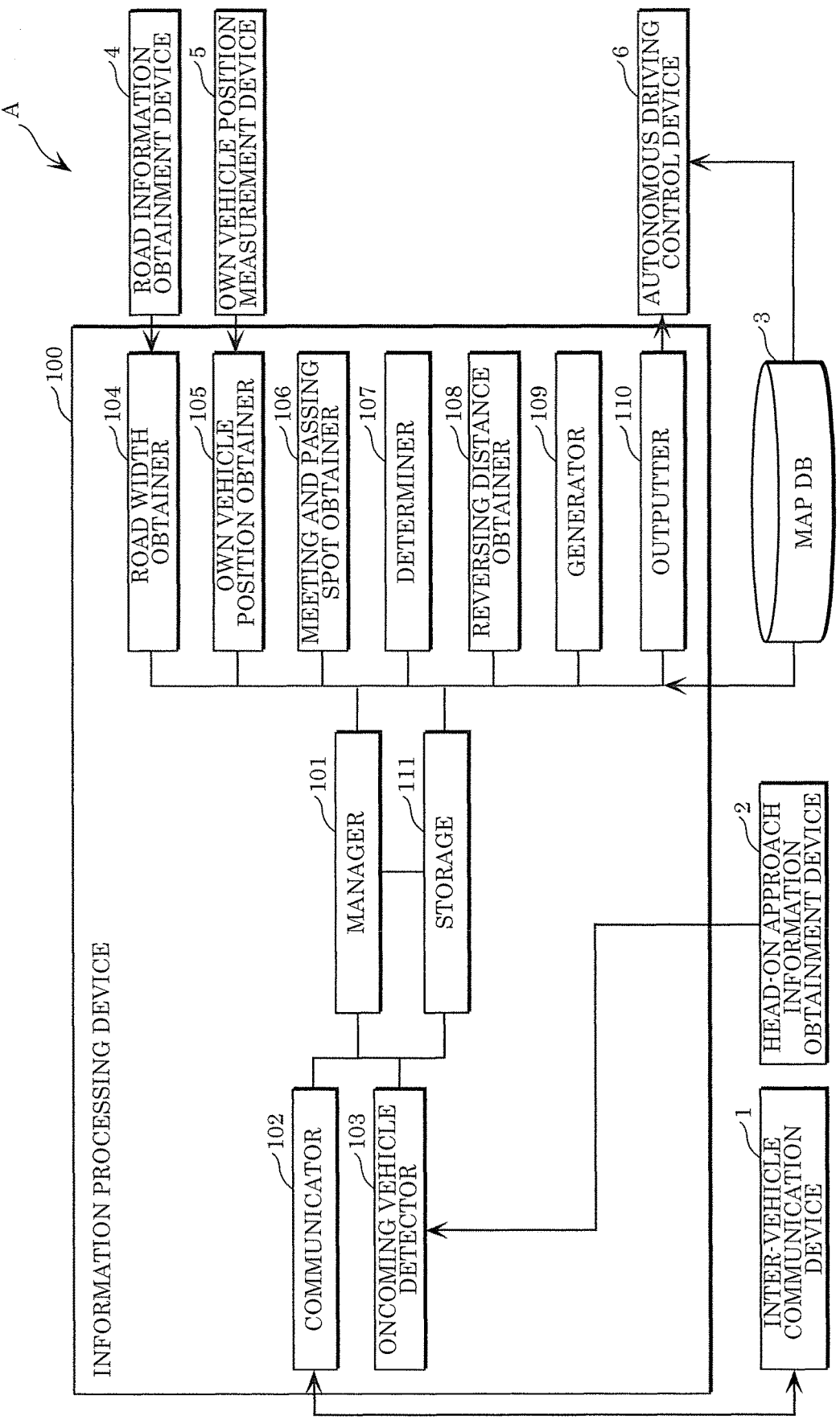
FIG. 1 is a block diagram illustrating one example of a functional configuration of a vehicle including an information processing device according to Embodiment 1.

In recent years, studies have been carried out on techniques for automating the task of driving vehicles such as automobiles which travel on roads. The inventors of the present disclosure have studied the technique for enabling meeting and passing of such vehicles, specifically, autonomous cars, approaching head-on on a narrow road that is difficult for vehicles to meet and pass For example, with the technique disclosed in Japanese Unexamined Patent Application Publication No. 2010-003157 mentioned in the BACKGROUND section, for two vehicles approaching head-on in a single-track alternate passing section which is difficult for vehicles to meet and pass, head-on approach arbitration is performed so that a vehicle that has entered said section later or entered said section against traffic sign regulations at an entrance of said section is forced to reverse. In such head-on approach arbitration, there is a case where a vehicle located a greater distance to an entrance of the single-track alternate passing section is instructed to reverse. In this case, the reversing distance for the vehicle is great, and it takes long before the head-on approach between the vehicles is resolved and the vehicles can finally meet and pass. Furthermore, in the technique disclosed in Japanese Unexamined Patent Application Publication No. 2010-003157, the head-on approach arbitrator is mounted on a moving signal device separate from the vehicle. However, it is hard to place a device that arbitrates a head-on approach everywhere vehicles can approach head-on.

Therefore, the inventors of the present disclosure have invented the technique for a device mounted on a vehicle to efficiently resolve a head-on approach via inter-vehicle communication, as described below.

For example, an information processing device according to the first aspect of the present disclosure is provided in a first vehicle and is configured to: detect a head-on approach of a second vehicle relative to the first vehicle; determine whether a meeting point for the first vehicle and the second vehicle is in a first section, on a travel path of the first vehicle and before the meeting point in a direction of travel of the first vehicle, which is wide enough for vehicles to pass each other; calculate a first distance between the first section and the meeting point; when the meeting point is determined as not being in the first section, transmit the first distance to the second vehicle, and receive, from the second vehicle, a second distance between the meeting point and a second section, on a travel path of the second vehicle and before the meeting point in a direction of travel of the second vehicle, which is wide enough for vehicles to pass each other; compare the first distance and the second distance; generate, according to a comparison result, travel control information for causing the first vehicle to advance or reverse; and output the travel control information to a travel controller of the first vehicle.

According to the above aspect, in the case where two vehicles are approaching head-on in an area other than a section in which vehicles can pass each other (in other words, in the event of a head-on approach), the travel of the first vehicle is controlled according to the distance of each of the two vehicles between the meeting point and the section in which vehicles can pass each other. In this way, unlike the related art, advancing or reversing of each of the vehicles approaching head-on is determined according to an actual distance of movement. With this, the distance a vehicle moves to resolve a head-on approach between vehicles can be optimized. Thus, it is possible to efficiently resolve a head-on approach between vehicles. Furthermore, the control for resolving the head-on approach is simple and easy. Moreover, the head-on approach is resolved via inter-vehicle communication; in the event of a head-on approach, two vehicles are present in an inter-vehicle communication area, and thus the head-on approach can be smoothly resolved.

In the information processing device according to the first aspect of the present disclosure, the information processing device may calculate the number of vehicles following the first vehicle using information obtained from the vehicles following the first vehicle, communicate with the vehicles following the first vehicle, obtain the information from the vehicles following the first vehicle, transmit, to the second vehicle, the number of the vehicles following the first vehicle, receive, from the second vehicle, the number of vehicles following the second vehicle, perform comparison based on the first distance, the number of the vehicles following the first vehicle, the second distance, and the number of the vehicles following the second vehicle, and generate the travel control information according to a comparison result.

According to the above aspect, the travel of the first vehicle is controlled according to not only the distance of movement of a vehicle, but also the number of vehicles that are forced to move. With this, the number of vehicles that are moving to resolve a head-on approach between vehicles can be optimized. In other words, resolving a head-on approach in consideration of the situation of following vehicles becomes possible. Furthermore, since elements that are taken into consideration to resolve a head-on approach increase, increased types of head-on approaches can be efficiently handled.

In the information processing device according to the first aspect of the present disclosure, the information processing device may compare, as the comparison based on the first distance, the number of the vehicles following the first vehicle, the second distance, and the number of the vehicles following the second vehicle, a product of the first distance and the number of the vehicles following the first vehicle and a product of the second distance and the number of the vehicles following the second vehicle, and generate the travel control information according to a comparison result.

According to the above aspect, the travel of the first vehicle is controlled according to the simulated movement amount of a group of vehicles that are forced to move. With this, the amount of movement of vehicles for resolving a head-on approach between vehicles can be optimized to some extent. In other words, resolving a head-on approach in consideration of the distance of movement for resolving a head-on approach and the situation of following vehicles becomes possible. Furthermore, increased types of head-on approaches can be efficiently handled.

In the information processing device according to the first aspect of the present disclosure, the information processing device may calculate a third distance between the first section and each of the vehicles following the first vehicle using the information obtained from the vehicles following the first vehicle, transmit the third distance to the second vehicle, receive, from the second vehicle, a fourth distance between the second section and each of the vehicles following the second vehicle, compare a sum of the first distance and the third distance and a sum of the second distance and the fourth distance; and generate the travel control information according to a comparison result.

According to the above aspect, the travel of the first vehicle is controlled according to the accurate amount of movement of a group of vehicles that are forced to move. With this, the amount of movement of vehicles for resolving a head-on approach between vehicles can be further optimized. In other words, by using the sum of distances, it is possible to efficiently resolve a head-on approach even when the inter-vehicle distance between following vehicles is not uniform. Furthermore, increased types of head-on approaches can be efficiently handled.

Furthermore, an information processing device according to the second aspect of the present disclosure is provided in a first vehicle and is configured to: detect a head-on approach of a second vehicle relative to the first vehicle; determine whether a meeting point for the first vehicle and the second vehicle is in a first section, on a travel path of the first vehicle and before the meeting point in a direction of travel of the first vehicle, which is wide enough for vehicles to pass each other; calculate the number of vehicles following the first vehicle using information obtained from the vehicles following the first vehicle; communicate with the second vehicle and the vehicles following the first vehicle; when the meeting point is determined as not being in the first section, communicate with the vehicles following the first vehicle, obtain the information from the vehicles following the first vehicle, transmit, to the second vehicle, the number of the vehicles following the first vehicle, and receive, from the second vehicle, the number of vehicles following the second vehicle; compare the number of the vehicles following the first vehicle and the number of the vehicles following the second vehicle; generate, according to a comparison result, travel control information for causing the first vehicle to advance or reverse; and output the travel control information to a travel controller of the first vehicle.

According to the above aspect, when two vehicles are approaching head-on in an area other than a section in which vehicles can pass each other, the travel of the first vehicle is controlled according to the number of vehicles following the two vehicles. In this way, unlike the related art, advancing or reversing of each of the vehicles approaching head-on is determined according to the number of vehicles that are to be actually forced to move. With this, the number of vehicles that are forced to move to resolve a head-on approach between vehicles can be optimized. Thus, it is possible to efficiently resolve a head-on approach between vehicles.

In the information processing device according to each of the first and second aspects of the present disclosure, the information processing device may calculate a first distance between the first section and the meeting point, and when the comparison result indicates that the number of the vehicles following the first vehicle and the number of the vehicles following the second vehicle are equal, transmit the first distance to the second vehicle, and receive, from the second vehicle, a second distance between the meeting point and the second section, on the travel path of the second vehicle and before the meeting point in the direction of travel of the second vehicle, which is wide enough for vehicles to pass each other, compare the first distance and the second distance, and generate, according to a comparison result, travel control information for causing the first vehicle to advance or reverse.

According to the above aspect, even when the number of vehicles that are forced to move is equal, advancing or reversing of the first vehicle can be determined.

In the information processing device according to each of the first and second aspects of the present disclosure, the information processing device may calculate a first section length which is a length of the first section, and when the meeting point is determined as not being in the first section, transmit the first section length to the second vehicle, and receive, from the second vehicle, a second section length which is a length of the second section, on the travel path of the second vehicle and before the meeting point in the direction of travel of the second vehicle, which is wide enough for vehicles to pass each other, compare the first section length and the second section length, and generate, according to a comparison result, travel control information for causing the first vehicle to advance or reverse.

According to the above aspect, when two vehicles are approaching head-on in an area other than a section in which vehicles can pass each other, the travel of the first vehicle is controlled according to the length of the section in which vehicles can pass each other. With this, it is possible to increase the likelihood that when there is a following vehicle, the entire group of vehicles including the following vehicle can pass each other as the length of the section in which vehicles can pass each other increases.

In each of the information processing devices according to the first and second aspects of the present disclosure, the information processing device may calculate a first distance between the first section and the meeting point, and when the comparison result indicates that the first section length and the second section length are equal, transmit the first distance to the second vehicle, and receive, from the second vehicle, a second distance between the second section and the meeting point, compare the first distance and the second distance, and generate, according to a comparison result, travel control information for causing the first vehicle to advance or reverse.

According to the above aspect, even when the length of the section in which vehicles can pass each other is equal, advancing or reversing of the first vehicle can be determined. Furthermore, increased types of head-on approaches can be efficiently handled.

In the information processing device according to each of the first and second aspects of the present disclosure, the information processing device may detect a head-on approach of the second vehicle relative to the first vehicle that occurs after a predetermined time, the meeting point may include a meeting point after the predetermined time, and the information processing device may calculate a fifth distance between the first vehicle and an end point of the first section, and when the meeting point is determined as not being in the first section, transmit the fifth distance to the second vehicle, and receive, from the second vehicle, a sixth distance between the second distance and an end point of the second section, on the travel path of the second vehicle and before the meeting point in the direction of travel of the second vehicle, which is wide enough for vehicles to pass each other, compare the fifth distance and the sixth distance, and generate, according to a comparison result, travel control information for causing the first vehicle to advance or stop.

According to the above aspect, it is possible to prevent the occurrence of a head-on approach.

In each of the information processing devices according to the first and second aspects of the present disclosure, the information processing device may calculate a first distance between the first section and the meeting point, and when the comparison result indicates that the fifth distance and the sixth distance are equal, transmit the first distance to the second vehicle, and receive, from the second vehicle, a second distance between the second section and the meeting point, and compare the first distance and the second distance, and generate, according to a comparison result, travel control information for causing the first vehicle to advance or stop.

According to the above aspect, even when vehicles are approaching head-on, the head-on approach can be efficiently resolved.

The information processing device according to each of the first and second aspects of the present disclosure may be further configured to: control information presentation to at least the second vehicle, and when communication with the second vehicle fails, the information processing device may cause a presentation device to present information corresponding to the travel control information.

According to the above aspect, it is possible to smoothly resolve even a head-on approach between vehicles that cannot establish the inter-vehicle communication.

A program according to the first aspect of the present disclosure causes a computer to: detect a head-on approach of a second vehicle relative to a first vehicle; determine whether a meeting point for the first vehicle and the second vehicle is in a first section, on a travel path of the first vehicle and before the meeting point in a direction of travel of the first vehicle, which is wide enough for vehicles to pass each other; when the meeting point is not in the first section, calculate a first distance between the first section and the meeting point, output the first distance to the second vehicle, and obtain, from the second vehicle, a second distance between the meeting point and a second section, on a travel path of the second vehicle and before the meeting point in a direction of travel of the second vehicle, which is wide enough for vehicles to pass each other; compare the first distance and the second distance; generate, according to a comparison result, travel control information for causing the first vehicle to advance or reverse; and output the travel control information to a travel controller of the first vehicle. According to the above aspect, substantially the same advantageous effects as those obtained by the information processing device according to the first aspect of the present disclosure are obtained.

A program according to the second aspect of the present disclosure causes a computer to; detect a head-on approach of a second vehicle relative to a first vehicle; determine whether a meeting point for the first vehicle and the second vehicle is in a first section, on a travel path of the first vehicle and before the meeting point in a direction of travel of the first vehicle, which is wide enough for vehicles to pass each other; when the meeting point is not in the first section, obtain, from vehicles following the first vehicle, information of the vehicles following the first vehicle, calculate, using the information, the number of the vehicles following the first vehicle, output, to the second vehicle, the number of the vehicles following the first vehicle, and obtain, from the second vehicle, the number of vehicles following the second vehicle; compare the number of the vehicles following the first vehicle and the number of the vehicles following the second vehicle; generate, according to a comparison result, travel control information for causing the first vehicle to advance or reverse; and output the travel control information to a travel controller of the first vehicle. According to the above aspect, substantially the same advantageous effects as those obtained by the information processing device according to the first aspect of the present disclosure are obtained.

An information processing device according to the third aspect of the present disclosure is provided in a first vehicle and is configured to: detect a head-on approach of a second vehicle relative to the first vehicle; determine whether a meeting point for the first vehicle and the second vehicle is in a first section, on a travel path of the first vehicle and before the meeting point in a direction of travel of the first vehicle, which is wide enough for vehicles to pass each other; calculate a first section length which is a length of the first section; when the meeting point is determined as not being in the first section, transmit the first section length to the second vehicle, and receive, from the second vehicle, a second section length which is a length of a second section, on a travel path of the second vehicle and before the meeting point in a direction of travel of the second vehicle, which is wide enough for vehicles to pass each other; compare the first section length and the second section length; and generate, according to a comparison result, travel control information for causing the first vehicle to advance or reverse; and output the travel control information to a travel controller of the first vehicle.

According to the above aspect, when two vehicles are approaching head-on in an area other than a section in which vehicles can pass each other, the travel of the first vehicle is controlled according to the length of the section in which vehicles can pass each other. With this, when there is a following vehicle, a vehicle on the side on which the section in which vehicles can pass each other is longer can reverse. Thus, it is possible to increase the likelihood that the entire group of vehicles including the following vehicle can pass each other.

An information processing device according to the fourth aspect of the present disclosure is an information processing device which is provided in a first vehicle and is configured to: detect a head-on approach of a second vehicle relative to the first vehicle; determine whether a meeting point for the first vehicle and the second vehicle is in a first section, on a travel path of the first vehicle and before the meeting point in a direction of travel of the first vehicle, which is wide enough for vehicles to pass each other; calculate a fifth distance between the first vehicle and an end point of the first section; when the meeting point is determined as not being in the first section, transmit the fifth distance to the second vehicle, and receive, from the second vehicle, a sixth distance between the second vehicle and an end point of a second section, on a travel path of the second vehicle and before the meeting point in a direction of travel of the second vehicle, which is wide enough for vehicles to pass each other; compare the fifth distance and the sixth distance; generate, according to a comparison result, travel control information for causing the first vehicle to advance or stop; and output the travel control information to a travel controller of the first vehicle. The detector detects head-on approach of the second vehicle with the first vehicle that occurs after a predetermined time, and the meeting point includes a meeting point after the predetermined time.

According to the above aspect, it is possible to prevent the occurrence of a head-on approach between vehicles.

A program according to the third aspect of the present disclosure causes a computer to: detect a head-on approach of a second vehicle relative to a first vehicle; determine whether a meeting point for the first vehicle and the second vehicle is in a first section, on a travel path of the first vehicle and before the meeting point in a direction of travel of the first vehicle, which is wide enough for vehicles to pass each other; when the meeting point is not in the first section, calculate a first section length which is a length of the first section, output the first section length to the second vehicle, and obtain, from the second vehicle, a second section length which is a length of a second section, on a travel path of the second vehicle and before the meeting point in a direction of travel of the second vehicle, which is wide enough for vehicles to pass each other; compare the first section length and the second section length; generate, according to a comparison result, travel control information for causing the first vehicle to advance or reverse; and output the travel control information to a travel controller of the first vehicle. According to the above aspect, substantially the same advantageous effects as those obtained by the information processing device according to the third aspect of the present disclosure are obtained.

A program according to the fourth aspect of the present disclosure causes a computer to: detect a head-on approach of a second vehicle relative to a first vehicle; determine whether a meeting point for the first vehicle and the second vehicle is in a first section, on a travel path of the first vehicle and before the meeting point in a direction of travel of the first vehicle, which is wide enough for vehicles to pass each other; when the meeting point is determined as not being in the first section, calculate a fifth distance between the first vehicle and an end point of the first section, output the fifth distance to the second vehicle, and obtain, from the second vehicle, a sixth distance between the second vehicle and an end point of a second section, on a travel path of the second vehicle and before the meeting point in a direction of travel of the second vehicle, which is wide enough for vehicles to pass each other; compare the fifth distance and the sixth distance; generate, according to a comparison result, travel control information for causing the first vehicle to advance or stop; and output the travel control information to a travel controller of the first vehicle. In the detection of a head-on approach of the second vehicle relative to the first vehicle, a head-on approach of the second vehicle relative to the first vehicle that occurs after a predetermined time is detected, and the meeting point includes a meeting point after the predetermined time.

According to the above aspect, substantially the same advantageous effects as those obtained by the information processing device according to the fourth aspect of the present disclosure are obtained.

Note that the aforementioned general or specific aspects may be implemented using a system, a device, a method, an integrated circuit, a computer program, or a computer-readable recording medium such as a recording disc, or any combination of systems, devices, methods, integrated circuits, computer programs, or recording media. The computer-readable recording medium includes, for example, a nonvolatile recording medium such as a compact disc read-only memory (CD-ROM). Furthermore, the device may include one or more devices. When the device includes two or more devices, the two or more devices may be disposed in one device or may be disposed in two or more separated devices. In the present Description and Claims, the "device" may not only mean a single device, but also mean a system including a plurality of devices.

Hereinafter, the information processing device according to the present disclosure will be described in detail with reference to the drawings. Each of the embodiments described below shows a general or specific example. The numerical values, shapes, structural elements, the arrangement and connection of the structural elements, steps, the processing order of the steps etc. shown in the following embodiments are mere examples, and therefore do not limit the present disclosure. Therefore, among the structural elements in the following embodiments, structural elements not recited in any one of the independent claims which indicate the broadest concepts will be described as arbitrary structural elements. The respective figures are schematic diagrams and are not necessarily precise illustrations. Additionally, structural elements that are essentially the same share the same reference numerals in the respective figures, and there are cases where overlapping explanations thereof are omitted or simplified.

Embodiment 1

Information processing device 100 according to Embodiment 1 will be described. In the following embodiments, the information processing device is described as a device which outputs travel control information to a travel control device which is mounted on an automated vehicle capable of autonomous driving and controls the travel of the vehicle. The information processing device may alone constitute a device such as an electronic control unit (ECU) or may be incorporated as a control circuit or the like into a device such as an ECU included in the travel control device.

1-1. Configuration of Information Processing Device

Information processing device 100 and peripheral elements thereof according to Embodiment 1 will be described. FIG. 1 is a block diagram illustrating one example of a functional configuration of vehicle A including information processing device 100 according to Embodiment 1. Vehicle A includes inter-vehicle communication device 1, head-on approach information obtainment device 2, map database (hereinafter also referred to as "map DB") 3, road information obtainment device 4, own vehicle position measurement device 5, autonomous driving control device 6, and information processing device 100.

Inter-vehicle communication device 1 performs wireless communication with a vehicle other than vehicle A. Inter-vehicle communication device 1 is an interface for the aforementioned communication and is, for example, a wireless communication circuit. Inter-vehicle communication device 1 may directly communicate with another vehicle or may communicate with another vehicle via a wireless network. Inter-vehicle communication device 1 broadcasts wireless information to a plurality of vehicles; in other words, inter-vehicle communication device 1 performs broadband communication. The wireless network may be any wireless network; an example of the wireless network is a wireless local area network (LAN). For example, the wireless network may be a wireless local area network (LAN) that requires no communication license and may be, for example, Wi-Fi (registered trademark) (Wireless Fidelity) which uses an international standard, more specifically, the IEEE802.11 standard. The wireless network may use, for example, near-field communication such as Bluetooth (registered trademark) and ZigBee (registered trademark).

Head-on approach information obtainment device 2 obtains head-on approach information which is used to detect a vehicle approaching head-on vehicle A. The wording "head-on approach" used herein means a situation in which vehicle A and an oncoming vehicle cannot meet and pass, that is, a situation which the vehicles cannot pass each other. Examples of head-on approach information include an image captured by a camera, not illustrated in the drawings, which is mounted on vehicle A and obtains an image of the view in a direction of travel; the head-on approach information may be obtained from another vehicle. In the case where the head-on approach information is obtained from a camera on vehicle A, head-on approach information obtainment device 2 may be configured using the camera on vehicle A. In the case where the head-on approach information is obtained from another vehicle, head-on approach information obtainment device 2 may be configured using inter-vehicle communication device 1. Examples of the head-on approach information obtained from another vehicle include an image showing the view in a direction of travel of the other vehicle and information reporting whether or not a head-on approach has occurred. Head-on approach information obtainment device 2 obtains the head-on approach information at predetermined time intervals while vehicle A is traveling or not in motion.

Map DB 3 stores map information. An example of the map is a map showing the conditions of the earth surface, such as a road map. Map DB 3 enables storage and retrieval of various types of information. Map DB 3 is provided, for example, using a storage device such as a read-only memory (ROM), a random access memory (RAM), a semiconductor memory such as a flash memory, a hard disk drive, and a solid state drive (SSD). Map DB 3 does not need to be mounted on vehicle A and may be included in a server device, not illustrated in the drawings, which is located away from vehicle A. In this case, vehicle A may perform wireless communication with the server device via a communication device, not illustrated in the drawings, to obtain necessary map information. In the wireless communication, a wireless LAN may be used via a communication network such as the Internet.

Road information obtainment device 4 obtains information of a road on which vehicle A travels, specifically, information about the width of the road. Examples of the information about the width of the road include an image captured by a camera (for example, an image sensor), not illustrated in the drawings, which is mounted on vehicle A and obtains an image of the surroundings, a detection signal from a sensor which is different from the camera and detects the direction and distance to an object in the vicinity of vehicle A, and map information of the road on which vehicle A travels. In the case where the road information is an image captured by the camera on vehicle A, road information obtainment device 4 may be configured using the camera on vehicle A. In the case where the road information is a detection signal from the aforementioned different sensor, road information obtainment device 4 may be configured using said different sensor. Examples of the sensor include a laser beam sensor LIDAR (light detection and ranging), a magnetic sensor, and an ultrasonic sensor. The laser beam sensor LIDAR measures scattered light resulting from pulsed laser irradiation and detects the direction and distance to a nearby object, thereby detecting a road shoulder and an obstacle on a road. The magnetic sensor detects a road by detecting the magnetism of a magnet embedded in the road. The ultrasonic sensor detects a road shoulder and an obstacle or the like on a road by detecting the direction and distance from vehicle A to a nearby object using ultrasonic waves. In the case where the road information is map information, road information obtainment device 4 may be configured using map DB 3. Road information obtainment device 4 obtains the road information at predetermined time intervals while vehicle A is traveling or not in motion.

Own vehicle position measurement device 5 detects the position of vehicle A on the earth or measures information about said position. Own vehicle position measurement device 5 may detect the direction of travel of vehicle A. Own vehicle position measurement device 5 is configured using a global positioning system (GPS) receiver, an inertial measurement unit, etc., not illustrated in the drawings, mounted on vehicle A. The GPS receiver can detect the position and the direction of travel of vehicle A on the earth on the basis of a signal obtained from a satellite. The GPS receiver can be configured, for example, using a communication circuit. The inertial measurement unit includes an acceleration sensor and an angular rate sensor (also referred to as a "gyroscope sensor") and measures the acceleration and the angular velocity of vehicle A. The direction of travel and the speed of vehicle A can be calculated on the basis of the acceleration and the angular velocity measured by the inertial measurement unit, and the position of vehicle A can be calculated on the basis of the direction of travel and the speed of vehicle A. Own vehicle position measurement device 5 obtains the position of vehicle A at predetermined time intervals while vehicle A is traveling or not in motion.

Autonomous driving control device 6 controls the automatic operation of vehicle A. Using the map information in map DB 3, autonomous driving control device 6 causes vehicle A to automatically travel according to a travel path to a destination. Autonomous driving control device 6 is configured using a computer such as an ECU.

Furthermore, information processing device 100 includes manager 101, communicator 102, oncoming vehicle detector 103, road width obtainer 104, own vehicle position obtainer 105, meeting and passing spot obtainer 106, determiner 107, reversing distance obtainer 108, generator 109, outputter 110, and storage 111.

Manager 101 controls the operations of entire information processing device 100 by controlling, in association, the operations of communicator 102, oncoming vehicle detector 103, road width obtainer 104, own vehicle position obtainer 105, meeting and passing spot obtainer 106, determiner 107, reversing distance obtainer 108, generator 109, and outputter 110. Furthermore, when a head-on approach between vehicle A and another vehicle is detected, manager 101 outputs information about vehicle A to the other vehicle and requests the other vehicle to transmit information of the other vehicle. Furthermore, in the case where map DB 3 is provided on the server device, manager 101 requests the server device to transmit map information in map database DB 3.

Communicator 102 mediates communication between a structural element of information processing device 100 and an element external to vehicle A. Using inter-vehicle communication device 1, communicator 102 transmits, to another vehicle, information and a command output from a structural element of information processing device 100. Furthermore, using inter-vehicle communication device 1, communicator 102 obtains information and a command transmitted from another vehicle to vehicle A.

Oncoming vehicle detector 103 detects another vehicle facing vehicle A. Specifically, oncoming vehicle detector 103 obtains the head-on approach information from head-on approach information obtainment device 2, and detects the presence or absence of another vehicle (that is, an oncoming vehicle) facing vehicle A according to the head-on approach information. Oncoming vehicle detector 103 obtains the head-on approach information, for example, at predetermined time intervals while vehicle A is traveling or not in motion, and detects the presence or absence of an oncoming vehicle. Oncoming vehicle detector 103 causes storage 111 to store the obtained head-on approach information. Note that oncoming vehicle detector 103 may detect, using the head-on approach information, the distance between vehicle A and another vehicle that is the detected oncoming vehicle. Here, oncoming vehicle detector 103 is one example of a part of the detector.

In the present embodiment, oncoming vehicle detector 103 and determiner 107 detect whether vehicle A and another vehicle facing vehicle A are located within a predetermined distance and are in a situation in which they cannot pass each other, in other words, they are approaching head-on. Specifically, when the distance between vehicle A and another vehicle facing vehicle A falls below a predetermined distance while vehicle A is traveling or not in motion, and the sum of the width of vehicle A and the width of the other vehicle is less than a predetermined allowance width relative to the road width obtained by road width obtainer 104, it is determined that vehicle A and the other vehicle are approaching head-on.

When the head-on approach information is obtained from another vehicle, oncoming vehicle detector 103 may determine, using the obtained head-on approach information, the presence or absence of a vehicle facing vehicle A. Oncoming vehicle detector 103 outputs the detection result to determiner 107. Note that in the case that the obtained head-on approach information reports the presence or absence of a head-on approach, a head-on approach may be detected by determiner 107 only.

Road width obtainer 104 obtains road information from road information obtainment device 4, and detects, from the road information, the width of a road on which vehicle A is traveling. Road width obtainer 104 obtains the road information at predetermined time intervals while vehicle A is traveling or not in motion, and detects the width of the road. The road on which vehicle A is traveling is where vehicle A has already passed, but may include a road on which vehicle A is scheduled to pass, that is, a road ahead in the direction of travel of vehicle A.

In the case where the road information is an image captured by a camera on vehicle A, road width obtainer 104 may extract a road region from the image and calculate the width of the road from the road region in the image. In the case where the road information is a detection signal from a sensor different from the camera, road width obtainer 104 may detect the width of the road by identifying the position of the road, the shape of the road, etc., for vehicle A from the detection signal. In the case where the road information is map information in map DB 3, road width obtainer 104 may detect the width of the road from the position of vehicle A and the map information. Road width obtainer 104 may detect the width of the road using a combination of various types of road information such as those mentioned above. Road width obtainer 104 stores, into storage 111, the road width which road width obtainer 104 detects with time, in association with the position of vehicle A, the position of the road on the map, or the time when the road width is detected. Road width obtainer 104 may output, to meeting and passing spot obtainer 106, the road width which road width obtainer 104 detects with time. Note that road width obtainer 104 may obtain the position of vehicle A from own vehicle position obtainer 105 to be described later or may obtain the position of vehicle A from own vehicle position measurement device 5. Road width obtainer 104 may identify the position on the map corresponding to the road width from the position, the orientation, etc., of vehicle A.

Own vehicle position obtainer 105 obtains, from own vehicle position measurement device 5, the position of vehicle A measured by own vehicle position measurement device 5. Own vehicle position obtainer 105 obtains the position of vehicle A at predetermined time intervals while vehicle A is traveling or not in motion. Examples of the position of vehicle A include coordinates on a map and identification information on a map. The identification information is, for example, information that makes it possible to identify a position on a map such as ID or the like set in each spot on the map. Own vehicle position obtainer 105 may store the position of vehicle A into storage 111 in association with a point in time when vehicle A is present in the position, or may output the position of vehicle A to road width obtainer 104, or may output the position of vehicle A to meeting and passing spot obtainer 106.

Meeting and passing spot obtainer 106 determines, using information of the road width obtained from road width obtainer 104 or storage 111, whether or not vehicle A and another vehicle can meet and pass on a road on which vehicle A has traveled and/or a road on which vehicle A is scheduled to travel, that is, a road in the travel path of vehicle A. Meeting and passing spot obtainer 106 obtains the information of the width of the road at predetermined time intervals while vehicle A is traveling or not in motion. Meeting and passing spot obtainer 106 determines that vehicles cannot meet and pass when the road width of the travel path is less than a preset width sufficient for meeting and passing, and determines that vehicles can meet and pass when the road width of the travel path is greater than or equal to the preset width sufficient for meeting and passing. Furthermore, meeting and passing spot obtainer 106 may, using the map information in map DB 3, whether or not the road width of the travel path of vehicle A is sufficient for meeting and passing. The map information in map DB 3 may include information indicating whether or not vehicles can meet and pass on each spot, and meeting and passing spot obtainer 106 may determine, from the road width in the map information, whether or not vehicles can meet and pass. Meeting and passing spot obtainer 106 detects, on the basis of the determination result, the position of an end point of a meeting and passing section, which is the point of change from the state where vehicles can meet and pass to the state where vehicles cannot meet and pass, and the position of a start point of the meeting and passing section, which is the point of change from the state where vehicles cannot meet and pass to the state where vehicles can meet and pass, and stores the positions of the end point and the start point into storage 111. The meeting and passing section is a section in which oncoming vehicles can meet and pass between the start point and the end point of the section. Examples of the positions of the start point and the end point include coordinates on a map and identification information on a map.

When vehicle A and another vehicle face each other, determiner 107 determines whether a head-on approach between vehicle A and the other vehicle has occurred, in other words, whether vehicle A and the other vehicle are approaching head-on. Specifically, when oncoming vehicle detector 103 detects the presence of a vehicle facing vehicle A, determiner 107 determines whether or not the position of vehicle A is included in the meeting and passing section in which vehicles can pass each other. This meeting and passing section is on the travel path of vehicle A and before a meeting point in the direction of travel of vehicle A. In other words, this meeting and passing section is the meeting and passing section closest to the current position of vehicle A on the path on which vehicle A has traveled. The meeting point may be a position between vehicle A and another vehicle that face each other or may be the position of vehicle A. When oncoming vehicle detector 103 detects another vehicle facing vehicle A, determiner 107 obtains the head-on approach information of vehicle A from storage 111, obtains the distance between vehicle A and the other vehicle from oncoming vehicle detector 103, obtains the position of vehicle A from own vehicle position obtainer 105, and obtains, from storage 111, the start point position and the end point position of the meeting and passing section closest to the position of vehicle A. Determiner 107 specifies the meeting point from the obtained distance and position of vehicle A. Determiner 107 determines whether or not the specified meeting point is located between the start point position and the end point position of the aforementioned meeting and passing section. Here, determiner 107 is one example of a part of the detector.

Reversing distance obtainer 108 obtains a reversing distance between the meeting point and the end point of the meeting and passing section. In the present embodiment, the reversing distance is a physical distance. Reversing distance obtainer 108 may obtain the reversing distance at predetermined time intervals while vehicle A is traveling or not in motion. Furthermore, reversing distance obtainer 108 obtains, from another vehicle facing vehicle A, the reversing distance of the other vehicle via communicator 102 and inter-vehicle communication device 1. Note that the reversing distance may be a temporal distance such as time required to reverse. Here, reversing distance obtainer 108 is one example of the calculator.

Reversing distance obtainer 108 obtains the route length between the meeting point and the end point of the meeting and passing section closest to the current position on the path on which vehicle A has traveled. For example, the route length is a distance which vehicle A reverses to the end point of the meeting and passing section closest to the current position of vehicle A. Reversing distance obtainer 108 obtains the position of the end point of the closest meeting and passing section from meeting and passing spot obtainer 106 or storage unit 111, and calculates the route length between the position of the end point and the current position of vehicle A. For example, reversing distance obtainer 108 may obtain, from an odometer (also referred to as "odograph") on vehicle A, the measured distance between the end point of the closest meeting and passing section and the current position of vehicle A, and determine the measured distance as the route length. Alternatively, reversing distance obtainer 108 may obtain the map information from map DB 3 and calculates the route length between the end point of the closest meeting and passing section and the current position of vehicle A. Reversing distance obtainer 108 outputs the reversing distances of vehicle A and another vehicle to generator 109. Note that the reversing distance of another vehicle is the route length, on the path on which the other vehicle has traveled, between the current position of the other vehicle and the end point of the meeting and passing section closest to the current position.

Generator 109 obtains the reversing distances of vehicle A and another vehicle from reversing distance obtainer 108. Subsequently, generator 109 compares the reversing distance of vehicle A and the reversing distance of the other vehicle, and generates, according to the comparison result, travel control information for causing vehicle A to advance or reverse. Specifically, generator 109 generates the travel control information for causing vehicle A to reverse when the reversing distance of vehicle A is shorter, and otherwise generates the travel control information for causing vehicle A to advance. Generator 109 outputs the travel control information to outputter 110.

Outputter 110 outputs, to autonomous driving control device 6, the travel control information obtained by generator 109. Here, autonomous driving control device 6 is one example of the travel controller.

Structural elements of information processing device 100 such as manager 101, communicator 102, oncoming vehicle detector 103, road width obtainer 104, own vehicle position obtainer 105, meeting and passing spot obtainer 106, determiner 107, reversing distance obtainer 108, generator 109, and outputter 110 may be configured using a computer system (not illustrated in the drawings) including a processor such as a central processing unit (CPU) or a digital signal processor (DSP) and memories such as RAM and ROM. A part or all of the functions of the structural elements may be achieved by the CPU or the DSP executing a program recorded on the ROM using the RAM as a working memory. Furthermore, a part or all of the functions of the structural elements may be achieved by a dedicated hardware circuit such as an electronic circuit or an integrated circuit. A part or all of the functions of the structural elements may be achieved by a combination of the software function and the hardware circuit described above. The program may be provided as an application, for example, through communication via a communication network such as the Internet or communication in compliance with a mobile communication standard or via other wireless networks, wired networks, or broadcast.

Storage 111 allows storage and retrieval of various types of information. Storage 111 and map DB 3 are each implemented, for example, as a storage device such as ROM, RAM, a semiconductor memory such as a flash memory, a hard disk, or SSD.

1-2. Operations of Information Processing Device

Figure 2:
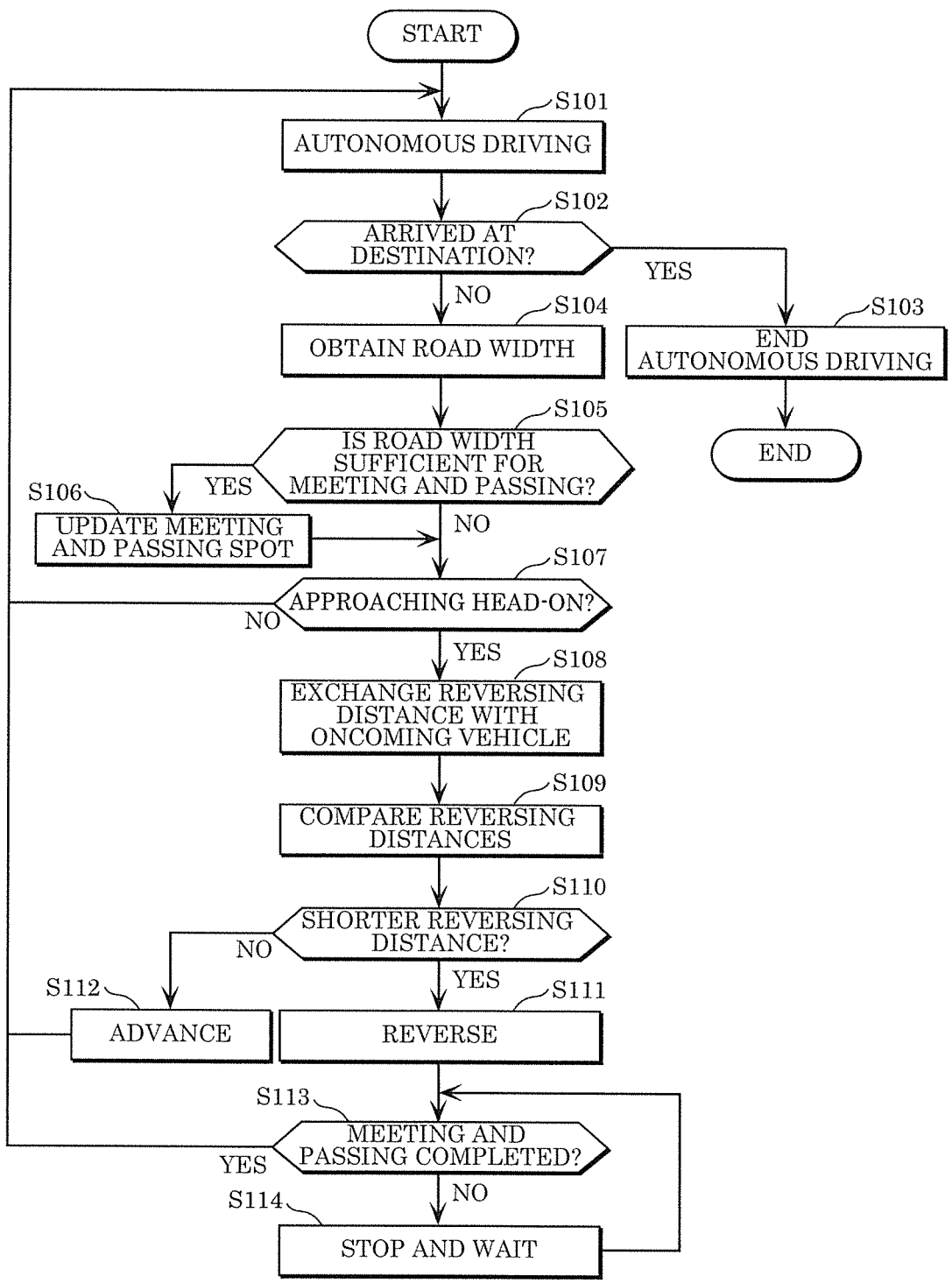
FIG. 2 is a flowchart illustrating one example of a flow of operations of an information processing device according to Embodiment 1.
Figure 3A:
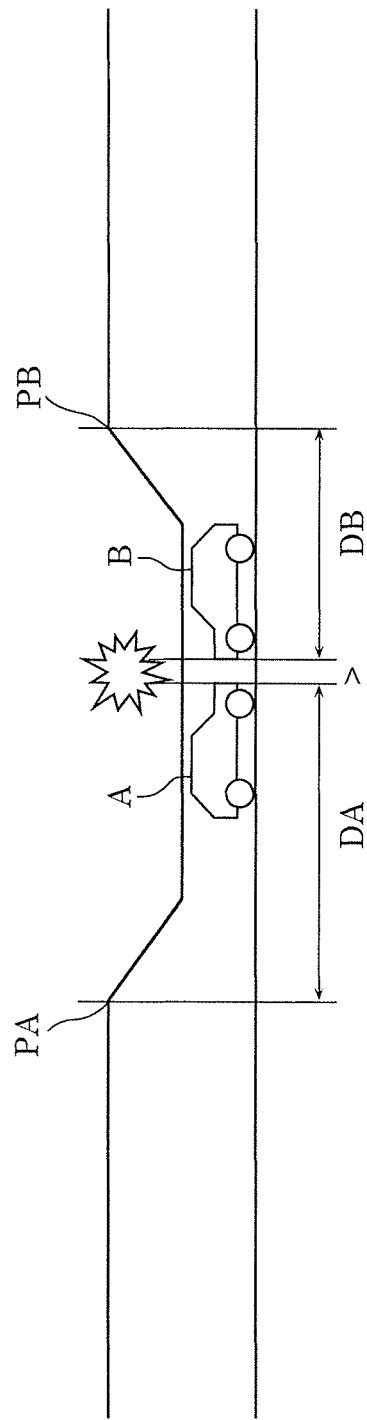
FIG. 3A is a schematic diagram illustrating one example of a head-on approach between vehicles according to Embodiment 1.
Figure 3B:
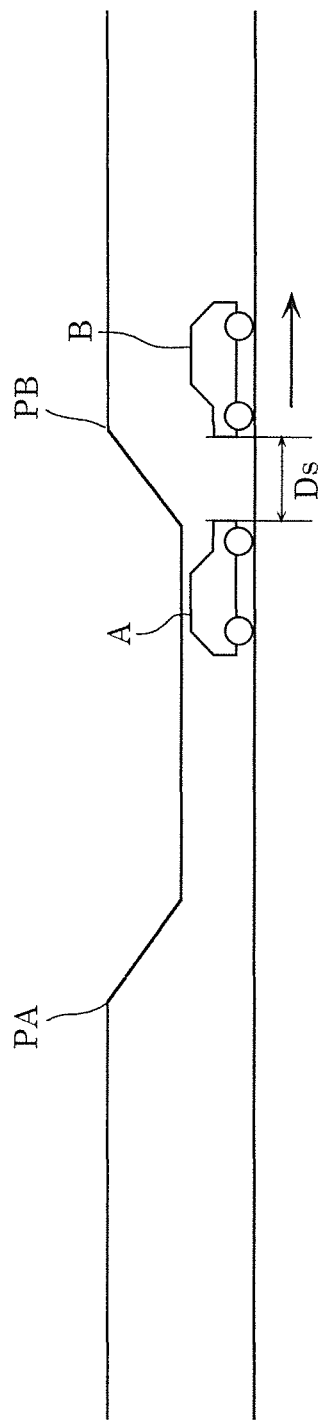
FIG. 3B is a schematic diagram illustrating one example of operations of a vehicle for resolving a head-on approach according to Embodiment 1.

Operations of information processing device 100 according to Embodiment 1 will be described with reference to FIG. 2. FIG. 2 is a flowchart illustrating one example of a flow of the operations of information processing device 100 according to Embodiment 1. Furthermore, using an example in FIG. 3A and FIG. 3B, the following description is given assuming that another vehicle facing vehicle A is also capable of autonomous driving and an information processing device substantially the same as that mounted on vehicle A is mounted on the other vehicle. Note that FIG. 3A is a schematic diagram illustrating one example of a head-on approach between vehicles according to Embodiment 1. FIG. 3B is a schematic diagram illustrating one example of operations of a vehicle for resolving a head-on approach according to Embodiment 1.

As illustrated in FIG. 2, in Step S101, autonomous driving control device 6 of vehicle A controls the travel of vehicle A and causes vehicle A to automatically travel forward along a travel path to a destination input by a user such as a driver of vehicle A; in other words, autonomous driving control device 6 allows autonomous driving of vehicle A. The travel path may be determined by autonomous driving control device 6 or may be determined by a navigation device, not illustrated in the drawings, mounted on vehicle A.

Next, in Step S102, autonomous driving control device 6 determines whether or not vehicle A has reached the destination. When vehicle A has reached the destination (YES in Step S102), autonomous driving control device 6 proceeds to Step S103 and ends autonomous driving of vehicle A. When vehicle A has not reached the destination (NO in Step S102), the processing proceeds to Step S104.

Next, in Step S104, using the road information obtained from road information obtainment device 4 of vehicle A, road width obtainer 104 of information processing device 100 detects the width of the road on which vehicle A is traveling. Note that road width obtainer 104 obtains the road information from road information obtainment device 4 at predetermined time intervals. Furthermore, road width obtainer 104 obtains the position of vehicle A from own vehicle position obtainer 105, and stores the road width into storage 111 in association with the position of vehicle A when the road width is detected. Road width obtainer 104 may output, to meeting and passing spot obtainer 106, the road width and the position of vehicle A. Note that own vehicle position obtainer 105 obtains the position of vehicle A from own vehicle position measurement device 5 at predetermined time intervals.

Next, in Step S105, meeting and passing spot obtainer 106 of information processing device 100 determines whether or not the road width obtained from road width obtainer 104 or storage 111 is sufficient for vehicle A to pass another vehicle, that is, sufficient for meeting and passing. Meeting and passing spot obtainer 106 proceeds to Step S106 when the road width is sufficient for meeting and passing (YES in Step S105), and proceeds to Step S107 when the road width is not sufficient for meeting and passing (NO in Step S105).

In Step S106, meeting and passing spot obtainer 106 determines, as the meeting and passing spot, the position of vehicle A that corresponds to the road width subject to the determination. Furthermore, meeting and passing spot obtainer 106 updates information of the road width and the position of vehicle A by adding the determination result and stores the updated information into storage 111. Furthermore, on the basis of the determination result in Step S105, meeting and passing spot obtainer 106 determines a meeting and passing section having a start point at the point of change from the state where vehicles cannot meet and pass to the state where vehicles can meet and pass and an end point at the point of change from the state where vehicles can meet and pass to the state where vehicles cannot meet and pass, and stores the meeting and passing section into storage 111.

Next, in Step S107, oncoming vehicle detector 103 of information processing device 100 determines, using the head-on approach information obtained from head-on approach information obtainment device 2, whether or not vehicle A faces another vehicle. In other words, oncoming vehicle detector 103 determines whether or not vehicle A is approaching head-on another vehicle. At this time, oncoming vehicle detector 103 detects the presence or absence of a head-on approach between vehicle A and another vehicle from the head-on approach information, and outputs the detection result to determiner 107.

Furthermore, when a head-on approach between vehicle A and another vehicle is detected, determiner 107 determines whether or not vehicle A and another vehicle can meet and pass. Specifically, determiner 107 obtains the position of vehicle A from own vehicle position obtainer 105, and determines, with reference to the information of the meeting and passing section in storage 111, whether or not a point at which vehicle A and the other vehicle will meet is included in the meeting and passing section on the travel path of vehicle A and before the meeting point in the direction of travel of vehicle A. Note that in the present embodiment, determiner 107 uses the position of vehicle A as the meeting point, but this is not limiting as described above. When the meeting point is not included in the meeting and passing section, determiner 107 determines that vehicle A and the other vehicle are approaching head-on.

When the meeting point is included in the meeting and passing section, determiner 107 determines that the vehicle A and the other vehicle can meet and pass; in other words, the vehicle A and the other vehicle are not approaching head-on. Furthermore, also when vehicle A does not face another vehicle, determiner 107 determines that vehicle A and another vehicle are not approaching head-on. Determiner 107 returns to Step S101 when the vehicles are not approaching head-on (NO in Step S107), and proceeds to Step S108 when the vehicles are approaching head-on (YES in Step S107), and outputs the determination result to reversing distance obtainer 108.

In Step S108, with reference to the information of the meeting and passing section in storage 111, reversing distance obtainer 108 specifies the meeting and passing section closest to vehicle A approaching head-on another vehicle. This meeting and passing section is the meeting and passing section closest to vehicle A among meeting and passing sections on the travel path of vehicle A and before the meeting point in the direction of travel of vehicle A. Furthermore, reversing distance obtainer 108 detects the end position of the specified meeting and passing section. As illustrated in the example of FIG. 3A, reversing distance obtainer 108 detects an end position PA of the meeting and passing section closest to vehicle A. End position PA is a point at which the meeting and passing section closest to vehicle A ends in the direction of travel of vehicle A.

Reversing distance obtainer 108 calculates, as the reversing distance of vehicle A, distance DA between vehicle A approaching head-on vehicle B, which is another vehicle, and end position PA of the meeting and passing section. Distance DA is the distance from the meeting point for vehicles A and B to end position PA. In other words, reversing distance obtainer 108 calculates, as the reversing distance, the distance between the meeting and passing section and the meeting point. Reversing distance obtainer 108 transmits reversing distance DA of vehicle A to vehicle B via communicator 102 and inter-vehicle communication device 1. Furthermore, reversing distance obtainer 108 obtains, from vehicle B, reversing distance DB of vehicle B via communicator 102 and inter-vehicle communication device 1. Reversing distance DB of vehicle B is the distance between vehicle B approaching head-on vehicle A and end position PB of the meeting and passing section closest to vehicle B. The closest meeting and passing section is the meeting and passing section closest to vehicle B among meeting and passing sections on the travel path of vehicle B and before the point at which vehicle B will meet vehicle A, in the direction of travel of vehicle B. Such reversing distance DB is the distance between the meeting point and the meeting and passing section on the travel path of vehicle B and before the meeting point in the direction of travel of vehicle B. Note that when detecting a head-on approach between vehicles A and B, the information processing device of vehicle B may transmit reversing distance DB to vehicle A or may transmit reversing distance DB to vehicle A in response to a request for a reversing distance of vehicle B from reversing distance obtainer 108 of vehicle A. In this way, reversing distance obtainer 108 exchanges the reversing distances with vehicle B which is an oncoming vehicle. Reversing distance obtainer 108 outputs reversing distances DA of vehicle A and reversing distance DB of vehicle B to generator 109. Here, reversing distance DA of vehicle A is one example of the first distance, and reversing distance DB of vehicle B is one example of the second distance.

Next, in Step S109, generator 109 compares reversing distance DA of vehicle A and reversing distance DB of vehicle B. Generator 109 proceeds to Step S111 when reversing distance DA is less than reversing distance DB (YES in Step S110) and otherwise proceeds to Step S112 (NO in Step S110).

In Step S111, on the basis of the determination result in Step S110, generator 109 generates travel control information for causing vehicle A to reverse and outputs the travel control information to outputter 110. Outputter 110 outputs the travel control information to autonomous driving control device 6 and proceeds to Step S113. Autonomous driving control device 6 causes vehicle A to reverse according to the travel control information. Note that the travel control information generated by generator 109 includes information of a position in which vehicle A is stopped after reversing. The position in which vehicle A is stopped after reversing is a position in the meeting and passing section including end position PA. In the present embodiment, the position in which vehicle A is stopped after reversing is in the vicinity of end position PA in the meeting and passing section, but this is not limiting. Furthermore, generator 109 may generate a command including travel control information for causing vehicle B to advance. This travel control information includes information of inter-vehicle distance Ds which vehicle B that is advancing maintains relative to vehicle A that is reversing. Generator 109 transmits the generated command to vehicle B via communicator 102 and inter-vehicle communication device 1. With this, as illustrated in the example in FIG. 3B, vehicle A reverses, and vehicle B advances while maintaining inter-vehicle distance Ds relative to vehicle A that is reversing. Furthermore, vehicle B may perform the processes in Steps S111 to S114 on the basis of self-determination without obtaining the command from vehicle A.

In Step S112, on the basis of the determination result in Step S110, generator 109 generates travel control information for causing vehicle A to advance and outputs the travel control information to outputter 110. Outputter 110 outputs the travel control information to autonomous driving control device 6 and proceeds to Step S101. This travel control information includes information of inter-vehicle distance Ds which vehicle A that is advancing maintains relative to vehicle B that is reversing. Autonomous driving control device 6 causes vehicle A to advance according to the travel control information. Furthermore, generator 109 may generate, in addition to the travel control information for causing vehicle A to advance, a command including travel control information for causing vehicle B to reverse. Generator 109 transmits the generated command to vehicle B via communicator 102 and inter-vehicle communication device 1. With this, vehicle B reverses according to the received command, and vehicle A advances while maintaining inter-vehicle distance Ds relative to vehicle B that is reversing. Autonomous driving control device 6 may detect the inter-vehicle distance between vehicles A and B using an image captured by a camera on vehicle A, other sensors, not illustrated in the drawings, which detects an object in front of vehicle A, the position of vehicle B received from vehicle B, and the like. Furthermore, autonomous driving control device 6 may obtain, from vehicle B, the information of inter-vehicle distance Ds between vehicles A and B.

In Step S113, information processing device 100 determines whether or not the head-on approach between vehicles A and B has been resolved as a result of movement of vehicles A and B. In other words, information processing device 100 determines whether or not meeting and passing of vehicles A and B have been completed. The situation in which the head-on approach between vehicles A and B has been resolved means a situation in which the meeting point is located in a meeting and passing section beyond end position PA and vehicles A and B do not face each other. Specifically, as in Step S107, oncoming vehicle detector 103 detects the presence or absence of a head-on approach of vehicle B relative to vehicle A, and determiner 107 determines a meeting point with respect to the meeting and passing section.

Oncoming vehicle detector 103 returns to Step S101 when the meeting and passing have been completed (YES in Step S113), and proceeds to Step S114 when the meeting and passing have not been completed (NO in Step S113).

In Step S114, autonomous driving control device 6 causes vehicle A to wait in the state where vehicle A is not in motion, and returns to Step S113. Specifically, the vehicle that has reversed waits until the meeting and passing are completed after completion of the reversing.

1-3. Advantageous Effects

As described above, when information processing device 100 according to Embodiment 1 mounted on at least one of two vehicles detects head-on approach between the two vehicles, one of the vehicles featuring that the distance between the meeting point and the meeting and passing section closest to the vehicle in a reversing direction is shorter is forced to reverse, and the other vehicle featuring that said distance is longer is allowed to advance so that these two vehicles meet and pass in the meeting and passing section. In other words, information processing device 100 causes one of the two vehicles closer to the meeting and passing section to reverse.

Furthermore, information processing device 100 according to Embodiment 1 is mounted, for example, on vehicle A which is the first vehicle. Oncoming vehicle detector 103 and determiner 107 as the detector of such information processing device 100 detect a head-on approach of vehicle B which is the second vehicle relative to vehicle A. Determiner 107 determines whether the meeting point for vehicles A and B is in a first section in which vehicles can pass each other and which is on the travel path of vehicle A and before the meeting point in the direction of travel of vehicle A. Furthermore, reversing distance obtainer 108 as the calculator calculates the first distance between the first section and the meeting point. When the meeting point is determined not to be in the first section, communicator 102 transmits the first distance to vehicle B, and receives, from vehicle B, a second distance between the meeting point and a second section in which vehicles can pass each other and which is on the travel path of vehicle B and before the meeting point in the direction of travel of vehicle B. Generator 109 compares the first distance and the second distance and generates, according to the comparison result, travel control information for causing vehicle A to advance or reverse. Outputter 110 outputs the travel control information to a travel controller of vehicle A.

With the above-described configuration, when two vehicles A and B face each other (in other words, two vehicles A and B are approaching head-on) in an area other than a section in which vehicles can pass each other, the travel of vehicle A is controlled according to the distances between the meeting point and sections for two vehicles A and B in which vehicles can meet ad pass. In this way, unlike the related art, advancing or reversing of each of vehicles A and B that are approaching head-on is determined according to an actual distance of movement. With this, the distance vehicle A or B moves to resolve a head-on approach can be optimized. Thus, it is possible to efficiently resolve a head-on approach between vehicles A and B. Furthermore, the control for resolving the head-on approach is simple and easy. Note that the head-on approach is resolved via inter-vehicle communication; in the event of a head-on approach, two vehicles A and B are present in an inter-vehicle communication area, and thus the head-on approach can be smoothly resolved.

Embodiment 2

Information processing device 200 according to Embodiment 2 will be described. Information processing device 100 according to Embodiment 1 determines a vehicle that is to reverse, on the basis of the reversing distances between two vehicles that are approaching head-on and the meeting and passing sections closest thereto. Information processing device 200 according to Embodiment 2 determines a vehicle that is to reverse, on the basis of the numbers of vehicles following two vehicles approaching head-on. The following description of Embodiment 2 will focus on differences from Embodiment 1.

2-1. Configuration of Information Processing Device

Figure 4:
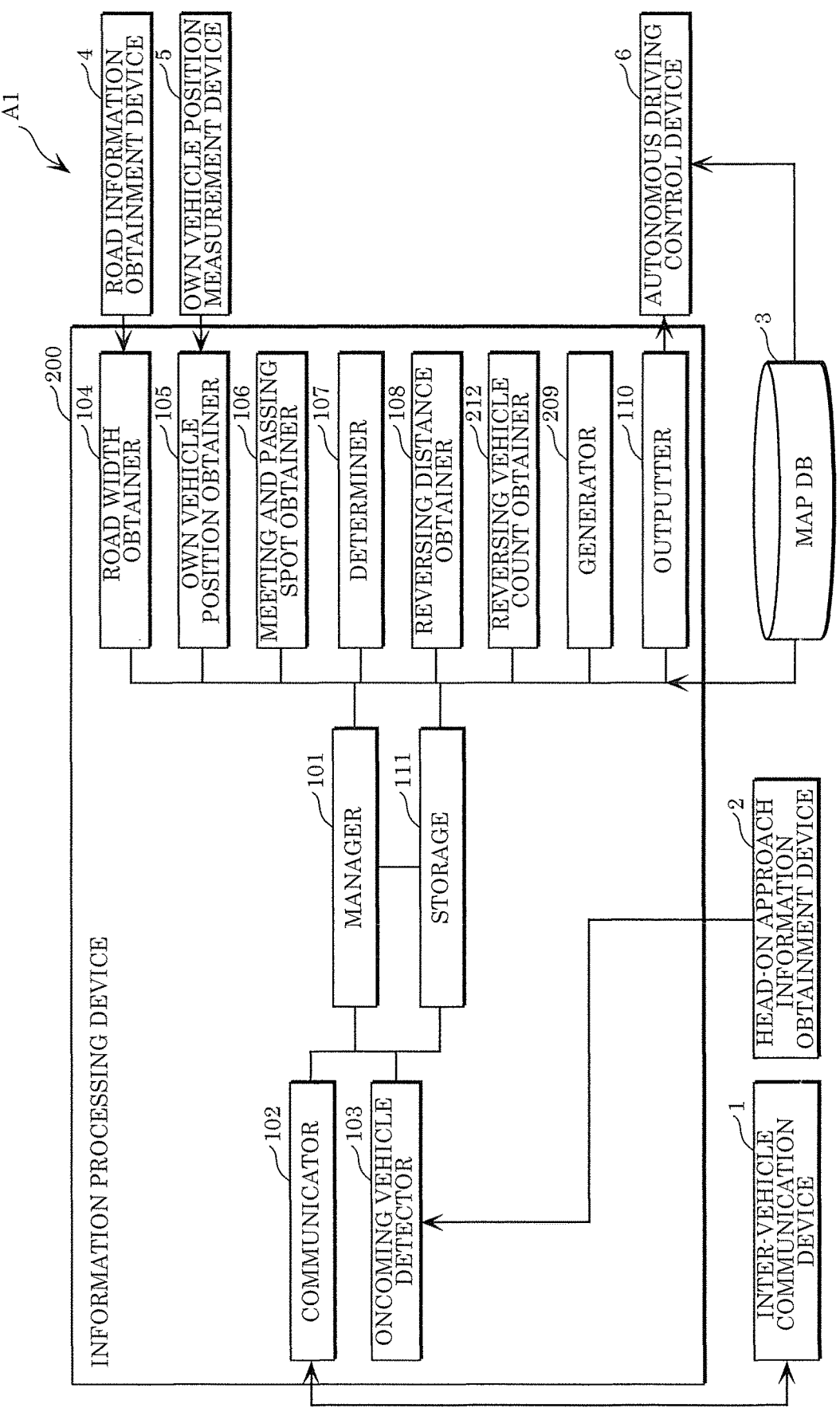
FIG. 4 is a block diagram illustrating one example of a functional configuration of a vehicle including an information processing device according to Embodiment 2.

Information processing device 200 and peripheral elements thereof according to Embodiment 2 will be described. FIG. 4 is a block diagram illustrating one example of a functional configuration of vehicle A1 including information processing device 200 according to Embodiment 2. As illustrated in FIG. 4, vehicle A1 includes inter-vehicle communication device 1, head-on approach information obtainment device 2, map DB 3, road information obtainment device 4, own vehicle position measurement device 5, autonomous driving control device 6, and information processing device 200. Information processing device 200 includes, as in Embodiment 1, manager 101, communicator 102, oncoming vehicle detector 103, road width obtainer 104, own vehicle position obtainer 105, meeting and passing spot obtainer 106, determiner 107, reversing distance obtainer 108, outputter 110, and storage 111. Furthermore, information processing device 200 includes generator 209 and reversing vehicle count obtainer 212.

Reversing vehicle count obtainer 212 obtains the number of vehicles following vehicle A1. When reversing vehicle count obtainer 212 obtains the result of determining the head-on approach between vehicle A1 and another vehicle from determiner 107 and when reversing vehicle counter obtainer 212 receives a request for the number of following vehicles from another vehicle facing vehicle A1, reversing vehicle count obtainer 212 calculates the number of vehicles following vehicle A1. Specifically, reversing vehicle count obtainer 212 communicates with a vehicle in a communication area of inter-vehicle communication device 1 via communicator 102 and inter-vehicle communication device 1, and obtains the number of vehicles following the vehicle and the position of the vehicle. Reversing vehicle count obtainer 212 performs trial communication with a vehicle, and when there is a reply from the vehicle, reversing vehicle count obtainer 212 requests the vehicle to transmit the number of vehicles following the vehicle and the position of the vehicle, thereby obtaining the number of vehicles following the vehicle and the position of the vehicle. Reversing vehicle count obtainer 212 calculates the number of vehicles following vehicle A1 using the number of vehicles following each vehicle in the inter-vehicle communication area and the position of the vehicle that have been obtained from the vehicle. In the present embodiment, the number of following vehicles transmitted from each vehicle is the number of vehicles including said vehicle, but this is not limiting. Here, reversing vehicle count obtainer 212 is an example of the calculator.

For example, assume that there is only vehicle B in the inter-vehicle communication area of vehicle A1, there are only vehicles A1 and C in the inter-vehicle communication area of vehicle B, there are only vehicles B and D in the inter-vehicle communication area of vehicle C, and there are only vehicles C and E in the inter-vehicle communication area of vehicle D. In this case, vehicle D obtains the number of following vehicles "1" from vehicle E. Vehicle C obtains the number of following vehicles "2" from vehicle D. Furthermore, vehicle B obtains the number of following vehicles "3" from vehicle C. Moreover, reversing vehicle count obtainer 212 of vehicle A1 obtains the number of following vehicles "4" from vehicle B. In this way, it is possible to detect the number of vehicles following vehicle A1 by sequentially performing inter-vehicle communication between vehicles.

Generator 209 obtains the number of vehicles following vehicle A1 from reversing vehicle count obtainer 212. Furthermore, generator 209 obtains the number of vehicles following another vehicle facing vehicle A1. Subsequently, generator 209 compares the number of vehicles following vehicle A and the number of vehicles following the other vehicle, and generates, according to the comparison result, travel control information for causing vehicle A1 to advance or reverse. Specifically, generator 209 generates the travel control information for causing vehicle A1 to reverse when the number of vehicles following vehicle A1 is smaller. Generator 209 generates the travel control information for causing vehicle A1 to advance when the number of vehicles following vehicle A1 is larger. When the number of vehicles following vehicle A1 and the number of vehicles following another vehicle are equal, generator 209 generates the travel control information based on the reversing distance, as in Embodiment 1. Generator 109 outputs the travel control information to outputter 110.

The configurations of vehicle A1 and the other structural elements of information processing device 200 are substantially the same as those in Embodiment 1, and thus description thereof will be omitted.

2-2. Operations of Information Processing Device

Figure 5A:
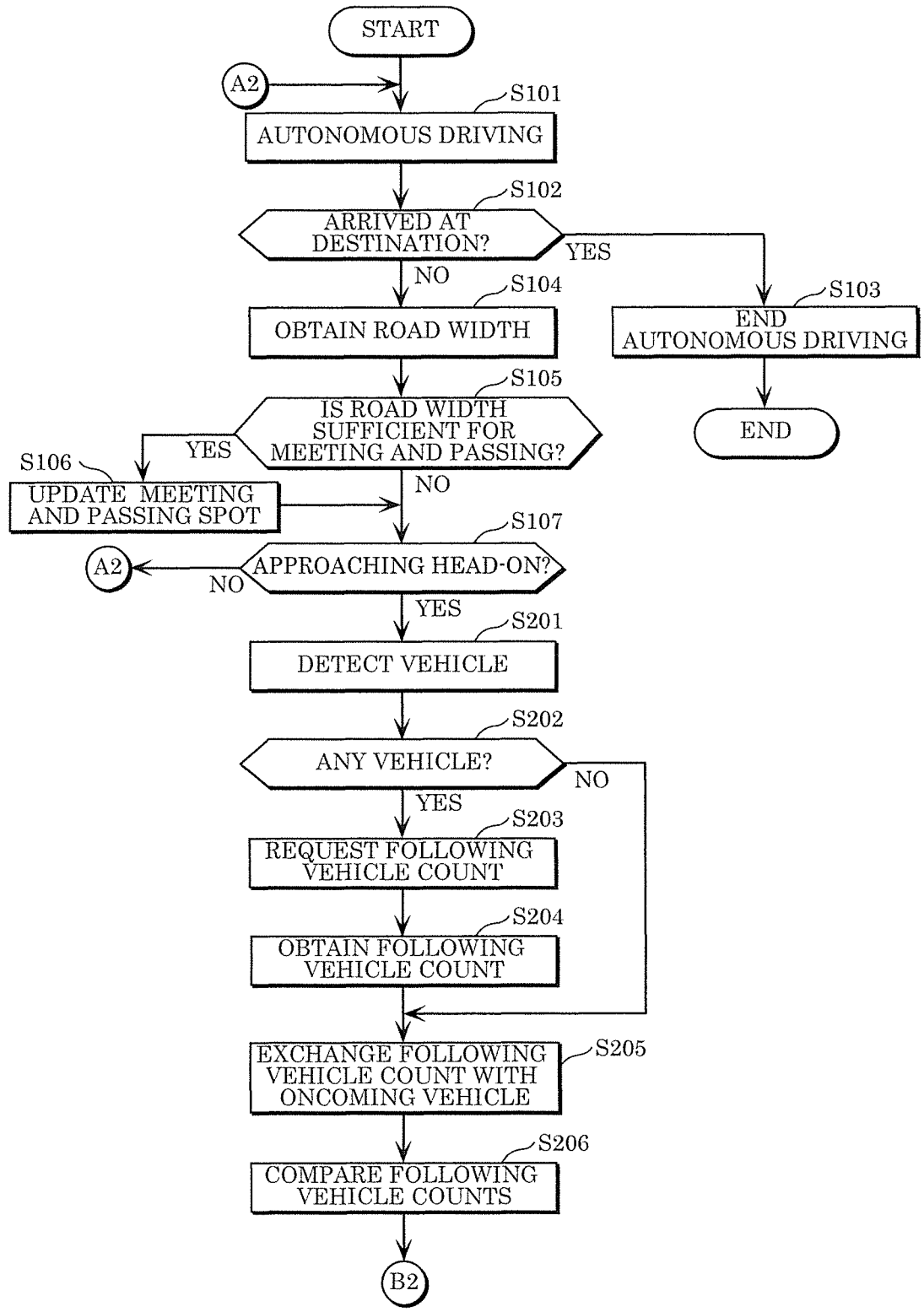
FIG. 5A is a flowchart illustrating one example of a flow of operations of an information processing device according to Embodiment 2.
Figure 5B:
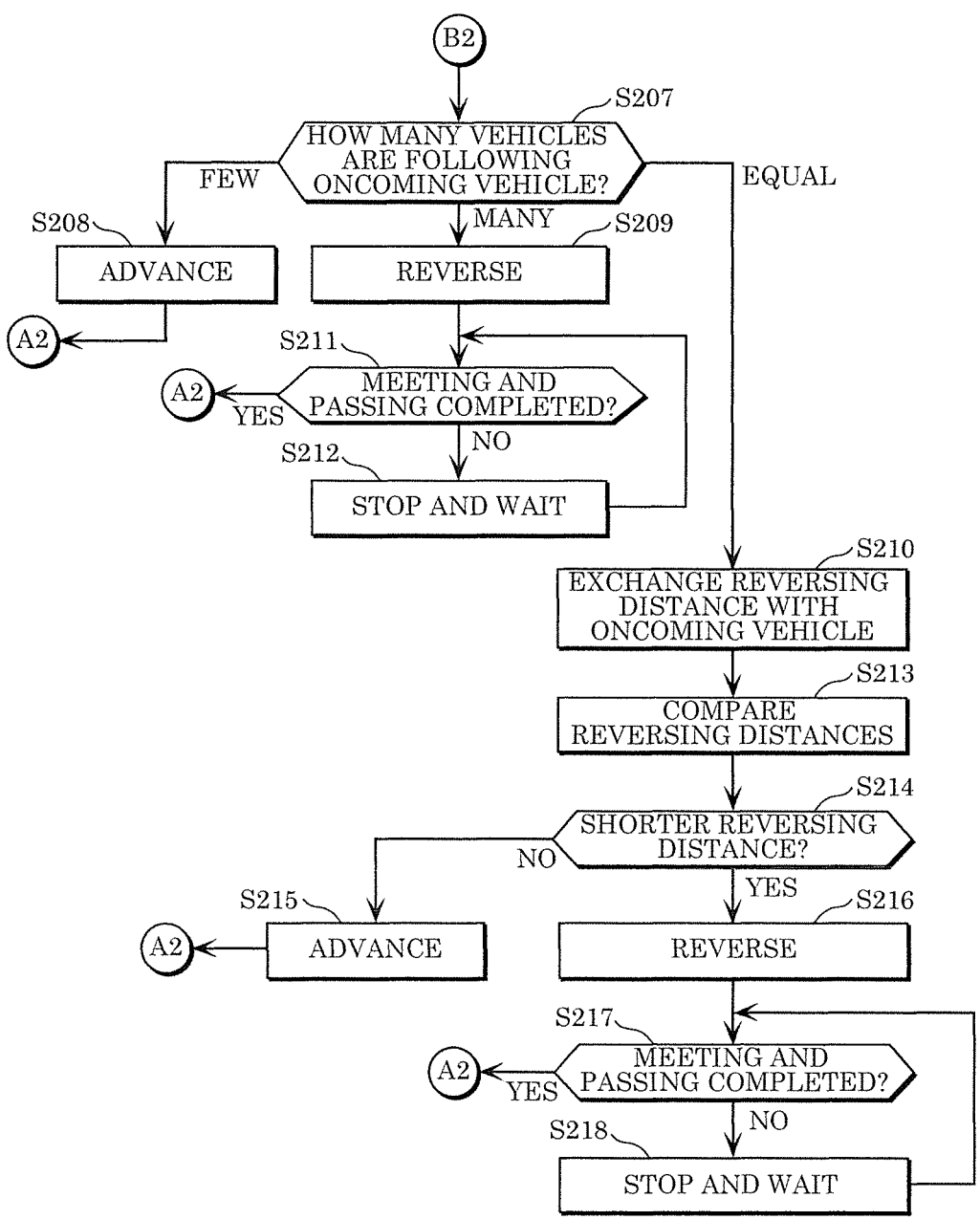
FIG. 5B is a flowchart illustrating one example of a flow of operations of an information processing device according to Embodiment 2.

Operations of information processing device 200 according to Embodiment 2 will be described with reference to FIG. 5A and FIG. 5B. Furthermore, using an example in FIG. 6A and FIG. 6B, the following description is given assuming that a vehicle following vehicle A1, another vehicle facing vehicle A1, and a vehicle following the other vehicle are also capable of autonomous driving and an information processing device substantially the same as that mounted on vehicle A1 is mounted on each of these vehicles. Note that FIG. 5A and FIG. 5B are flowcharts illustrating one example of a flow of the operations of information processing device 200 according to Embodiment 2. FIG. 6A is a schematic diagram illustrating one example of a head-on approach between vehicles according to Embodiment 2. FIG. 6B is a schematic diagram illustrating one example of operations of a vehicle for resolving a head-on approach according to Embodiment 2.

As illustrated in FIG. 5A and FIG. 5B, autonomous driving control device 6 and information processing device 200 of vehicle A1 perform the processes in Steps S101 to S107 as with information processing device 100 according to Embodiment 1. In Step S107, when vehicle A1 and another vehicle are not approaching head-on (NO in Step S107), determiner 107 returns to Step S101, and when these vehicles are approaching head-on (YES in Step S107), determiner 107 outputs the determination result to reversing vehicle count obtainer 212 and proceeds to Step S201.

In Step S201, reversing vehicle count obtainer 212 detects a vehicle around vehicle A1. Specifically, reversing vehicle count obtainer 212 performs trial communication with a vehicle in the inter-vehicle communication area via communicator 102 and inter-vehicle communication device 1.

Next, in Step S202, when there is a reply from a vehicle, reversing vehicle count obtainer 212 determines that there is a vehicle nearby, and the processing proceeds to Step S203 (YES in Step S202). When there is no reply from a vehicle, reversing vehicle count obtainer 212 determines that there is no vehicle nearby, and the processing proceeds to Step S205 (NO in Step S202).

In Step S203, reversing vehicle count obtainer 212 requests, via inter-vehicle communication device 1 and the like, a vehicle around vehicle A1 to transmit the number of vehicles following said vehicle and the position of said vehicle. The vehicle around vehicle A1 may obtain the number of following vehicles by performing substantially the same processes as the processes in Steps S201 to S204.

Next, in Step S204, reversing vehicle count obtainer 212 calculates the number of vehicles following vehicle A1. Specifically, reversing vehicle count obtainer 212 specifies a vehicle following vehicle A1 in the direction of travel of vehicle A1 on the basis of the position of each nearby vehicle obtained from the vehicle. Furthermore, reversing vehicle count obtainer 212 calculates the number of vehicles following vehicle A1 from the number of vehicles following the specified vehicle. The nearby vehicle transmits the number of vehicles following the vehicle to reversing vehicle count obtainer 212, but may also transmit the position of each of the following vehicles.

Reversing vehicle count obtainer 212 may regard, as vehicles following vehicle A1, vehicles following all the specified vehicles, or may regard, as vehicles following vehicle A1, following vehicles obtained from all the vehicles among the specified vehicles that are located within a first predetermined distance from vehicle A1, or may regard, as vehicles following vehicle A1, all the following vehicles among vehicles following all the specified vehicles that are located within a second predetermined distance from vehicle A1.

Note that the following vehicle may be a vehicle not in motion following a vehicle, or may be a vehicle traveling following a vehicle, or may be either of these vehicles. When the following vehicle is a vehicle traveling following a vehicle, the first predetermined distance and the second predetermined distance may be changed according to the speed of the following vehicle. For example, the first predetermined distance and the second predetermined distance may be set greater as the speed of the following vehicle increases. The speed of the following vehicle may be obtained together with the number of following vehicles. Furthermore, in the case where vehicle A1 reverses in order to resolve a head-on approach, reversing vehicle count obtainer 212 predicts a vehicle among vehicles following all the specified vehicles that will join a train of vehicles following vehicle A1, that is, a group of following vehicles, and stop until the reversing of vehicle A1 is completed, and determines the predicted vehicle as a vehicle following vehicle A1.

Next, in Step S205, reversing vehicle count obtainer 212 transmits, via inter-vehicle communication device 1 and the like, the number of vehicles following vehicle A1 to vehicle B1 approaching head-on vehicle A1, as illustrated in the example in FIG. 6A. Furthermore, reversing vehicle count obtainer 212 requests, via inter-vehicle communication device 1 and the like, vehicle B1 to transmit the number of vehicles following vehicle B1. For example, reversing vehicle count obtainer 212 transmits the number of vehicles "M" following vehicle A1 to vehicle B1, and receives, from vehicle B1, the number of vehicles "N" following vehicle B1. The number of vehicles "M" includes vehicle A1 and, in the case of FIG. 6A, is "1" which is vehicle A1 only. The number of vehicles "N" is the number of vehicles including vehicle B1 and, in the case of FIG. 6B, is "2" which is vehicle B1 and following vehicle B2.

Next, in Step S206, generator 109 obtains, from reversing vehicle count obtainer 212, the number of vehicles following vehicle A1 and the number of vehicles following vehicle B1, and compares these numbers of vehicles. Furthermore, in Step S207, when the number of vehicles following vehicle B1 which is an oncoming vehicle is less than the number of vehicles following vehicle A1, generator 109 proceeds to Step S208, and when the number of vehicles following vehicle B1 is greater than the number of vehicles following vehicle A1, generator 109 proceeds to Step S209, and when the numbers of vehicles following vehicles A1 and B1 are equal, generator 109 proceeds to Step S210.

In Step S208, as in Step S112 in Embodiment 1, generator 109 generates travel control information for causing vehicle A1 to advance, and outputs the travel control information to outputter 110, and outputter 110 outputs the travel control information to autonomous driving control device 6 and returns to Step S101. The travel control information includes information of inter-vehicle distance Ds between vehicles A1 and B1. Moreover, generator 109 generates a command including travel control information for causing a vehicle following vehicle A1 to advance as with vehicle A1, and transmits the command to the vehicle following vehicle A1. In addition, generator 109 may generate a command including travel control information for causing vehicle B1 to reverse, and transmit the command to vehicle B1. With this, vehicle B1 and a vehicle following vehicle B1 reverse together, and vehicle A1 and a vehicle following vehicle A1 advance together while maintaining inter-vehicle distance Ds between vehicles A1 and B1.

In Step S209, as in Step S111 in Embodiment 1, generator 109 generates travel control information for causing vehicle A1 to reverse, and outputs the travel control information to outputter 110, and outputter 110 outputs the travel control information to autonomous driving control device 6 and proceeds to Step S211. Moreover, generator 109 generates a command including travel control information for causing a vehicle following vehicle A1 to reverse as with vehicle A1, and transmits the command to the vehicle following vehicle A1. In addition, generator 109 may generate a command including travel control information for causing vehicle B1 to advance. The travel control information includes information of inter-vehicle distance Ds between vehicles A1 and B1. With this, as illustrated in the example in FIG. 6B, vehicle A1 and a vehicle following vehicle A1 reverse together, and vehicle B1 and a vehicle following vehicle B1 advance together while maintaining inter-vehicle distance Ds between vehicles A1 and B1. Vehicle B1 may perform the process of advancing on the basis of self-judgement without obtaining the command from vehicle A1.

Next, in Step S211, as in Step S113 in Embodiment 1, information processing device 200 determines whether or not meeting and passing of vehicles A1 and B1 have completed. The situation in which meeting and passing of vehicles A1 and B1 have completed is a situation in which the meeting point is located in a meeting and passing section beyond end position PA, a situation in which vehicles A1 and B1 do not face each other, or a situation in which vehicle A1, a vehicle following vehicle A1, vehicle B1, and a vehicle following vehicle B1 are located in the meeting and passing section.

Next, in Step S212, as in Step S114 in Embodiment 1, autonomous driving control device 6 causes vehicle A1 and a vehicle following vehicle A1 to wait in the state of not being in motion, and the processing proceeds to Step S117. In other words, vehicle A1 and a vehicle following vehicle A1 reverse, and after the reversing is completed, wait until meeting and passing are completed.

Furthermore, in Step S210, as in Step S108 in Embodiment 1, reversing distance obtainer 108 specifies the meeting and passing section closest to vehicle A1 with reference to the information of the meeting and passing section in storage 111. Moreover, reversing distance obtainer 108 calculates the reversing distance of vehicle A1 which is the distance between vehicle A1 and the end position of the meeting and passing section, and transmits the reversing distance to vehicle B1. In addition, reversing distance obtainer 108 receives, from vehicle B1, the reversing distance of vehicle B1.

The processes in subsequent Steps S213 to S218 are substantially the same as the processes in Steps S109 to S114 in Embodiment 1, respectively.

2-3. Operations of Following Vehicle

Figure 7:
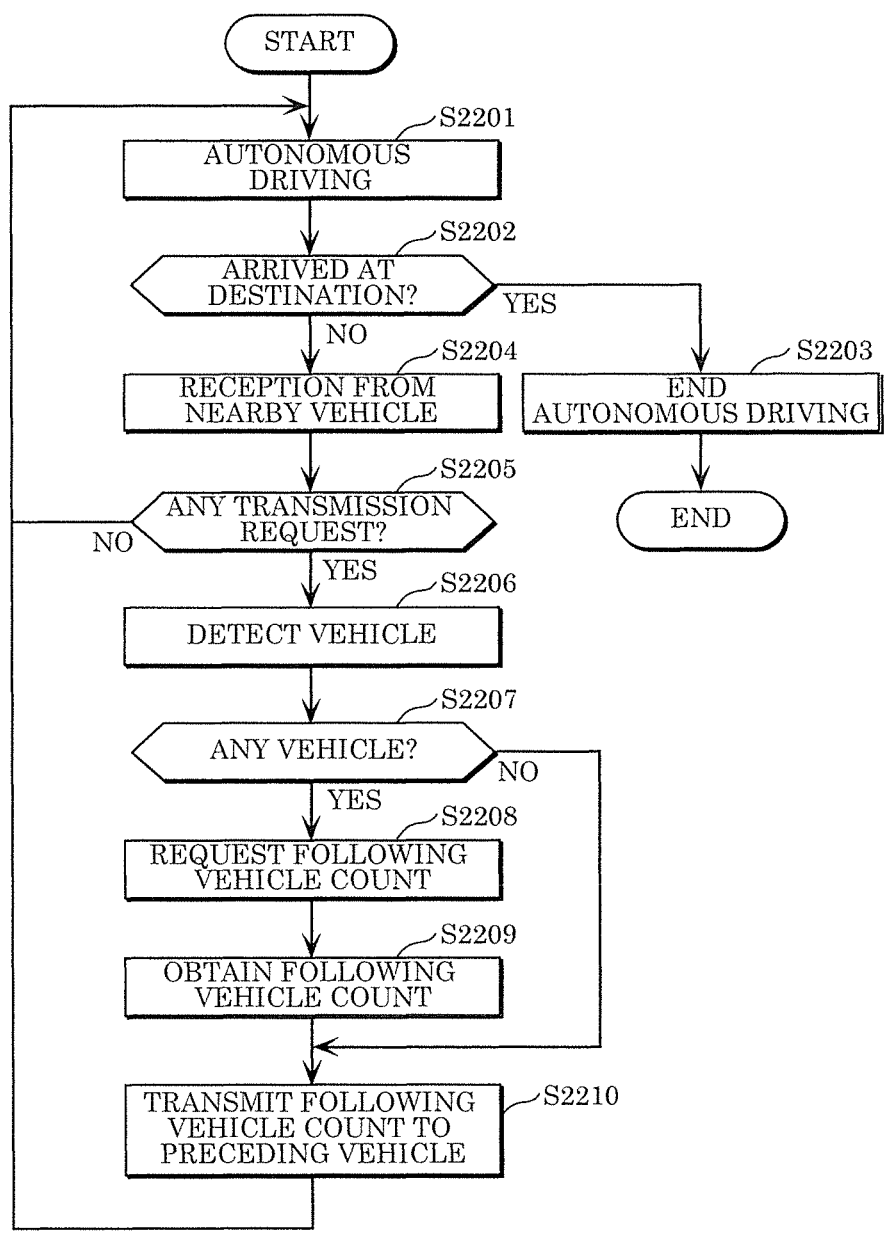
FIG. 7 is a flowchart illustrating one example of a flow of operations of an information processing device of a following vehicle according to Embodiment 2.

Operations of the information processing devices of vehicles following vehicles A1 and B1 will be described with reference to FIG. 7. FIG. 7 is a flowchart illustrating one example of a flow of the operations of the information processing device of a following vehicle according to Embodiment 2. Hereinafter, an example process of vehicle Ak following vehicle A1 (k=2, . . . , M) will be described; the process of a vehicle following vehicle B1 is substantially the same as following vehicle Ak, and thus description thereof will be omitted. As illustrated in FIG. 7, the information processing device of following vehicle Ak performs the processes in Steps S2201 to S2203 in substantially the same manner as in Steps S101 to S103 for information processing device 100 according to Embodiment 1.

In Step S2204, the information processing device of following vehicle Ak receives the inter-vehicle communication from a nearby vehicle in the inter-vehicle communication area. Next, in Step S2205, the information processing device of following vehicle Ak determines whether or not a request for the number of vehicles following vehicle Ak has been received from a nearby vehicle. The information processing device proceeds to Step S2206 when the request has been received (YES in Step S2205), and returns to Step S2201 when the request has not been received (NO in Step S2205).

In Step S2206, as in Step S201 in Embodiment 2, the information processing device of following vehicle Ak detects a vehicle around following vehicle Ak. Specifically, the information processing device performs trial inter-vehicle communication with a vehicle in the inter-vehicle communication area. Furthermore, in Step S2207, as in Step S202 in Embodiment 2, when there is a reply from a vehicle, the information processing device of following vehicle Ak determines that there is a vehicle nearby, and the processing proceeds to Step S2208 (YES in Step S2207). When there is no reply from a vehicle, the information processing device determines that there is no vehicle nearby, and the processing proceeds to Step S2210 (NO in Step S2207).

In Step S2208, as in Step S203 in Embodiment 2, the information processing device of following vehicle Ak requests, via the inter-vehicle communication, the nearby vehicle to transmit the number of vehicles following the vehicle and the position of vehicle.

Next, in Step S2209, as in Step S204 in Embodiment 2, the information processing device of following vehicle Ak calculates the number of following vehicles Ak. Specifically, the information processing device of following vehicle Ak specifies a vehicle following vehicle Ak on the basis of the position of each nearby vehicle obtained from the vehicle, and calculates the number of vehicles following vehicles Ak from the number of vehicles following the specified vehicle.

Next, in Step S2210, as in Step S205 in Embodiment 2, the information processing device of following vehicle Ak transmits, via the inter-vehicle communication, the number of following vehicles to nearby vehicles including a vehicle ahead of following vehicle Ak.

2-4. Advantageous Effects

As described above, when information processing device 200 according to Embodiment 2 mounted on at least one of two vehicles detects head-on approach between the two vehicles, one of the vehicles which is followed by a smaller number of vehicles is forced to reverse, and the other vehicle which is followed by a larger number of vehicles is allowed to advance so that these two vehicles and vehicles following these two vehicles meet and pass in the meeting and passing section. Furthermore, when the two vehicles are followed by the same number of vehicles, information processing device 200 performs substantially the same processing as that in Embodiment 1 in which one of the vehicles closer to the meeting and passing section is forced to reverse, and thus these two vehicles and vehicles following these two vehicles meet and pass in the meeting and passing section.

Furthermore, information processing device 200 according to Embodiment 2 is mounted, for example, on vehicle A1 which is the first vehicle. In such information processing device 200, generator 209 compares the number of vehicles following vehicle A1 and the number of vehicles following vehicle B1, and generates, according to the comparison result, the travel control information for causing vehicle A1 to advance or reverse. With the above-described configuration, when two vehicles A1 and B1 face each other (in other words, two vehicles A1 and B1 are approaching head-on) in an area other than a section in which vehicles can pass each other, the travel of vehicle A1 is controlled according to the numbers of vehicles following two vehicles A1 and B1. In this way, unlike the related art, advancing or reversing of each of vehicles A1 and B1 approaching head-on is determined according to the number of vehicles that are to be actually forced to move. With this, the number of vehicles that are forced to move to resolve the head-on approach between vehicles A1 and B1 can be optimized. Thus, it is possible to efficiently resolve a head-on approach between vehicles A1 and B1.

Furthermore, in information processing device 200 according to Embodiment 2, when the number of vehicles following vehicle A1 and the number of vehicles following vehicle B1 are equal, generator 209 compares the first distance and the second distance and generates, according to the comparison result, the travel control information for causing vehicle A1 to advance or reverse. Note that the first distance is the distance between the meeting point and a meeting and passing section before the meeting point in the direction of travel of vehicle A1, and the second distance is the distance between the meeting point and a meeting and passing section before the meeting point in the direction of travel of vehicle B1. With the above-described configuration, even when the number of vehicles that are forced to move is equal, advancing or reversing of vehicle A1 can be determined.

Embodiment 3

Information processing device 300 according to Embodiment 3 will be described. Information processing device 200 according to Embodiment 2 determines a vehicle that is to reverse, on the basis of the numbers of vehicles following two vehicles approaching head-on. Information processing device 300 according to Embodiment 3 determines a vehicle that is to reverse, on the basis of the reversing distances between two vehicles approaching head-on and the meeting and passing sections closest thereto and the numbers of vehicles following the two vehicles approaching head-on. The following description of Embodiment 3 will focus on differences from Embodiments 1 and 2.

3-1. Configuration of Information Processing Device

Figure 8:
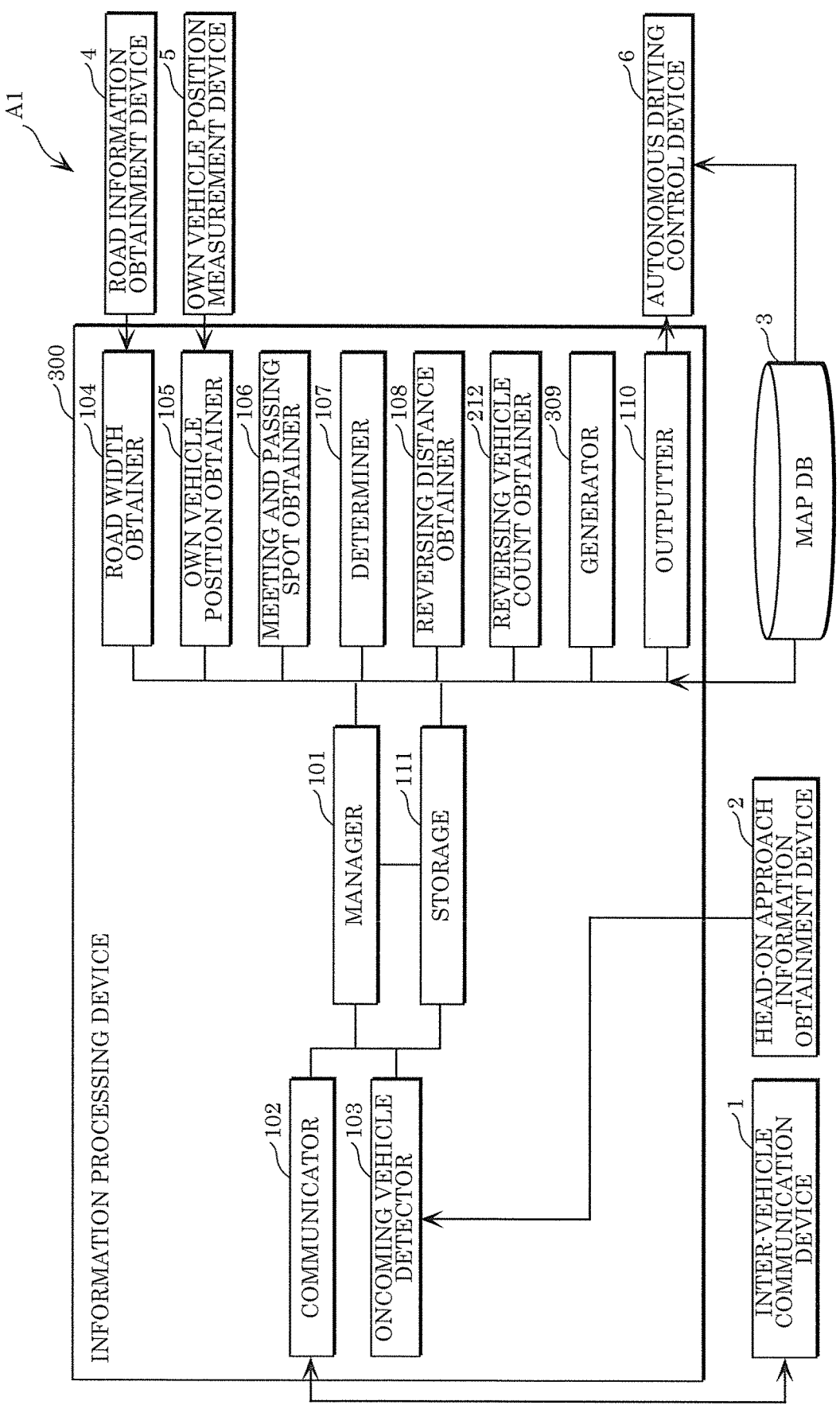
FIG. 8 is a block diagram illustrating one example of a functional configuration of a vehicle including an information processing device according to Embodiment 3.

Information processing device 300 and peripheral elements thereof according to Embodiment 3 will be described. FIG. 8 is a block diagram illustrating one example of a functional configuration of vehicle A1 including information processing device 300 according to Embodiment 3. As illustrated in FIG. 8, vehicle A1 includes inter-vehicle communication device 1, head-on approach information obtainment device 2, map DB 3, road information obtainment device 4, own vehicle position measurement device 5, autonomous driving control device 6, and information processing device 300. Information processing device 300 includes, as in Embodiment 2, manager 101, communicator 102, oncoming vehicle detector 103, road width obtainer 104, own vehicle position obtainer 105, meeting and passing spot obtainer 106, determiner 107, reversing distance obtainer 108, outputter 110, storage 111, and reversing vehicle count obtainer 212. Furthermore, information processing device 300 includes generator 309.

Generator 309 obtains the reversing distance of vehicle A1 from reversing distance obtainer 108, and obtains the reversing distance from another vehicle approaching head-on vehicle A1. Furthermore, generator 309 obtains the number of vehicles following vehicle A1 from reversing vehicle count obtainer 212, and obtains the number of vehicles following the other vehicle approaching head-on vehicle A1 from the other vehicle. Subsequently, generator 309 performs comparison based on the reversing distance of vehicle A1, the reversing distance of the other vehicle, the number of vehicles following vehicle A1, and the number of vehicles following the other vehicle, and generates, according to the comparison result, travel control information for causing vehicle A1 to advance or reverse. Specifically, generator 109 uses, as the above-mentioned comparison, comparison between a first product which is the product of the reversing distance of vehicle A1 and the number of vehicles following vehicle A1 and the second product which is the product of the reversing distance of another vehicle and the number of vehicles following the other vehicle. When the first product is less than the second product, generator 309 generates the travel control information for causing vehicle A1 to reverse. When the first product is greater than the second product, generator 309 generates the travel control information for causing vehicle A1 to advance. When the first product and the second product are equal, generator 309 generates the travel control information based on the reversing distance, as in Embodiment 1. Generator 309 outputs the travel control information to outputter 110.

The configurations of vehicle A1 and the other structural elements of information processing device 300 are substantially the same as those in Embodiment 2, and thus description thereof will be omitted.

3-2. Operations of Information Processing Device

Figure 9A:
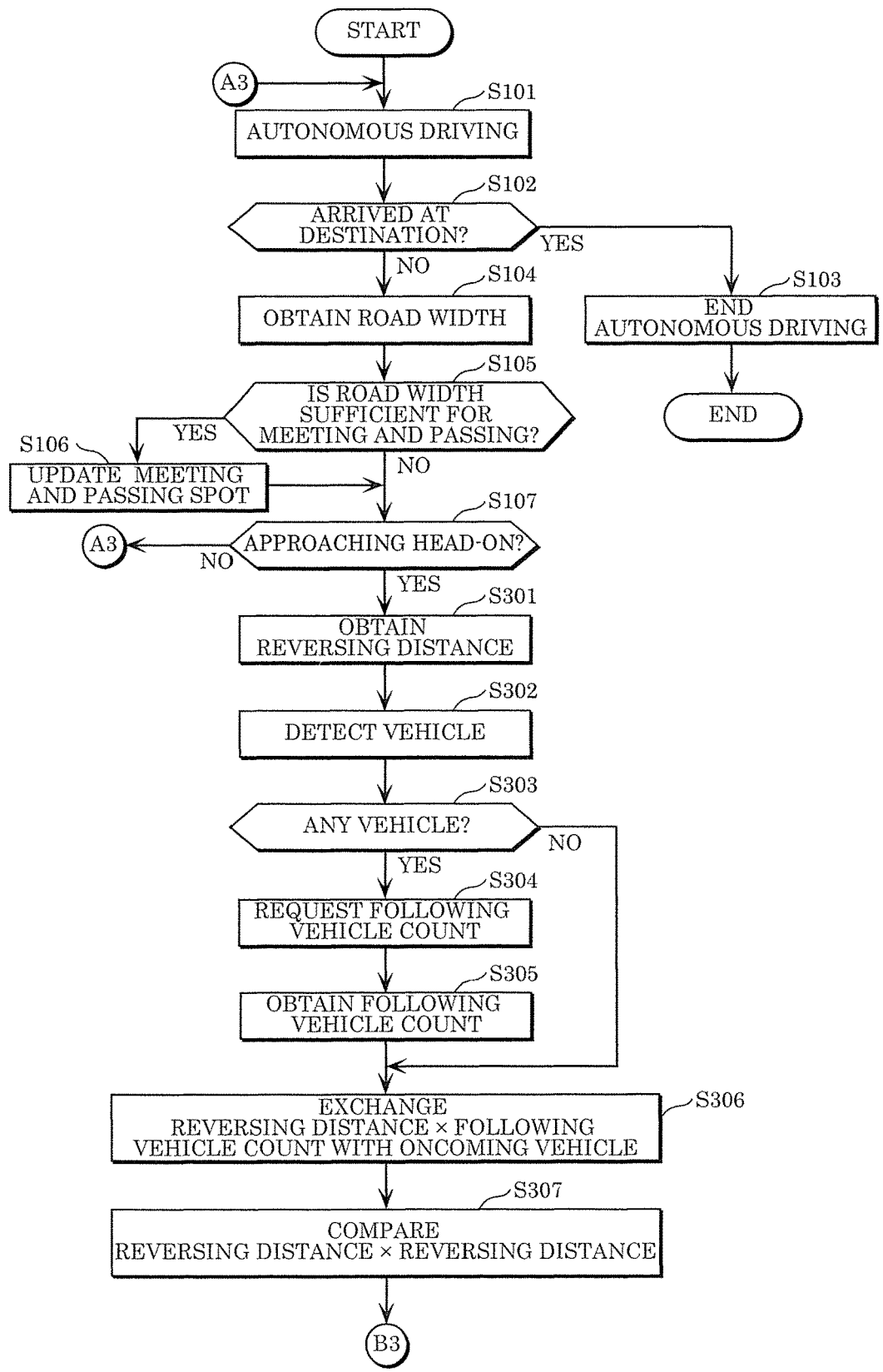
FIG. 9A is a flowchart illustrating one example of a flow of operations of an information processing device according to Embodiment 3.
Figure 9B:
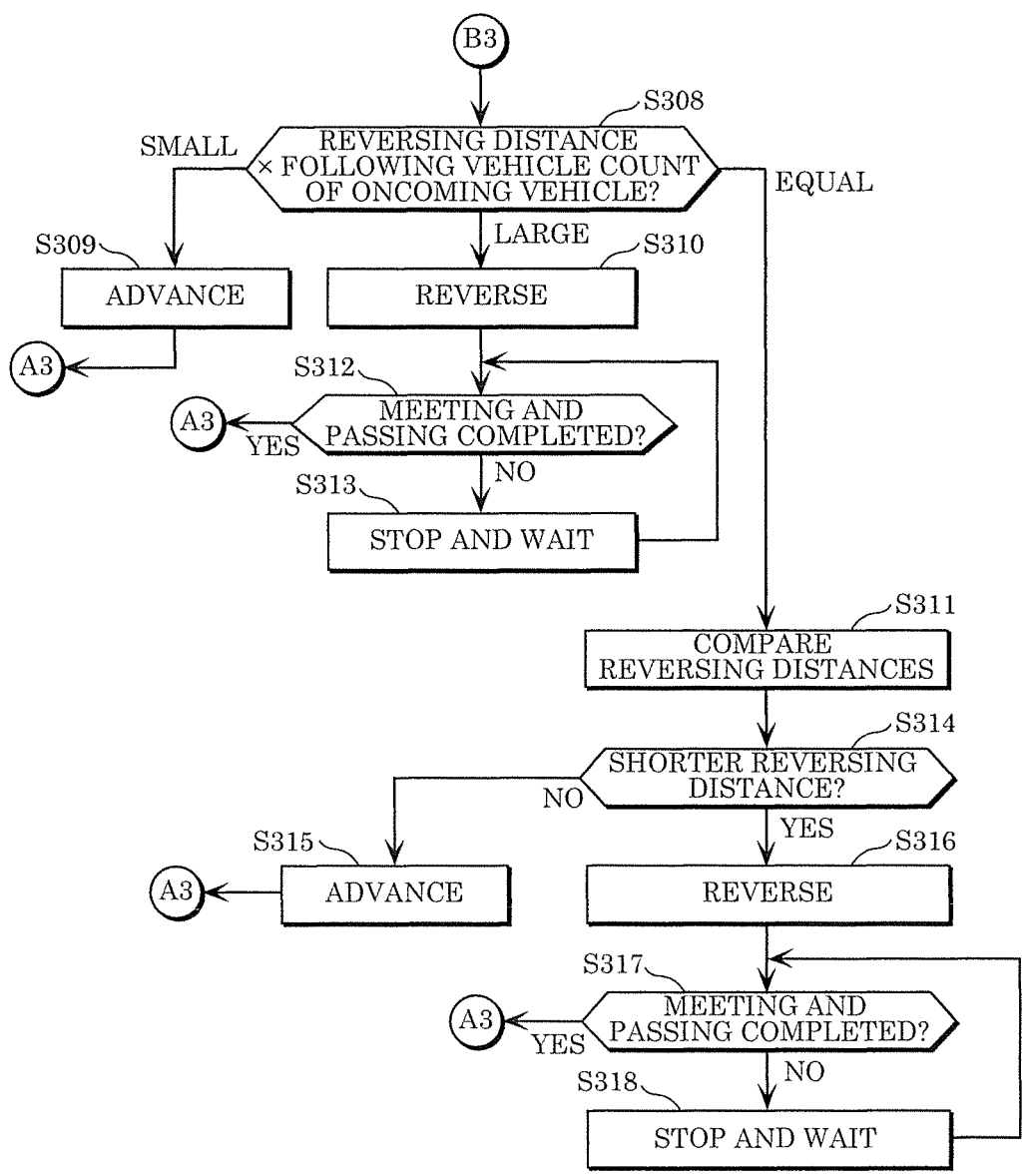
FIG. 9B is a flowchart illustrating one example of a flow of operations of an information processing device according to Embodiment 3.
Figure 10A:
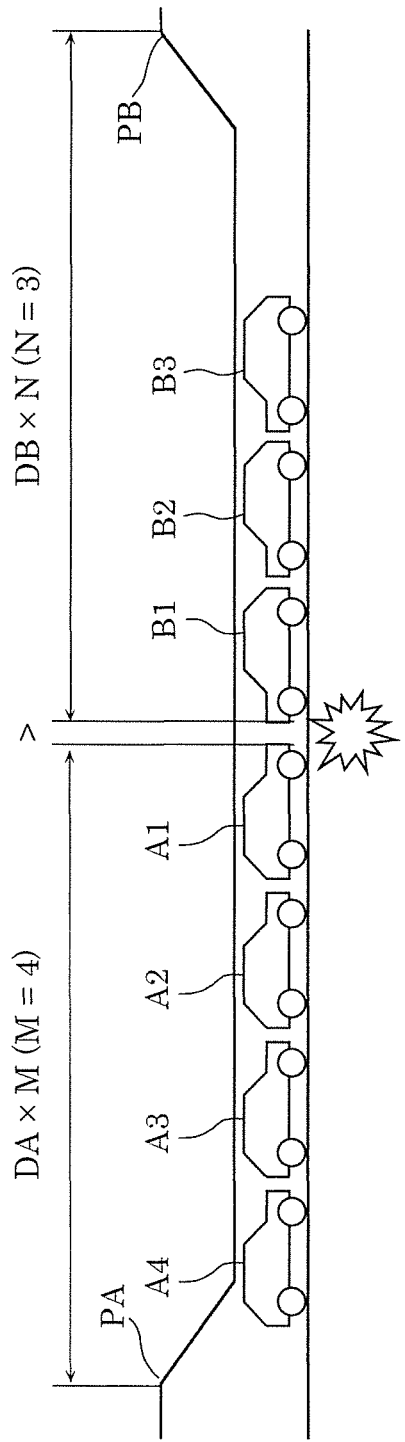
FIG. 10A is a schematic diagram illustrating one example of a head-on approach between vehicles according to Embodiment 3.
Figure 10B:
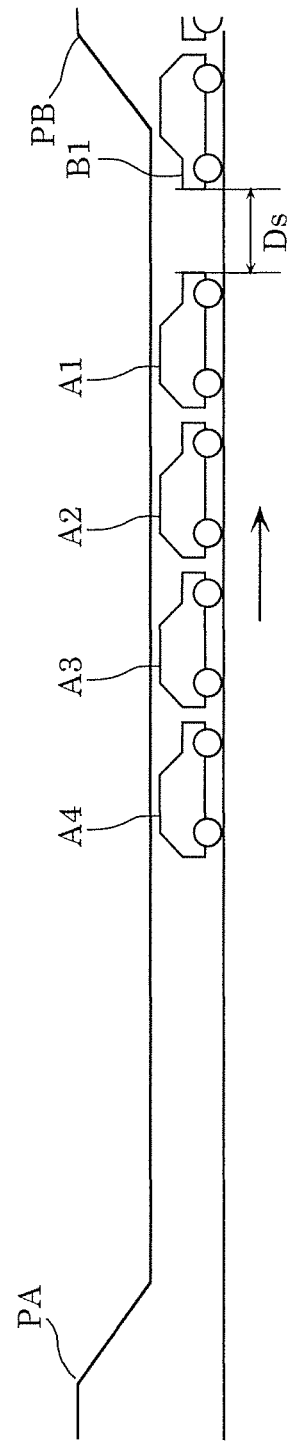
FIG. 10B is a schematic diagram illustrating one example of operations of a vehicle for resolving a head-on approach according to Embodiment 3.

Operations of information processing device 300 according to Embodiment 3 will be described with reference to FIG. 9A and FIG. 9B. Furthermore, using an example in FIG. 10A and FIG. 10B, the following description is given assuming that a vehicle following vehicle A1, another vehicle facing vehicle A1, and a vehicle following the other vehicle are also capable of autonomous driving and an information processing device substantially the same as that mounted on vehicle A1 is mounted on each of these vehicles. Note that FIG. 9A and FIG. 9B are flowcharts illustrating one example of a flow of the operations of information processing device 300 according to Embodiment 3. FIG. 10A is a schematic diagram illustrating one example of a head-on approach between vehicles according to Embodiment 3. FIG. 10B is a schematic diagram illustrating one example of operations of a vehicle for resolving a head-on approach according to Embodiment 3.

As illustrated in FIG. 9A and FIG. 9B, autonomous driving control device 6 and information processing device 300 of vehicle A1 perform the processes in Steps S101 to S107 as with information processing device 100 according to Embodiment 1. In Step S107, when vehicle A1 and another vehicle are not approaching head-on (NO in Step S107), determiner 107 returns to Step S101, and when these vehicles are approaching head-on (YES in Step S107), determiner 107 outputs the determination result to reversing distance obtainer 108 and reversing vehicle count obtainer 212 and proceeds to Step S301.

In Step S301, as in Step S108 in Embodiment 1, with reference to the information of the meeting and passing section in storage 111, reversing distance obtainer 108 specifies the meeting and passing section closest to vehicle A1 approaching head-on vehicle B1, as illustrated in FIG. 10A. Furthermore, reversing distance obtainer 108 detects end position PA of the specified meeting and passing section. Moreover, reversing distance obtainer 108 calculates distance DA between vehicle A1 and end position PA of the meeting and passing section as the reversing distance of vehicle A1, and outputs distance DA to generator 309. Distance DA is the distance from the meeting point for vehicles A1 and B1 to end position PA.

Next, in Steps S302 to S305, reversing vehicle count obtainer 212 performs substantially the same processes in Steps S201 to S204 in Embodiment 2, respectively. By doing so, reversing vehicle count obtainer 212 calculates the number of vehicles following vehicle A1 and outputs the number of vehicles following vehicle A1 to generator 309. For example, as illustrated in the example in FIG. 10A, reversing vehicle count obtainer 212 outputs the number "M (M=4)" of vehicles A1 to A4 following vehicle A1.

Next, in Step S306, generator 309 calculates the first product which is the product of the reversing distance of vehicle A1 and the number of vehicles following vehicle A1. Furthermore, generator 309 transmits, via inter-vehicle communication device 1 and the like, the first product to vehicle B1 approaching head-on vehicle A1. Moreover, generator 309 requests, via inter-vehicle communication device 1 and the like, vehicle B1 to transmit the second product which is the product of the reversing distance of vehicle B1 and the number of vehicles following vehicle B1. For example, as illustrated in the example in FIG. 10A, generator 309 transmits the first product "DA×M" to vehicle B1, and receives the second product "DB×N" from vehicle B1. "DB" is the reversing distance of vehicle B1, and "N" is the number of vehicles B1 to B3 following vehicle B1.

Next, in Step S307, generator 309 compares the first product and the second product. Furthermore, in Step S308, when the second product of vehicle B1 which is an oncoming vehicle is less than the first product of vehicle A1, generator 309 proceeds to Step S309. When the second product is greater than the first product, generator 309 proceeds to Step S310. When the first product and the second product are equal, generator 309 proceeds to Step S311.

In Step S309, generator 309 performs substantially the same process in Step S208 in Embodiment 2. With this, as illustrated in the example in FIG. 10B, vehicles B1 to B3 reverse together, and vehicles A1 to A4 advance together while maintaining inter-vehicle distance Ds between vehicles A1 and B1.

In Steps S310, S312, and S313, generator 309 performs substantially the same processes in Steps S209, S211, and S212 in Embodiment 2, respectively. In Step S310, vehicles A1 to A4 reverse together, and vehicles B1 to B3 advance together while maintaining inter-vehicle distance Ds between vehicles A1 and B1.

In Step S311, as in Step S213 in Embodiment 2, generator 309 compares reversing distance DA of vehicle A1 and reversing distance DB of vehicle B1. Generator 309 proceeds to Step S316 when reversing distance DA of vehicle A1 is determined as being less than reversing distance DB of vehicle B1 (YES in Step S314), and proceeds to Step S315 when reversing distance DA of vehicle A1 is determined otherwise (NO in Step S314).

In Steps S315 to S318, generator 309 performs substantially the same processes in Steps S215 to S218 in Embodiment 2.

3-3. Advantageous Effects

As described above, when information processing device 300 according to Embodiment 3 mounted on at least one of two vehicles detects head-on approach between vehicle A1 and vehicle B1, one of the vehicles featuring that the product of the reversing distance to the closest meeting and passing section and the number of following vehicles is smaller is forced to reverse, and the other vehicle featuring that said product is larger is allowed to advance so that two vehicles A1 and B1 and the vehicles following two vehicles A1 and B1 meet and pass in the meeting and passing section. Furthermore, when the above products are equal, information processing device 300 performs substantially the same processing as that in Embodiment 1 in which one of the vehicles closer to the meeting and passing section is forced to reverse, and thus two vehicles A1 and B1 and vehicles following two vehicles A1 and B1 meet and pass in the meeting and passing section. Note that operations of following vehicles in Embodiment 3 are substantially the same as those in Embodiment 2.

Furthermore, information processing device 300 according to Embodiment 3 is mounted, for example, on vehicle A1 which is the first vehicle. In such information processing device 300, generator 309 performs comparison based on the first distance, the number of vehicles following vehicle A1, the second distance, and the number of vehicles following vehicle B1, and generates the travel control information according to the comparison result. Note that the first distance is the distance between the meeting point and a meeting and passing section before the meeting point in the direction of travel of vehicle A1, and the second distance is the distance between the meeting point and a meeting and passing section before the meeting point in the direction of travel of vehicle B1.

With the above-described configuration, the travel of vehicle A1 is controlled according to not only the distance of movement of a vehicle, but also the number of vehicles that are forced to move. With this, the number of vehicles that are moving to resolve the head-on approach between vehicles A1 and B1 can be optimized. In other words, resolving a head-on approach in consideration of the situation of following vehicles becomes possible. Furthermore, since elements that are taken into consideration to resolve a head-on approach increase, increased types of head-on approaches can be efficiently handled.

Furthermore, in information processing device 300 according to Embodiment 3, generator 309 compares the product of the first distance and the number of vehicles following vehicle A1 and the product of the second distance and the number of vehicles following vehicle B1, and generates the travel control information according to the comparison result. With the above-described configuration, the travel of vehicle A1 is controlled according to the simulated movement amount of a group of vehicles that are forced to move. With this, the amount of movement of vehicles for resolving the head-on approach between vehicles A1 and B1 can be optimized to some extent. In other words, resolving a head-on approach in consideration of the distance of movement for resolving a head-on approach and the situation of following vehicles becomes possible. Furthermore, increased types of head-on approaches can be efficiently handled.

Embodiment 4

Information processing device 400 according to Embodiment 4 will be described. Information processing device 300 according to Embodiment 3 determines a vehicle that is to reverse, on the basis of the reversing distances between two vehicles approaching head-on and the meeting and passing sections closest thereto and the numbers of vehicles following the two vehicles approaching head-on. Information processing device 400 according to Embodiment 4 determines a vehicle that is to reverse, for the first vehicle and the second vehicle that are approaching head-on, on the basis of the sum of the reversing distances from the first vehicle and each vehicle following the first vehicle to the meeting and passing sections closest thereto and the sum of the reversing distances from the second vehicle and each vehicle following the second vehicle to the meeting and passing sections closest thereto. The following description of Embodiment 4 will focus on differences from Embodiments 1 to 3.

4-1. Configuration of Information Processing Device

Figure 11:
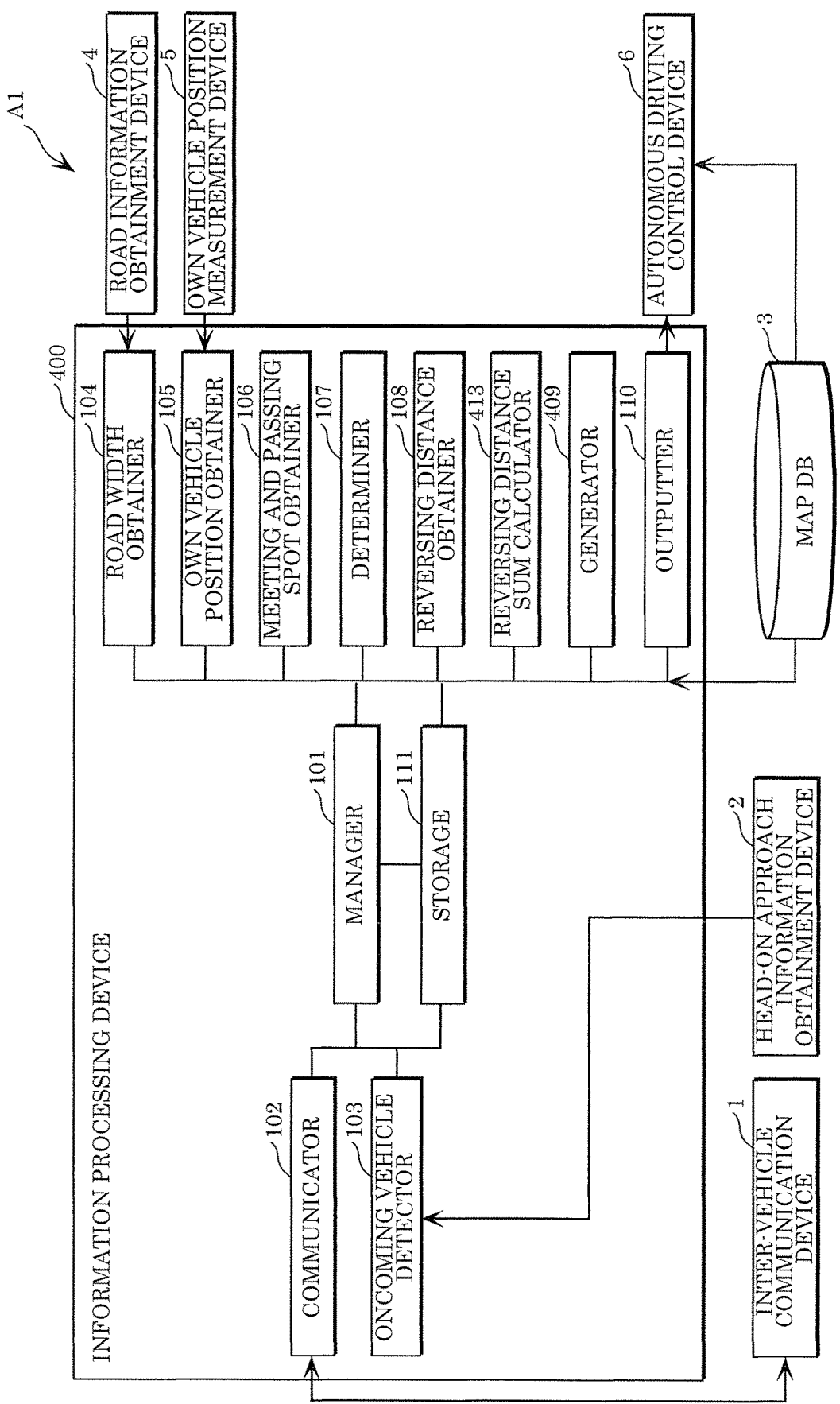
FIG. 11 is a block diagram illustrating one example of a functional configuration of a vehicle including an information processing device according to Embodiment 4.

Information processing device 400 and peripheral elements thereof according to Embodiment 4 will be described. FIG. 11 is a block diagram illustrating one example of a functional configuration of vehicle A1 including information processing device 400 according to Embodiment 4. As illustrated in FIG. 11, vehicle A1 includes inter-vehicle communication device 1, head-on approach information obtainment device 2, map DB 3, road information obtainment device 4, own vehicle position measurement device 5, autonomous driving control device 6, and information processing device 400. Information processing device 400 includes, as in Embodiment 3, manager 101, communicator 102, oncoming vehicle detector 103, road width obtainer 104, own vehicle position obtainer 105, meeting and passing spot obtainer 106, determiner 107, reversing distance obtainer 108, outputter 110, and storage 111. Furthermore, information processing device 400 includes generator 409 and reversing distance sum calculator 413.

Reversing distance sum calculator 413 obtains the sum of distances between (i) the meeting and passing section closest to the current position of vehicle A1 on the path on which vehicle A has traveled and (ii) vehicle A1 and vehicles following vehicle A1, that is, the sum of reversing distances of vehicle A1. In the present embodiment, the above distance is a physical distance such as the route length between the vehicle and the meeting and passing section. When reversing distance sum calculator 413 obtains the result of determining the head-on approach between vehicle A1 and another vehicle from determiner 107 and when reversing distance sum calculator 413 receives a request for a reversing distance sum from another vehicle approaching head-on vehicle A1, reversing distance sum calculator 413 calculates the reversing distance sum of vehicle A1. Here, reversing distance sum calculator 413 is one example of the calculator.

Specifically, reversing distance sum calculator 413 obtains, from storage 111, the end position of the meeting and passing section closest to the position of vehicle A1 on the path on which vehicle A1 has traveled. Reversing distance sum calculator 413 performs communication with a vehicle in the inter-vehicle communication area, and when there is a reply from the vehicle, transmits the end position to the vehicle. Furthermore, reversing distance sum calculator 413 requests the vehicle to transmit the position of the vehicle and a reversing distance sum which is the sum of distances between (i) the vehicle and vehicles following the vehicle and (ii) the end position. Reversing distance sum calculator 413 specifies the vehicles following vehicle A1 and the reversing distance sum of the vehicles using the position of each vehicle in the inter-vehicle communication area obtained from the vehicle. Reversing distance sum calculator 413 calculates the reversing distance sum of vehicle A1 by adding, to the reversing distance sum of the following vehicles, a reversing distance which is the distance between vehicle A1 and the end position.

Note that with the above-described configuration, the vehicles following vehicle A1 calculate the reversing distance sum of the vehicles and transmit the reversing distance sum to vehicle A1, but reversing distance sum calculator 413 of vehicle A1 may obtain the reversing distance sum of the following vehicles by calculating the distances between the vehicles following vehicle A1 and the end position and calculating the sum of the distances. In this case, reversing distance sum calculator 413 obtains, from a vehicle in the inter-vehicle communication area, the positions of the vehicle and vehicles following the vehicle. Furthermore, using the positions of the vehicle and the vehicles following the vehicle, reversing distance sum calculator 413 specifies the vehicles following vehicle A1 and the positions of the vehicles. Subsequently, reversing distance sum calculator 413 calculates the distances between the positions of vehicle A1 and the vehicles following vehicle A1 and the end position of the meeting and passing section, and calculates the sum of the distances as the reversing distance sum.

Furthermore, with the above-described configuration, the reversing distance sum is the sum of distances between (i) the positions of vehicle A1 and the vehicles following vehicle A1 and (ii) the end position of the meeting and passing section, but this is not limiting. For example, the reversing distance sum may be the sum of distances vehicle A1 and vehicles following vehicle A1 actually reverse in the meeting and passing section to resolve a head-on approach. In this case, each vehicle transmits the entire length of the vehicle to another vehicle via the inter-vehicle communication. Vehicle A1 and vehicles following vehicle A1 may each calculate the distance the vehicle actually reverses in the meeting and passing section by adding, to the distance between the vehicle and the end position, the entire length of each vehicle ahead of the vehicle.

Generator 409 obtains the reversing distance sum of vehicle A1 from reversing distance sum calculator 413. Furthermore, generator 409 obtains, from another vehicle approaching head-on vehicle A1, the reversing distance sum of the other vehicle via the inter-vehicle communication. Subsequently, generator 409 compares the reversing distance sum of vehicle A1 and the reversing distance sum of the other vehicle, and generates, according to the comparison result, travel control information for causing vehicle A1 to advance or reverse. Specifically, generator 409 generates the travel control information for causing vehicle A1 to reverse when the reversing distance sum of vehicle A1 is smaller. Generator 409 generates the travel control information for causing vehicle A1 to advance when the reversing distance sum of vehicle A1 is larger. When the reversing distance sum of A1 and the reversing distance sum of the other vehicle are equal, generator 409 generates the travel control information based on the reversing distances of vehicle A1 and the other vehicle, as in Embodiment 1. Generator 409 outputs the travel control information to outputter 110.

The configurations of vehicle A1 and the other structural elements of information processing device 400 are substantially the same as those in Embodiment 3, and thus description thereof will be omitted.

4-2. Operations of Information Processing Device

Figure 12A:
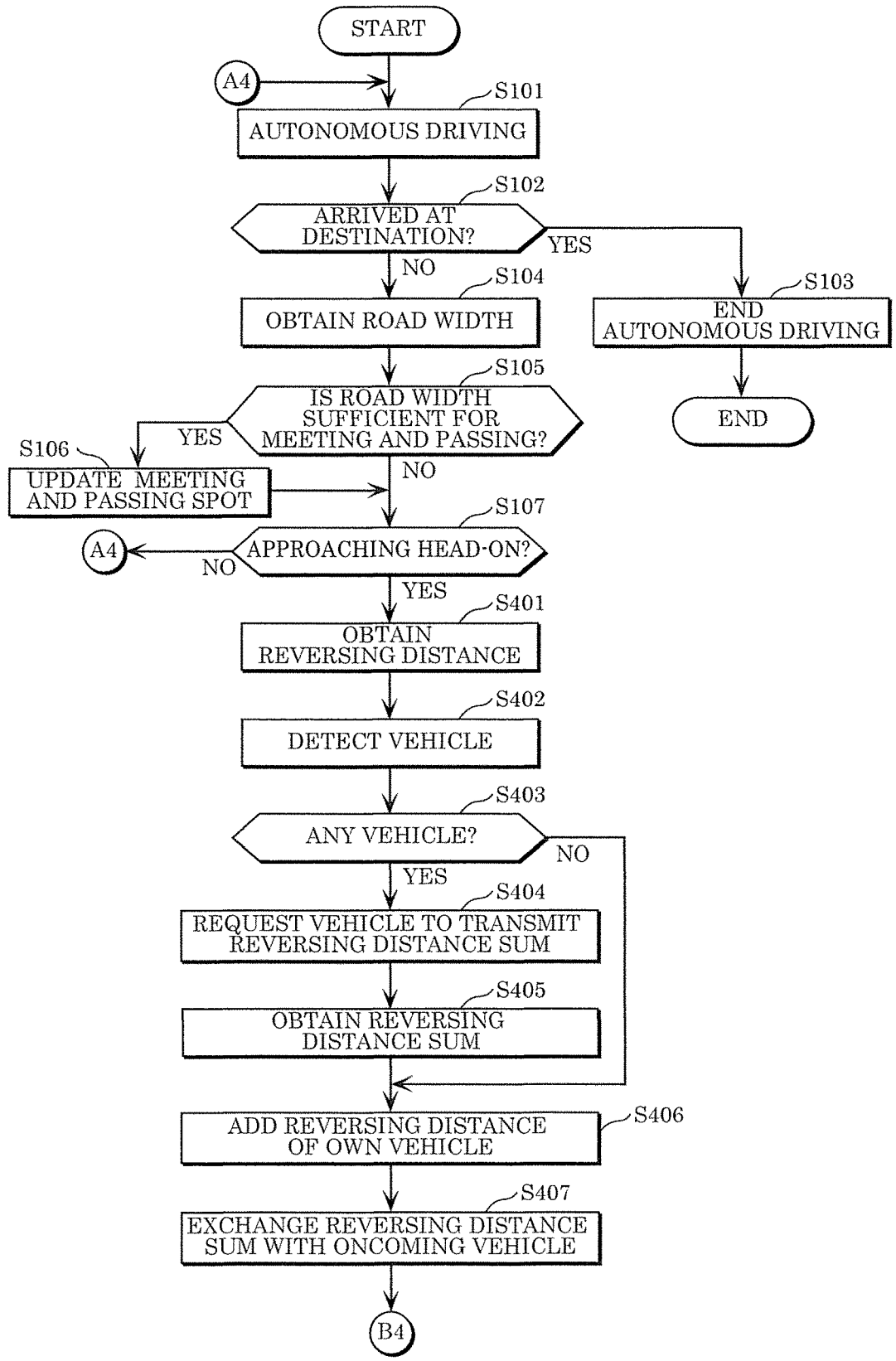
FIG. 12A is a flowchart illustrating one example of a flow of operations of an information processing device according to Embodiment 4.
Figure 12B:
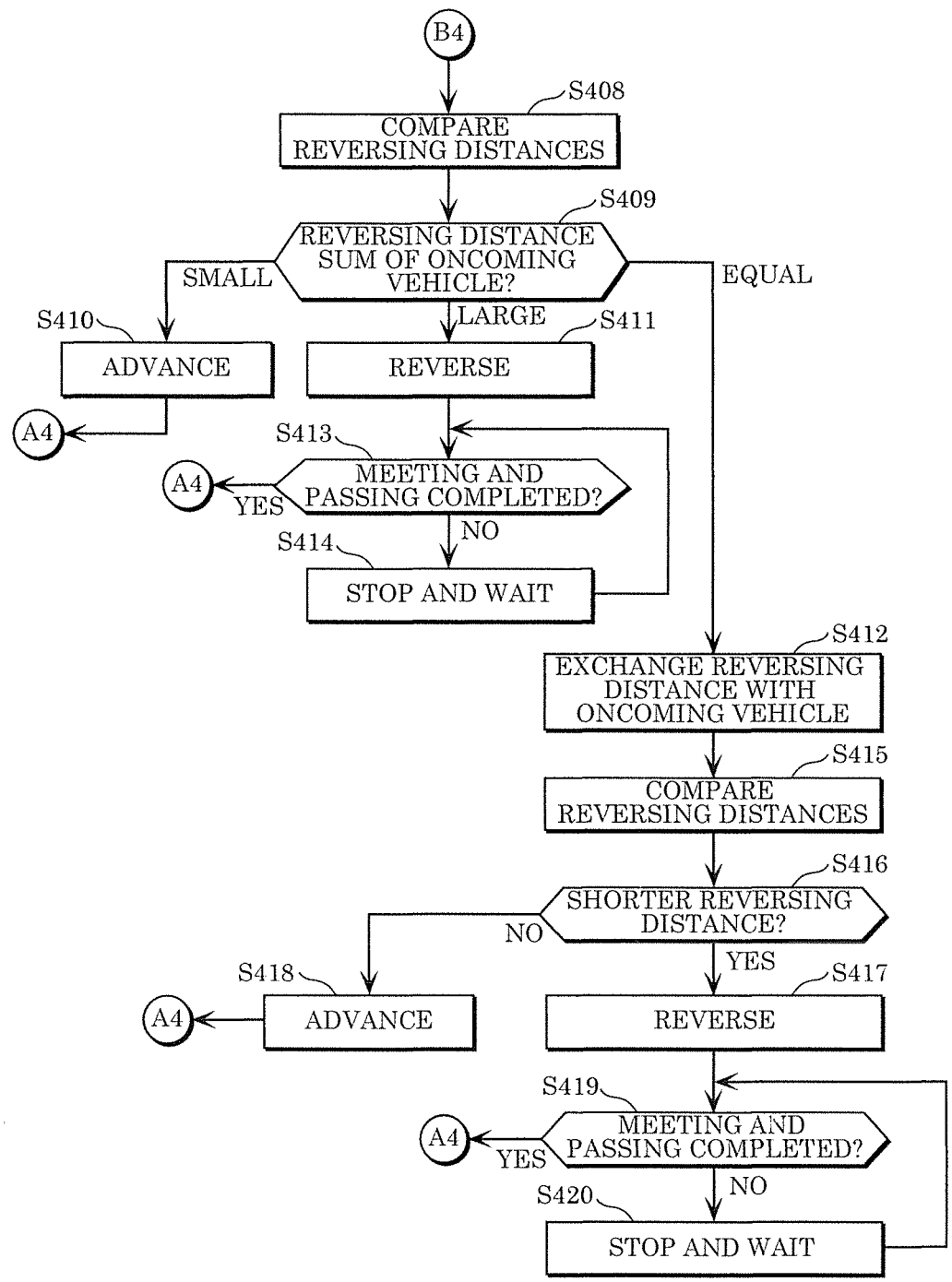
FIG. 12B is a flowchart illustrating one example of a flow of operations of an information processing device according to Embodiment 4.
Figure 13A:
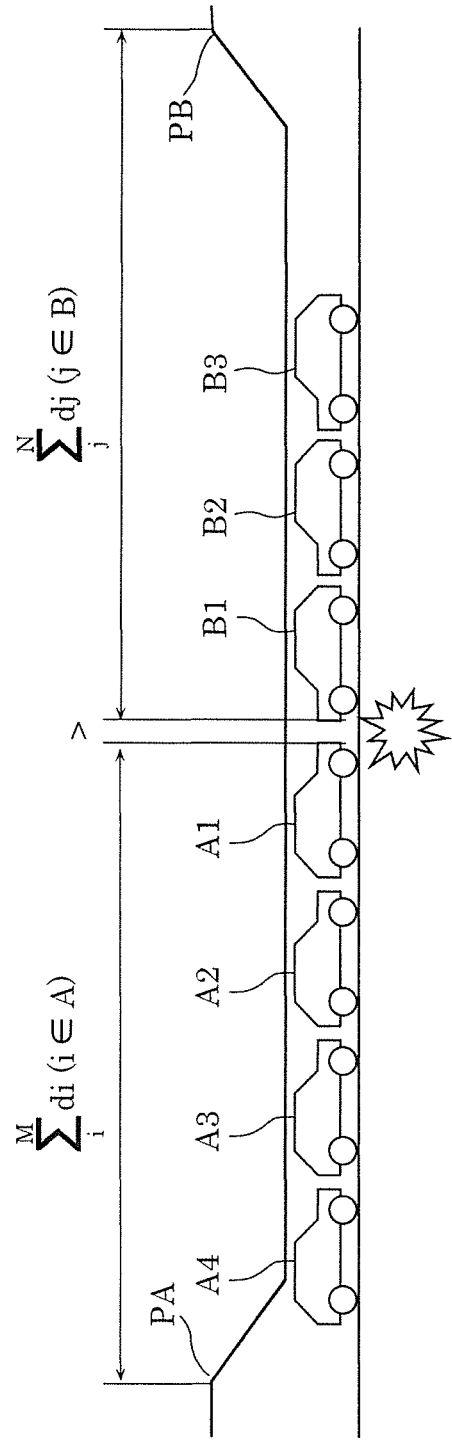
FIG. 13A is a schematic diagram illustrating one example of a head-on approach between vehicles according to Embodiment 4.
Figure 13B:
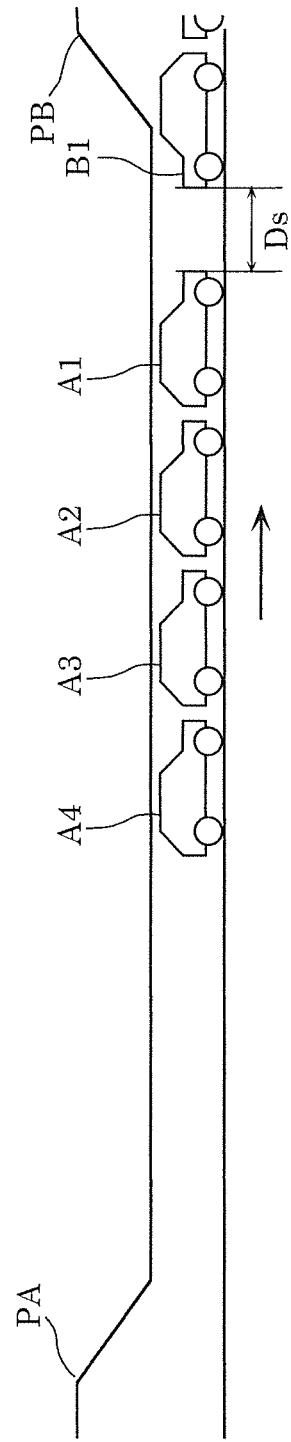
FIG. 13B is a schematic diagram illustrating one example of operations of a vehicle for resolving a head-on approach according to Embodiment 4.

Operations of information processing device 400 according to Embodiment 4 will be described with reference to FIG. 12A and FIG. 12B. Furthermore, using an example in FIG. 13A and FIG. 13B, the following description is given assuming that a vehicle following vehicle A1, another vehicle facing vehicle A1, and a vehicle following the other vehicle are also capable of autonomous driving and an information processing device substantially the same as that mounted on vehicle A1 is mounted on each of these vehicles. Note that FIG. 12A and FIG. 12B are flowcharts illustrating one example of a flow of the operations of information processing device 400 according to Embodiment 4. FIG. 13A is a schematic diagram illustrating one example of a head-on approach between vehicles according to Embodiment 4. FIG. 13B is a schematic diagram illustrating one example of operations of a vehicle for resolving a head-on approach according to Embodiment 4.

As illustrated in FIG. 12A and FIG. 12B, autonomous driving control device 6 and information processing device 400 of vehicle A1 perform the processes in Steps S101 to S107 as with information processing device 100 according to Embodiment 1. In Step S107, when vehicle A1 and another vehicle are not approaching head-on (NO in Step S107), determiner 107 returns to Step S101, and when these vehicles are approaching head-on (YES in Step S107), determiner 107 outputs the determination result to reversing distance sum calculator 413 and proceeds to Step S401.

In Step S401, as in Step S108 in Embodiment 1, reversing distance obtainer 108 calculates, as the reversing distance of vehicle A1, the distance between vehicle A1 approaching head-on vehicle B1 and end position PA of the meeting and passing section closest to vehicle A1, and outputs the distance to reversing distance sum calculator 413, as illustrated in FIG. 13A. This distance is the distance from the meeting point for vehicles A1 and B1 to end position PA.

In Step S402, as in Step S201 in Embodiment 2, reversing distance sum calculator 413 detects a vehicle around vehicle A1 via the inter-vehicle communication. Next, in Step S403, as in Step S202 in Embodiment 2, reversing distance sum calculator 413 proceeds to Step S404 when there is a reply from a vehicle (YES in Step S403), and proceeds to Step S406 when there is no reply from a vehicle (NO in Step S403).

In Step S404, reversing distance sum calculator 413 requests, via the inter-vehicle communication, a vehicle around vehicle A1 to transmit the reversing distance sum of the vehicle. Specifically, reversing distance sum calculator 413 transmits, to a vehicle around vehicle A1, end position PA of the meeting and passing section closest to vehicle A1, and subsequently requests the vehicle around vehicle A1 to transmit the reversing distance sum of the vehicle and the position of the vehicle. The vehicle around vehicle A1 may calculate the reversing distance sum of the vehicle by performing substantially the same processes as the processes in Steps S401 to S405.

Next, in Step S405, reversing distance sum calculator 413 obtains, from vehicles in the inter-vehicle communication area, the reversing distance sum of the vehicles and the positions of the vehicles. Furthermore, reversing distance sum calculator 413 specifies vehicles following vehicle A on the basis of the obtained positions of the vehicles. Reversing distance sum calculator 413 calculates, from the reversing distance sum of the specified vehicles, the reversing distance sum of vehicles following vehicle A1. For example, as illustrated in the example in FIG. 13A, reversing distance sum calculator 413 calculates the reversing distance sum of vehicles A2 to A4 following vehicle A1.

Next, in Step S406, reversing distance sum calculator 413 calculates the reversing distance sum of vehicle A1 by adding the reversing distance of vehicle A1 obtained in Step S401 to the reversing distance sum of following vehicles A2 to A4. Note that when no vehicle following vehicle A1 is detected, such as when there is no reply from a vehicle, in Step S403, the reversing distance sum of vehicle A1 is the reversing distance of vehicle A1.

Next, in Step S407, reversing distance sum calculator 413 transmits, via the inter-vehicle communication, the reversing distance sum of vehicle A1 to vehicle B1 approaching head-on vehicle A1. Furthermore, reversing distance sum calculator 413 requests the reversing distance sum of vehicle B1 to vehicle B1 via the inter-vehicle communication. As illustrated in the example in FIG. 13A, reversing distance sum calculator 413 transmits the sum of the reversing distances of vehicles A1 to A4 to vehicle B1, and receives the sum of the reversing distances of vehicles B1 to B3 from vehicle B1. Reversing distance sum calculator 413 outputs the reversing distance sum of each of vehicles A1 and B1 to generator 409.

Next, in Step S408, generator 409 compares the reversing distance sum of vehicle A1 and the reversing distance sum of vehicle B1. Furthermore, when the reversing distance sum of vehicle B1 which is an oncoming vehicle is less than the reversing distance sum of vehicle A1 in Step S409, generator 409 proceeds to Step S410. When the reversing distance sum of vehicle B1 is greater than the reversing distance sum of vehicle A1, generator 409 proceeds to Step S411. When the reversing distance sum of vehicle A1 and the reversing distance sum of vehicle B1 are equal, generator 409 proceeds to Step S412.

In Step S410, generator 409 performs substantially the same process in Step S208 in Embodiment 2. With this, as illustrated in the example in FIG. 13B, vehicles B1 to B3 reverse together, and vehicles A1 to A4 advance together while maintaining inter-vehicle distance Ds between vehicles A1 and B1.

In Steps S411, S413, and S414, generator 409 performs substantially the same processes in Steps S209, S211, and S212 in Embodiment 2, respectively. In Step S411, vehicles A1 to A4 reverse together, and vehicles B1 to B3 advance together while maintaining inter-vehicle distance Ds between vehicles A1 and B1.

Furthermore, in Step S412, as in Step S210 in Embodiment 2, generator 409 obtains the reversing distance of vehicle A1 and the reversing distance of vehicle B1. Moreover, in Steps S415 to S420, generator 409 performs substantially the same processes in Steps S213 to S218 in Embodiment 2.

4-3. Operations of Following Vehicle

Figure 14:
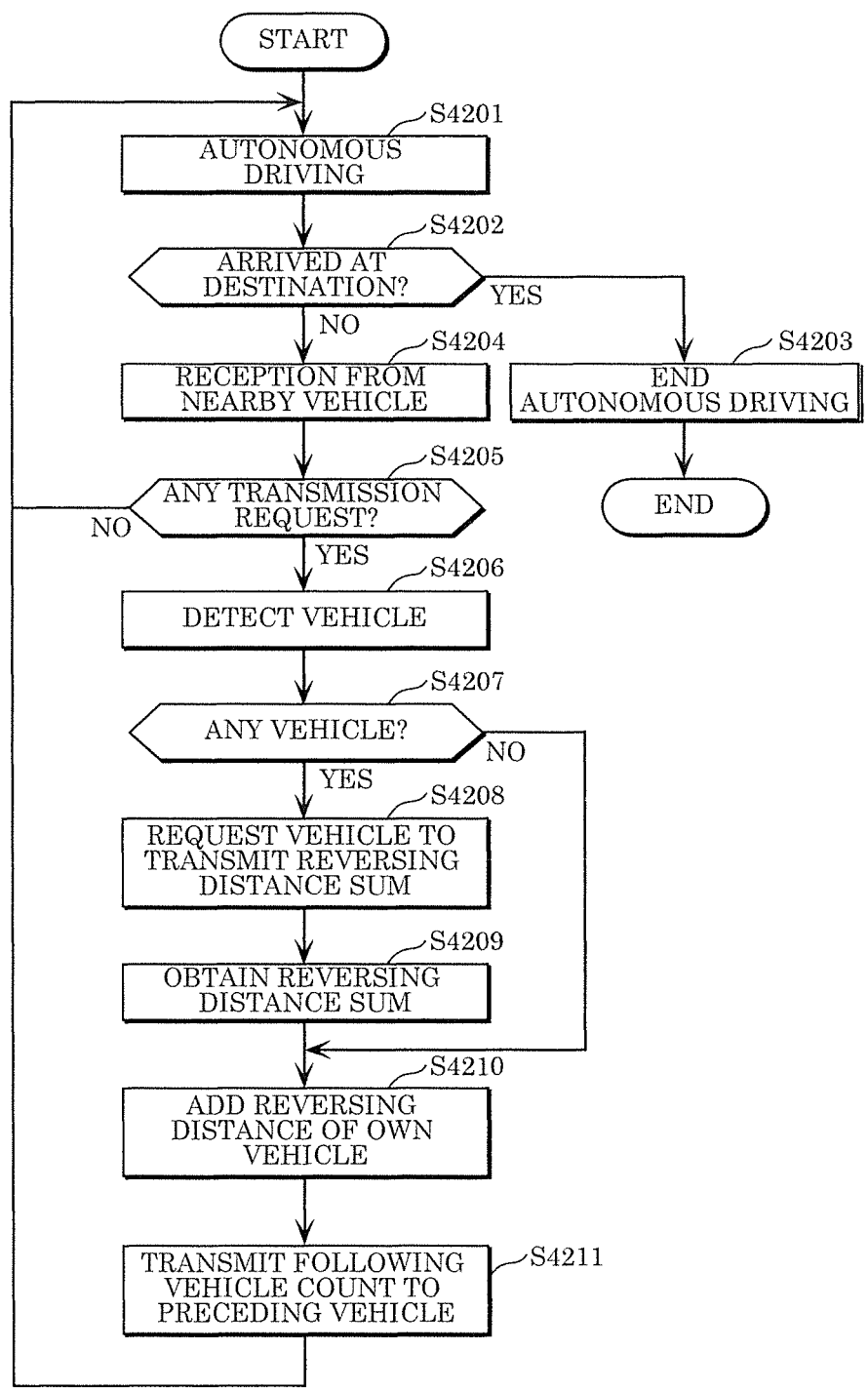
FIG. 14 is a flowchart illustrating one example of a flow of operations of an information processing device of a following vehicle according to Embodiment 4.

Operations of the information processing devices of vehicles following vehicles A1 and B1 will be described with reference to FIG. 14. FIG. 14 is a flowchart illustrating one example of a flow of operations of an information processing device of a following vehicle according to Embodiment 4. Hereinafter, an example process of vehicle Ak following vehicle A1 (k=2, . . . , M) will be described; the process of a vehicle following vehicle B1 is substantially the same as following vehicle Ak, and thus description thereof will be omitted. As illustrated in FIG. 14, the information processing device of following vehicle Ak performs the processes in Steps S4201 to S4203 in substantially the same manner as in Steps S2201 to S2013 for the information processing device of following vehicle Ak according to Embodiment 2.

In Step S4204, the information processing device of following vehicle Ak receives the inter-vehicle communication from a nearby vehicle in the inter-vehicle communication area. Next, in Step S4205, the information processing device of following vehicle Ak determines whether or not a request for the reversing distance sum of following vehicle Ak has been received from a nearby vehicle. The information processing device proceeds to Step S4206 when the request has been received (YES in Step S4205). In this case, the information processing device obtains, in Step S4202, the end position of the meeting and passing section which is the destination for obtaining the reversing distance of the vehicle. The information processing device proceeds to Step S4201 when the request has not been received (NO in Step S4205).

In Step S4206, as in Step S2206 in Embodiment 2, the information processing device of following vehicle Ak detects a vehicle around following vehicle Ak. Furthermore, in Step S4207, as in Step S2202 in Embodiment 2, when there is a reply from a vehicle, the information processing device determines that there is a vehicle nearby, and the processing proceeds to Step S4208 (YES in Step S4207). When there is no reply from a vehicle, the information processing device determines that there is no vehicle nearby, and the processing proceeds to Step S4210 (NO in Step S4207).

In Step S4208, the information processing device of following vehicle Ak requests, via the inter-vehicle communication, the nearby vehicle to transmit the position of the vehicle and the reversing distance sum of the vehicle with respect to the above-mentioned end position. Next, in Step S4209, as in Step S405 in Embodiment 4, the information processing device of following vehicle Ak obtains the reversing distance sum of the nearby vehicle and the position of the vehicle, and calculates the reversing distance sum of vehicles following vehicle Ak on the basis of the reversing distance sum and the position of each vehicle.

Next, in Step S4210, as in Step S401 in Embodiment 4, the information processing device of following vehicle Ak calculates the reversing distance of following vehicle Ak which is the distance between following vehicle Ak and the above-mentioned end position.

Next, in Step S4211, as in Step S406 in Embodiment 4, the information processing device of following vehicle Ak calculates the reversing distance sum of following vehicle Ak by adding the reversing distance of following vehicle Ak to the reversing distance sum of the vehicles following vehicle Ak. Furthermore, as in Step S2210 in Embodiment 2, the information processing device of following vehicle Ak transmits, via the inter-vehicle communication, the reversing distance sum of following vehicle A to nearby vehicles including a vehicle ahead of following vehicle Ak.

4-4. Advantageous Effects

As described above, when information processing device 400 according to Embodiment 4 mounted on at least one of two vehicles detects head-on approach between vehicle A1 and vehicle B1, one of the vehicles featuring that the sum of reversing distances of the vehicle and the following vehicles to the closest meeting and passing section is smaller is forced to reverse, and the other vehicle featuring that said sum of reversing distances is larger is allowed to advance so that two vehicles A1 and B1 and the vehicles following two vehicles A1 and B1 meet and pass in the meeting and passing section. Furthermore, when the above sum of reversing distances are equal, information processing device 400 performs substantially the same processing as that in Embodiment 1 in which one of the vehicles closer to the meeting and passing section is forced to reverse, and thus two vehicles A1 and B1 and vehicles following two vehicles A1 and B1 meet and pass in the meeting and passing section.

Furthermore, information processing device 400 according to Embodiment 4 is mounted, for example, on vehicle A1 which is the first vehicle. In such information processing device 400, using the information obtained from a vehicle following vehicle A1, reversing distance sum calculator 413 calculates the third distance between the first section and the vehicle following vehicle A1. Communicator 102 transmits the third distance to vehicle B1 facing vehicle A1, and receives, from vehicle B1, the fourth distance between the second section and the vehicle following vehicle B1. Generator 409 compares the sum of the first distance and the third distance and the sum of the second distance and the fourth distance, and generates the travel control information according to the comparison result. Note that the first distance is the distance between the meeting point and the first section in which vehicles can meet and pass before the meeting point in the direction of travel of vehicle A1, and the second distance is the distance between the meeting point and the second section in which vehicles can meet and pass before the meeting point in the direction of travel of vehicle B1.

With the above-described configuration, the travel of vehicle A1 is controlled according to the accurate amount of movement of a group of vehicles that are forced to move. With this, the amount of movement of vehicles for resolving the head-on approach between vehicles A1 and B1 can be further optimized. In other words, by using the sum of distances, it is possible to efficiently resolve a head-on approach even when the inter-vehicle distance between following vehicles is not uniform. Furthermore, increased types of head-on approaches can be efficiently handled.

Embodiment 5

Information processing device 500 according to Embodiment 5 will be described. Information processing device 200 according to Embodiment 2 determines a vehicle that is to reverse, on the basis of the numbers of vehicles following two vehicles approaching head-on. Information processing device 500 according to Embodiment 5 determines a vehicle that is to reverse, on the basis of the length of the meeting and passing sections closest to two vehicles approaching head-on. The following description of Embodiment 5 will focus on differences from Embodiments 1 to 4.

5-1. Configuration of Information Processing Device

Figure 15:
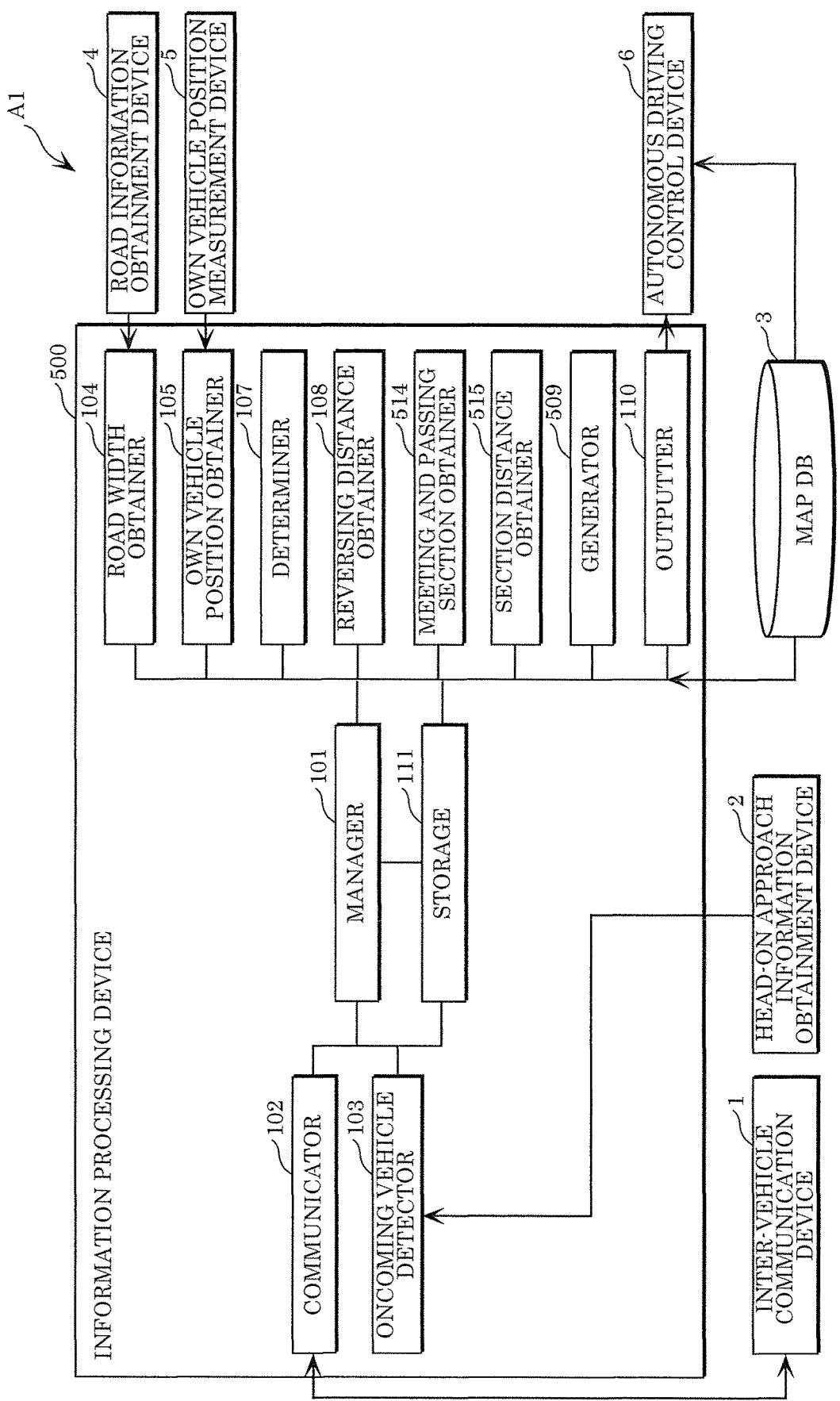
FIG. 15 is a block diagram illustrating one example of a functional configuration of a vehicle including an information processing device according to Embodiment 5.

Information processing device 500 and peripheral elements thereof according to Embodiment 5 will be described. FIG. 15 is a block diagram illustrating one example of a functional configuration of vehicle A1 including information processing device 500 according to Embodiment 5. As illustrated in FIG. 15, vehicle A1 includes inter-vehicle communication device 1, head-on approach information obtainment device 2, map DB 3, road information obtainment device 4, own vehicle position measurement device 5, autonomous driving control device 6, and information processing device 500. Information processing device 500 includes, as in Embodiment 2, manager 101, communicator 102, oncoming vehicle detector 103, road width obtainer 104, own vehicle position obtainer 105, determiner 107, outputter 110, and storage 111. Furthermore, information processing device 500 includes generator 509, meeting and passing section obtainer 514, and section distance obtainer 515.

Meeting and passing section obtainer 514 is similar to meeting and passing spot obtainer 106 in Embodiment 1. Using the information of the road width obtained from road width obtainer 104 or storage 111, meeting and passing section obtainer 514 obtains a meeting and passing section on a travel path that is a road on which vehicle A1 has traveled. Meeting and passing section obtainer 514 compares the road width obtained at predetermined time intervals while vehicle A1 is traveling or not in motion and the preset width sufficient for meeting and passing. Subsequently, meeting and passing section obtainer 514 detects the position of an end point which is the point of change of the road width from a width sufficient for meeting and passing to a width insufficient for meeting and passing and the position of a start point which is the point of change of the road width from a width insufficient for meeting and passing to a width sufficient for meeting and passing, and determines, as the meeting and passing section, the section ranging from the start point to the end point. Note that using the map information of map DB 3, meeting and passing section obtainer 514 may compare the road width of the travel path of vehicle A1 and the width sufficient for meeting and passing. Meeting and passing section obtainer 514 stores the start point position and the end point position of the meeting and passing section into storage 111.

Furthermore, when meeting and passing section obtainer 514 obtains the information of a head-on approach of vehicle A1 from determiner 107, meeting and passing section obtainer 514 obtains the current position of vehicle A1 from own vehicle position obtainer 105. Subsequently, meeting and passing section obtainer 514 extracts, from storage 111, the meeting and passing section closest to the current position of vehicle A1 on the path on which vehicle A1 has traveled, and outputs the start point position and the end point position of the meeting and passing section to section distance obtainer 515.

Section distance obtainer 515 calculates, from the start point position and the end point position of the meeting and passing section, the distance between the start point position and the end point position, that is, the length of the meeting and passing section. Section distance obtainer 515 may calculate the route length of vehicle A1 between the start point position and the end point position. For example, section distance obtainer 515 may calculate the above-mentioned route length using the odometer of vehicle A1 and information such as the map information in map DB 3. Note that when the length of the meeting and passing section is less than or equal to a predetermined length, section distance obtainer 515 may update the information of the meeting and passing section in storage 111 by adding information indicating that said meeting and passing section is excluded from the meeting and passing section. Furthermore, section distance obtainer 515 obtains, from a vehicle other than vehicle A1, the length of the meeting and passing section closest to the other vehicle, via communicator 102 and inter-vehicle communication device 1. The meeting and passing section closest to the other vehicle is the meeting and passing section closest to the current position of the other vehicle on the path on which the other vehicle has traveled. Section distance obtainer 515 outputs the length of the meeting and passing section of each of vehicle A1 and the other vehicle to generator 509. Here, section distance obtainer 515 is one example of the calculator.

Generator 509 compares the length of the meeting and passing section of vehicle A1 and the length of the meeting and passing section of the other vehicle, and generates, according to the comparison result, travel control information for causing vehicle A1 to advance or reverse. Specifically, generator 509 generates the travel control information for causing vehicle A1 to reverse when the length of the meeting and passing section of vehicle A1 is greater, and otherwise generates the travel control information for causing vehicle A1 to advance. Generator 509 outputs the travel control information to outputter 110.

The configurations of vehicle A1 and the other structural elements of information processing device 500 are substantially the same as those in Embodiment 2, and thus description thereof will be omitted.

5-2. Operations of Information Processing Device

Figure 16:
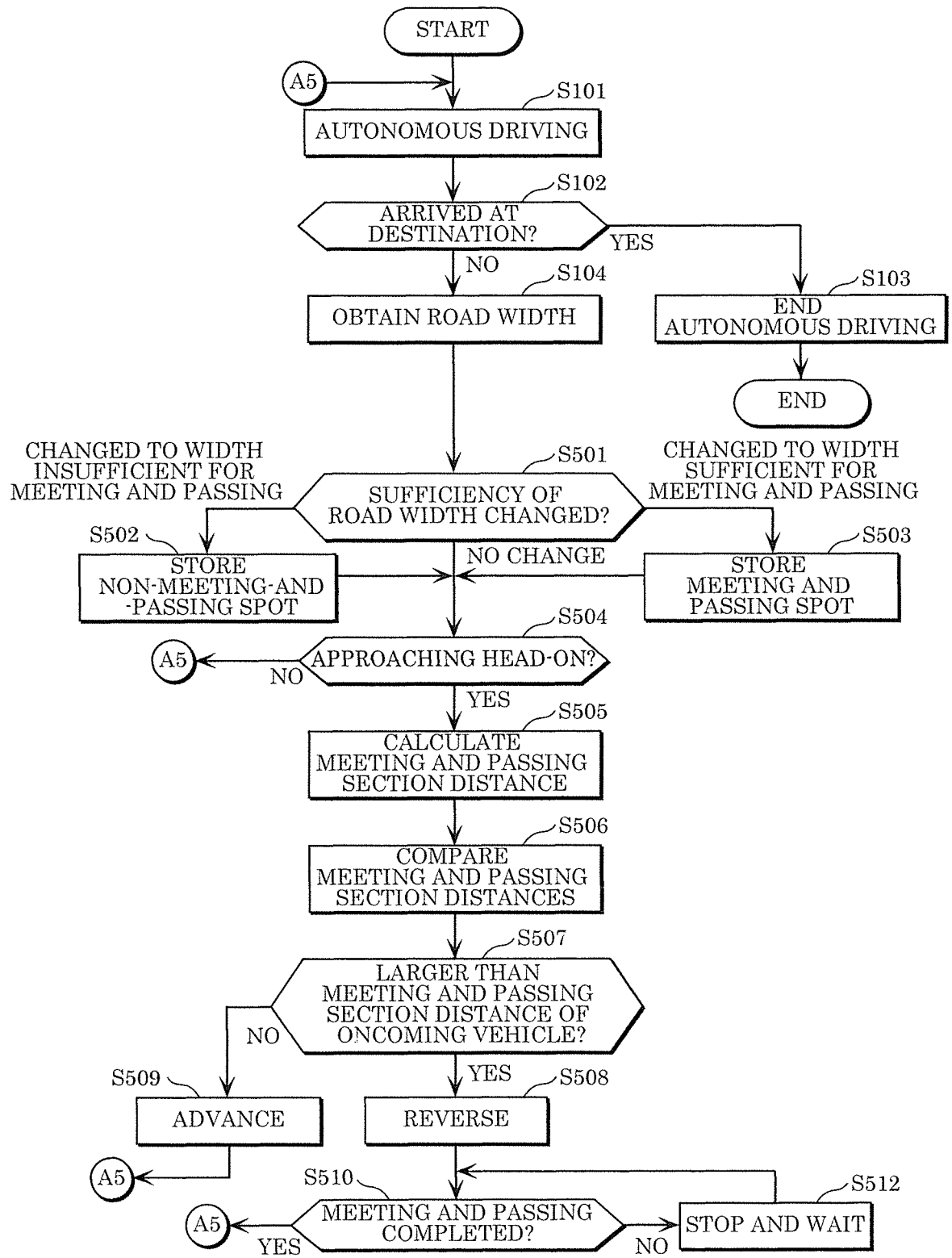
FIG. 16 is a flowchart illustrating one example of a flow of operations of an information processing device according to Embodiment 5.
Figure 17A:
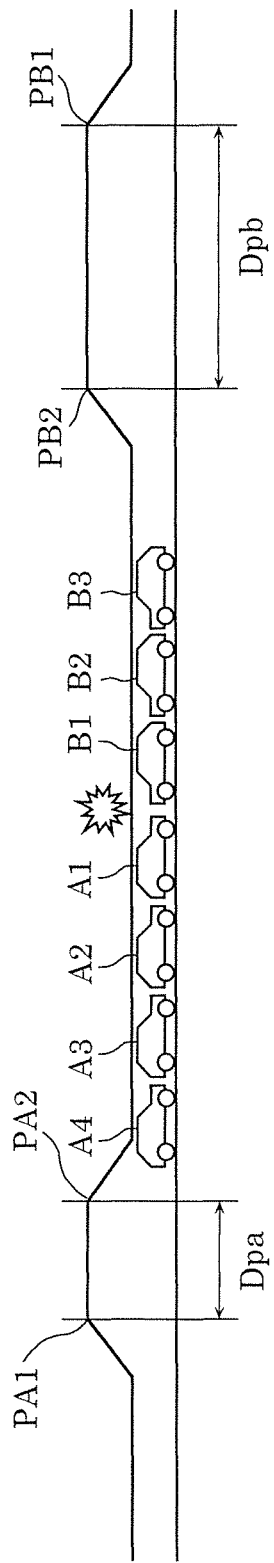
FIG. 17A is a schematic diagram illustrating one example of a head-on approach between vehicles according to Embodiment 5.
Figure 17B:
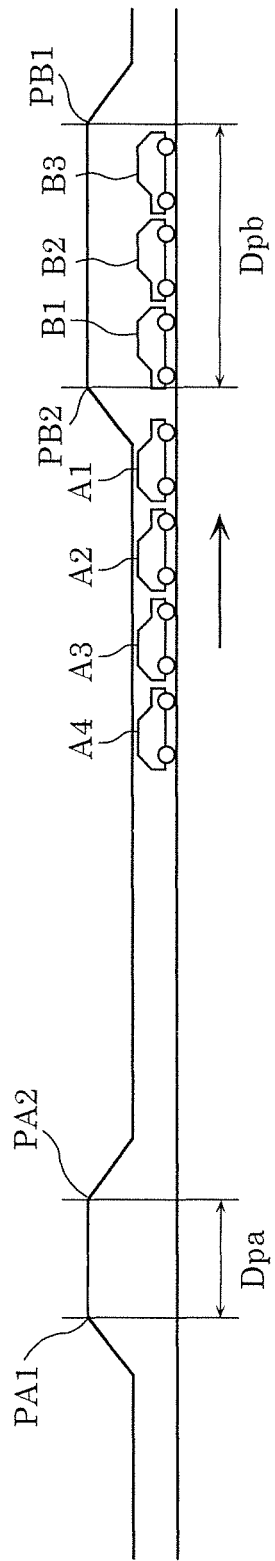
FIG. 17B is a schematic diagram illustrating one example of operations of a vehicle for resolving a head-on approach according to Embodiment 5.

Operations of information processing device 500 according to Embodiment 5 will be described with reference to FIG. 16. Furthermore, using an example in FIG. 17A and FIG. 17B, the following description is given assuming that a vehicle following vehicle A1, another vehicle facing vehicle A1, and a vehicle following the other vehicle are also capable of autonomous driving and an information processing device substantially the same as that mounted on vehicle A1 is mounted on each of these vehicles. Note that FIG. 16 is a flowchart illustrating one example of a flow of the operations of information processing device 500 according to Embodiment 5. FIG. 17A is a schematic diagram illustrating one example of a head-on approach between vehicles according to Embodiment 5. FIG. 17B is a schematic diagram illustrating one example of operations of a vehicle for resolving a head-on approach according to Embodiment 5.

As illustrated in FIG. 16, autonomous driving control device 6 and information processing device 500 of vehicle A1 perform the processes in Steps S101 to S104 that are substantially the same as those in Embodiment 1.

Next, in Step S501, meeting and passing section obtainer 514 determines whether the road width obtained from road width obtainer 104 or storage 111 has changed from a width sufficient for meeting and passing to a width insufficient for meeting and passing or whether the road width obtained from road width obtainer 104 or storage 111 has changed from a width insufficient for meeting and passing to a width sufficient for meeting and passing. When the road width has changed from a width sufficient for meeting and passing to a width insufficient for meeting and passing, meeting and passing section obtainer 514 proceeds to Step S502. When the road width has changed from a width insufficient for meeting and passing to a width sufficient for meeting and passing, meeting and passing section obtainer 514 proceeds to Step S503. When none of the above changes of the road width occurs, meeting and passing section obtainer 514 proceeds to Step S504.

In Step S502, meeting and passing section obtainer 514 obtains, from own vehicle position obtainer 105, the position of vehicle A1 at a point in time of the change of the road width from a width sufficient for meeting and passing to a width insufficient for meeting and passing, and stores a non-meeting-and-passing spot, that is, the end point position of the meeting and passing section, into storage 111. Meeting and passing section obtainer 514 proceeds to Step S504.

In Step S503, meeting and passing section obtainer 514 obtains, from own vehicle position obtainer 105, the position of vehicle A1 at a point in time of the change of the road width from a width insufficient for meeting and passing to a width sufficient for meeting and passing, and stores a meeting and passing spot, that is, the start point position of the meeting and passing section, into storage 111. Meeting and passing section obtainer 514 proceeds to Step S504.

In Step S504, oncoming vehicle detector 103 and determiner 107 determine whether or not vehicle A1 is approaching head-on another vehicle, as in Step S107 according to Embodiment 1. In the example in FIG. 17A, oncoming vehicle detector 103 and determiner 107 determine that vehicle A1 is approaching head-on vehicle B1. When these vehicles are approaching head-on (YES in Step S504), determiner 107 proceeds to Step S505, and when these vehicles are not approaching head-on (NO in Step S504), determiner 107 returns to Step S101.

In Step S505, meeting and passing section obtainer 514 obtains the current position of vehicle A1 from own vehicle position obtainer 105, and extracts, from storage 111, the start point position and the end point position of the meeting and passing section closest to the current position of vehicle A1 on the path on which vehicle A1 has traveled. Section distance obtainer 515 calculates the length of the meeting and passing section using the start point position and the end point position. Furthermore, section distance obtainer 515 obtains, from a vehicle approaching head-on vehicle A1, the length of the meeting and passing section closest to the vehicle, via the inter-vehicle communication. As illustrated in the example in FIG. 17A, using start point position PA1 and end point position PA2, section distance obtainer 515 calculates length Dap of the meeting and passing section closest to vehicle A1. Section distance obtainer 515 obtains, from vehicle B1, length Dpb of the meeting and passing section having start point position PB1 and end point position PB2. Section distance obtainer 515 outputs lengths Dpa and Dpb of two meeting and passing sections to generator 509.

In Step S506, generator 509 compares lengths Dpa and Dpb of the two meeting and passing sections. When length Dpa of the meeting and passing section closest to vehicle A1 is greater than length Dpb of the meeting and passing section closes to vehicle B1 (YES in Step S507), generator 509 proceeds to Step S508, and otherwise proceeds to Step S509 (NO in Step S507).

In Step S508, generator 509 performs substantially the same process in Step S208 in Embodiment 2. With this, as illustrated in the example in FIG. 17B, vehicle B1 and vehicles B2 and B3 following vehicle B1 reverse together, and vehicle A1 and vehicles A2 to A4 following vehicle A1 advance together while maintaining inter-vehicle distance Ds between vehicles A1 and B1.

5-3. Advantageous Effects

As described above, when information processing device 500 according to Embodiment 5 mounted on at least one of two vehicles detects head-on approach between vehicle A1 and vehicle B1, one of the vehicles featuring that the length of the meeting and passing section closest to the vehicle is greater is forced to reverse, and the other vehicle featuring that the length of the meeting and passing section closest to the vehicle is shorter is allowed to advance so that two vehicles A1 and B1 and vehicles following vehicles A1 and B1 meet and pass in the meeting and passing section. Note that in the present embodiment, when the closest meeting and passing sections are equal in length, vehicle B1 reverses, but either vehicle A1 or B1 may reverse.

Furthermore, information processing device 500 according to Embodiment 5 is mounted, for example, on vehicle A1 which is the first vehicle. In such information processing device 500, generator 509 compares a first section length which is the length of the first section and a second section length which is the length of the second section, and generates, according to the comparison result, the travel control information for causing vehicle A1 to advance or reverse. Note that the first section is a section in which vehicles can meet and pass before the meeting point in the direction of travel of vehicle A1, and the second section is a section in which vehicles can meet and pass before the meeting point in the direction of travel of vehicle B1. With the above-described configuration, when two vehicles A1 and B1 face each other (in other words, two vehicles A1 and B1 are approaching head-on) in an area other than a section in which vehicles can pass each other, the travel of vehicle A1 is controlled according to the length of the section in which vehicles can pass each other. With this, it is possible to increase the likelihood that when there is a following vehicle, the entire group of vehicles including the following vehicle can pass each other as the length of the section in which vehicles can pass each other increases.

Embodiment 6

Information processing device 600 according to Embodiment 6 will be described. The information processing devices according to Embodiments 1 to 5 each perform, on a vehicle approaching head-on an oncoming vehicle, processing for resolving the head-on approach. Information processing device 600 according to Embodiment 6 performs, before a vehicle approaches head-on an oncoming vehicle, processing for preventing occurrence of the head-on approach. The following description of Embodiment 6 will focus on differences from Embodiments 1 to 5.

6-1. Configuration of Information Processing Device

Figure 18:
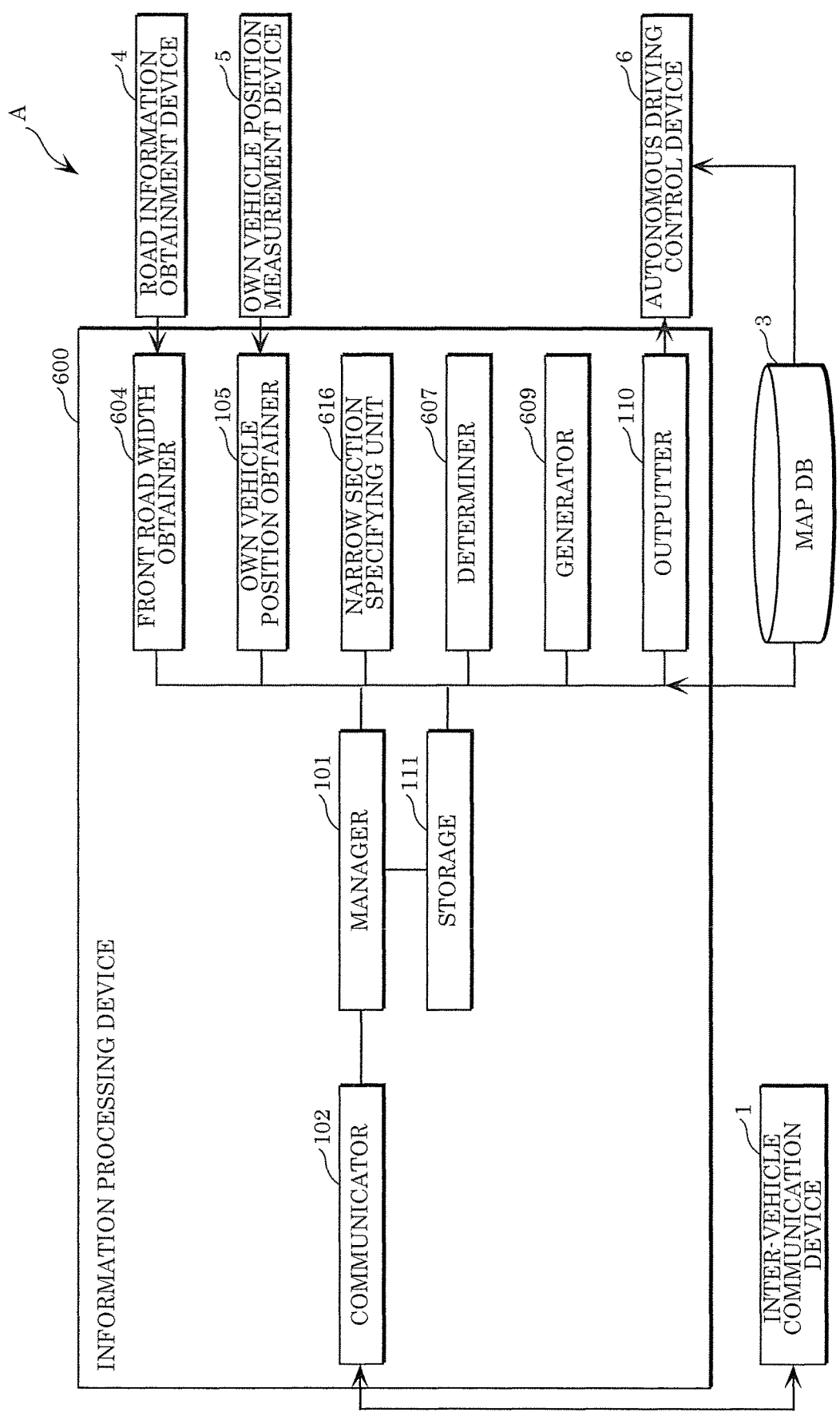
FIG. 18 is a block diagram illustrating one example of a functional configuration of a vehicle including an information processing device according to Embodiment 6.

Information processing device 600 and peripheral elements thereof according to Embodiment 6 will be described. FIG. 18 is a block diagram illustrating one example of a functional configuration of vehicle A including information processing device 600 according to Embodiment 6. As illustrated in FIG. 18, vehicle A includes inter-vehicle communication device 1, map DB 3, road information obtainment device 4, own vehicle position measurement device 5, autonomous driving control device 6, and information processing device 600. Information processing device 600 includes, as in Embodiment 1, manager 101, communicator 102, own vehicle position obtainer 105, outputter 110, and storage 111. Furthermore, information processing device 600 includes front road width obtainer 604, determiner 607, generator 609, and narrow section specifying unit 616.

Front road width obtainer 604 is similar to road width obtainer 104 in Embodiment 1. Front road width obtainer 604 obtains the road information from road information obtainment device 4, and detects the width of the road in front of vehicle A in the direction of travel thereof from the road information. Front road width obtainer 604 obtains the road information at predetermined time intervals while vehicle A is traveling or not in motion, and detects the width of the front road through estimation. Front road width obtainer 604 stores the road width into storage 111 in association with the position of vehicle A, the position of the road on the map, or the time when the road width is detected. Front road width obtainer 604 uses, as the road information, an image captured by a camera which obtains a front image, the measurement result of a sensor which detects the direction and distance to an object located in front, map information in the map database, and the like.

Narrow section specifying unit 616 detects, from the information of the width of the road in front of vehicle A obtained at the predetermined time intervals, a narrow section in which the road width is narrow. Specifically, narrow section specifying unit 616 detects the start point position and the region of the narrow section. Although the present embodiment describes the case where vehicles are located in a section in which the vehicles cannot meet and pass, the present embodiment is also applicable to the case where a vehicle is located in a meeting and passing section. Furthermore, narrow section specifying unit 616 obtains the position of vehicle A from own vehicle position obtainer 105, and calculates the distance between the position of vehicle A and the start point position of the narrow section, that is, the distance between vehicle A and the narrow section. In the present embodiment, the aforementioned distance may be a physical distance such as the route length between vehicle A and the narrow section or may be a temporal distance such as time required for vehicle A to reach the narrow section. In the latter case, narrow section specifying unit 616 may calculate the speed of vehicle A from the position of vehicle A obtained from own vehicle position obtainer 105 at predetermined time intervals, and calculate a temporal distance on the basis of the speed of vehicle A, the position of vehicle A, and the start point position of the narrow section. Note that narrow section specifying unit 616 may obtain the speed of vehicle A from own vehicle position measurement device 5.

Furthermore, narrow section specifying unit 616 obtains, from another vehicle in the communication area of inter-vehicle communication device 1, the distance between the other vehicle and the narrow section, via the inter-vehicle communication. At this time, narrow section specifying unit 616 may achieve sharing of the narrow section by transmitting the information of the narrow section to the other vehicle. Furthermore, narrow section specifying unit 616 may transmit to the other vehicle or may obtain from the other vehicle, information such as the position, the speed, and the travel path of the vehicle and the time when the vehicle arrives at the narrow section, in addition to the distance between the vehicle and the narrow section. Using the obtained information, narrow section specifying unit 616 specifies an oncoming vehicle that has entered the same narrow section or is scheduled to enter the same narrow section, thereby specifying the distance between the oncoming vehicle and the narrow section. Narrow section specifying unit 616 outputs, to determiner 607 and generator 609, the distance between the narrow section and each of vehicle A and the oncoming vehicle.

Determiner 607 determines whether or not another vehicle approaches head-on vehicle A within a predetermined time. Specifically, determiner 607 obtains, at predetermined time intervals, at least one of the position, the speed, and the scheduled travel path of each of vehicle A and the oncoming vehicle, and determines whether or not the oncoming vehicle moves to a position within a predetermined distance from vehicle A within a predetermined time. For example, determiner 607 estimates, on the basis of the distance between vehicle A and the narrow section and the distance between the oncoming vehicle and the narrow section, the meeting point at which vehicle A and the oncoming vehicle approach head-on after the predetermined time. Subsequently, determiner 607 determines whether or not the estimated meeting point is located in the narrow section.

Generator 609 compares the distance between vehicle A and the narrow section and the distance between the oncoming vehicle and the narrow section, and generates, according to the comparison result, travel control information for causing vehicle A to advance or stop. Specifically, when the distance between vehicle A and the narrow section is less than the distance between the oncoming vehicle and the narrow section or when vehicle A has already entered the narrow section, generator 609 generates travel control information for causing vehicle A to advance and causing the oncoming vehicle to stop, and otherwise generates travel control information for causing vehicle A to stop and causing the oncoming vehicle to advance. Generator 609 outputs the travel control information to outputter 110 and the oncoming vehicle.

The configurations of vehicle A and the other structural elements of information processing device 600 are substantially the same as those in Embodiment 1, and thus description thereof will be omitted.

6-2. Operations of Information Processing Device

Figure 19:
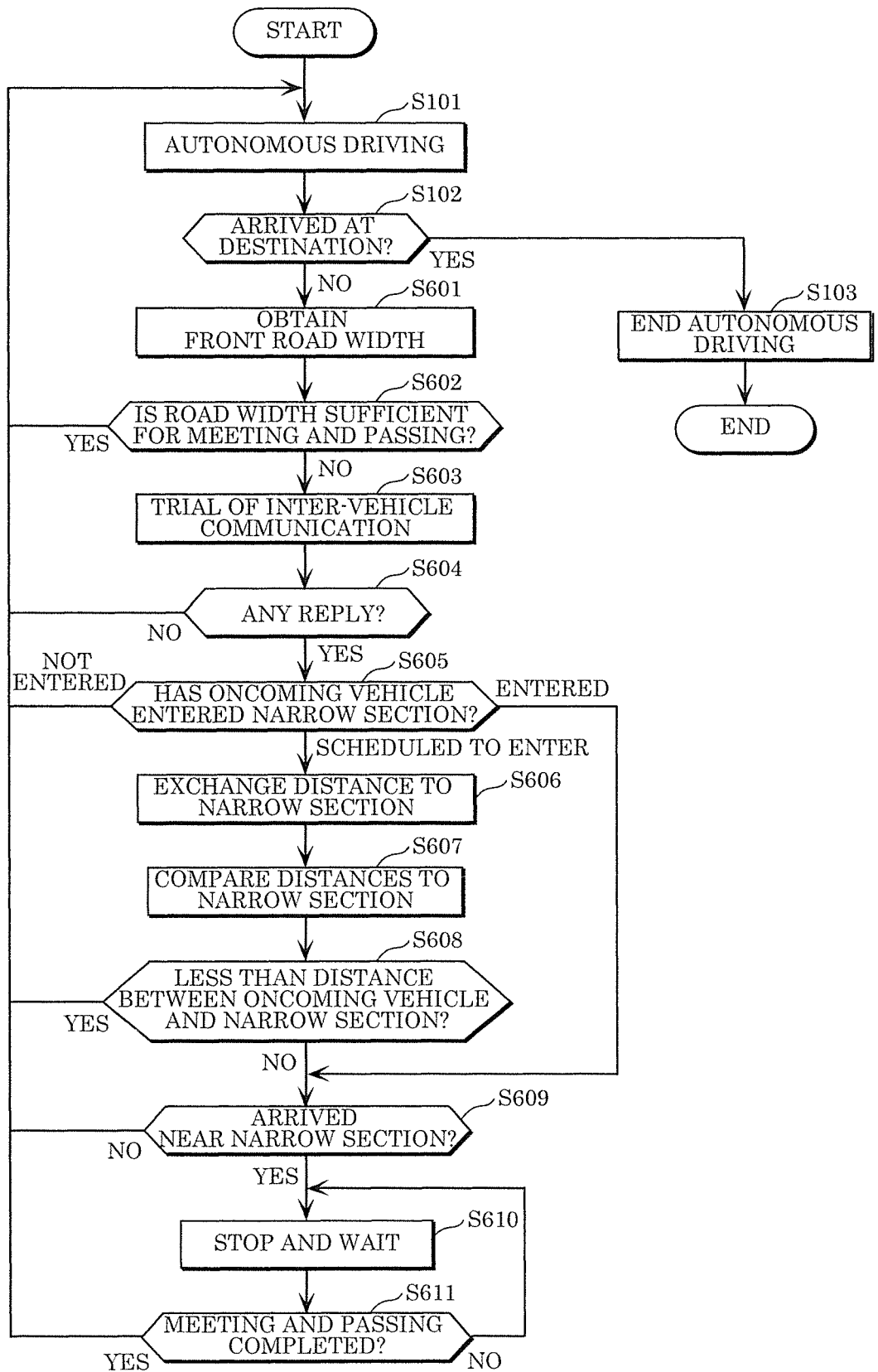
FIG. 19 is a flowchart illustrating one example of a flow of operations of an information processing device according to Embodiment 6.

Operations of information processing device 600 according to Embodiment 6 will be described with reference to FIG. 19. Furthermore, using an example in FIG. 20A and FIG. 20B, the following description is given assuming that a vehicle following vehicle A, another vehicle facing vehicle A, and a vehicle following the other vehicle are also capable of autonomous driving and an information processing device substantially the same as that mounted on vehicle A is mounted on each of these vehicles. Note that FIG. 19 is a flowchart illustrating one example of a flow of the operations of information processing device 600 according to Embodiment 6. FIG. 20A is a schematic diagram illustrating one example of a situation prior to a head-on approach between vehicles according to Embodiment 6. FIG. 20B is a schematic diagram illustrating one example of operations of a vehicle for preventing a head-on approach according to Embodiment 6.

As illustrated in FIG. 19, autonomous driving control device 6 and information processing device 600 of vehicle A perform the processes in Steps S101 to S103 that are substantially the same as those in Embodiment 1. Next, in Step S601, using the road information obtained from road information obtainment device 4 at the predetermined time intervals, front road width obtainer 604 detects the width of the road in front of vehicle A at the predetermined time intervals, and stores the road width into storage 111 in association with the position of vehicle A when the road width is detected.

Next, in Step S602, narrow section specifying unit 616 determines whether or not the road width obtained from road width obtainer 104 or storage 111 is sufficient for meeting and passing. When the road width is sufficient for meeting and passing (YES in Step S602), narrow section specifying unit 616 returns to Step S101. When the road width is insufficient for meeting and passing (NO in Step S602), narrow section specifying unit 616 detects the start point position and the region of the narrow section using the position of vehicle A associated with the road width. Subsequently, narrow section specifying unit 616 proceeds to Step S603.

In Step S603, narrow section specifying unit 616 performs trial communication with a vehicle in the inter-vehicle communication area via the inter-vehicle communication. At this time, narrow section specifying unit 616 transmits the information of the start point position and the region of the narrow section detected in Step S602, and requests information such as the position, the speed, and the travel path of said vehicle.

Next, in Step S604, when there is a reply from the vehicle (YES in Step S604), narrow section specifying unit 616 proceeds to Step S605, and when there is no reply from the vehicle (NO in Step S604), narrow section specifying unit 616 returns to Step S101.

Next, in Step S605, using information obtained from the vehicle which is the source of the reply, determiner 607 specifies the oncoming vehicle for vehicle A, and determines entry of the oncoming vehicle into the narrow section on the basis of information of the position of the oncoming vehicle and the narrow section. In other words, determiner 607 determines whether or not the oncoming vehicle approaches head-on vehicle A within a predetermined time. When the oncoming vehicle is not scheduled to enter the narrow section, determiner 607 returns to Step S101, and when the oncoming vehicle is scheduled to enter the narrow section, determiner 607 proceeds to Step S606, and when the oncoming vehicle has already entered the narrow section, determiner 607 proceeds to Step S609. For example, the situation in which the oncoming vehicle is scheduled to enter the narrow section means a situation in which the direction of travel of the oncoming vehicle is toward the narrow section or a situation in which the path on which the oncoming vehicle is scheduled to travel passes through the narrow section.

Next, in Step S606, narrow section specifying unit 616 transmits the distance between vehicle A and the narrow section to the oncoming vehicle via the inter-vehicle communication. Furthermore, narrow section specifying unit 616 requests the oncoming vehicle to transmit the distance between the oncoming vehicle and the narrow section and obtains the distance. In other words, narrow section specifying unit 616 exchanges the distances to the narrow sections. Narrow section specifying unit 616 outputs, to generator 609, the distance between vehicle A and the narrow section and the distance between the oncoming vehicle and the narrow section. As illustrated in the example in FIG. 20A, narrow section specifying unit 616 outputs distance DApa between vehicle A and start point position PA of the narrow section for vehicle A and distance DBpb between oncoming vehicle B and start point position PB of the narrow section for oncoming vehicle B.

Next, in Step S607, generator 609 compares distance DApa between vehicle A and the narrow section and distance DBpb between oncoming vehicle B and the narrow section. When distance DApa is less than distance DBpb (YES in Step S608), generator 609 returns to Step S101, and vehicle A continues to advance by autonomous driving. Note that when a vehicle is located in the narrow section, the distance between the vehicle and the narrow section may be 0 or a negative value. Furthermore, generator 609 generates travel control information for causing vehicle B to stop in a close position outside the narrow section, and transmits a command including the travel control information to oncoming vehicle B via the inter-vehicle communication. With this, oncoming vehicle B stays in a meeting and passing place until completion of meeting and passing of vehicle A. Furthermore, when distance DApa is greater than or equal to distance DBpb (NO in Step S608), generator 609 proceeds to Step S609.

In Step S609, generator 609 obtains the position of vehicle A from own vehicle position obtainer 105, and determines whether or not vehicle A has arrived at a position close to the narrow section. The position close to the narrow section may be start point position PA of the narrow section or may be a position that is outside of the narrow section and distanced from start point position PA. The close position may be such a position that when vehicle A is not in motion in the close position, oncoming vehicle B can meet and pass vehicle A. Note that a place where the vehicles meet and pass does not need to be close to the narrow section as long as the place is in a meeting and passing section. When vehicle A has arrived (YES in Step S609), generator 609 proceeds to Step S610, and when vehicle A has not arrived (NO in Step S609), generator 609 returns to Step S101, and vehicle A continues to advance by autonomous driving.

In Step S610, generator 609 generates vehicle control information for causing vehicle A to stop in a position close to the narrow section, and outputs the vehicle control information to outputter 110. Outputter 110 outputs the travel control information to autonomous driving control device 6. With this, according to the travel control information, autonomous driving control device 6 causes vehicle A to stop in a position close to the narrow section.

Next, in Step S611, generator 609 determines whether or not meeting and passing of vehicles A and B have been completed. Generator 609 determines the completion of meeting and passing on the basis of the positional relationship between vehicles A and B. At this time, generator 609 may obtain the position of vehicle B from vehicle B via the inter-vehicle communication or may obtain the position of vehicle B by detecting the direction and the distance using a camera, other sensors, or the like on vehicle A. When the meeting and passing have been completed (YES in Step S611), generator 609 returns to Step S101, and vehicle A resumes autonomous driving to advance. When the meeting and passing have not been completed (NO in Step S611), generator 609 returns to Step S610, and vehicle A remains not in motion.

6-3. Advantageous Effects

As described above, before vehicles A and B approach head-on in a narrow section, information processing device 600 according to Embodiment 6 mounted on at least one of the two vehicles causes one of the vehicles that is located at a shorter distance from the narrow section to advance and the other vehicle featuring that said distance is greater than or equal to that for the one vehicle to stop so that the two vehicles meet and pass in a meeting and passing place. Note that in the present embodiment, when the distances between the narrow section and the vehicles are equal, vehicle A stops, but either vehicle A or B may stop. Alternatively, when the distances between the narrow section and the two vehicles are equal, it is possible to perform substantially the same processing as that performed in Embodiment 2 where two vehicles are followed by the same number of vehicles.

Furthermore, information processing device 600 according to Embodiment 6 is mounted, for example, on vehicle A which is the first vehicle. In such information processing device 600, determiner 607 serving as the detector detects a head-on approach of vehicle B, which is the second vehicle, relative to vehicle A that occurs after a predetermined time. Narrow section specifying unit 616 serving as the calculator calculates the fifth distance between vehicle A and the end point of the first section. When the meeting point after the predetermined time is determined as not being in the first section, communicator 102 transmits the fifth distance to vehicle B, and receives, from vehicle B, the sixth distance between vehicle B and the end point of the second section in which vehicles can meet and pass before the meeting point in the direction of travel of vehicle B. Generator 609 compares the fifth distance and the sixth distance and generates, according to the comparison result, travel control information for causing vehicle A to advance or stop. Note that the first section is a section in which vehicles can meet and pass before the meeting point after the predetermined time in the direction of travel of vehicle A. With the above-described configuration, it is possible to prevent the occurrence of a head-on approach between vehicles.

Embodiment 7

Information processing device 700 according to Embodiment 7 will be described. In Embodiments 1 to 6, each of facing vehicles includes the information processing device. In Embodiment 7, an oncoming vehicle for vehicle A including information processing device 700 does not include the information processing device. Furthermore, in Embodiment 7, the oncoming vehicle may be capable of autonomous driving or may be incapable of autonomous driving. The following description of Embodiment 7 will focus on differences from Embodiments 1 to 5.

7-1. Configuration of Information Processing Device

Figure 21:
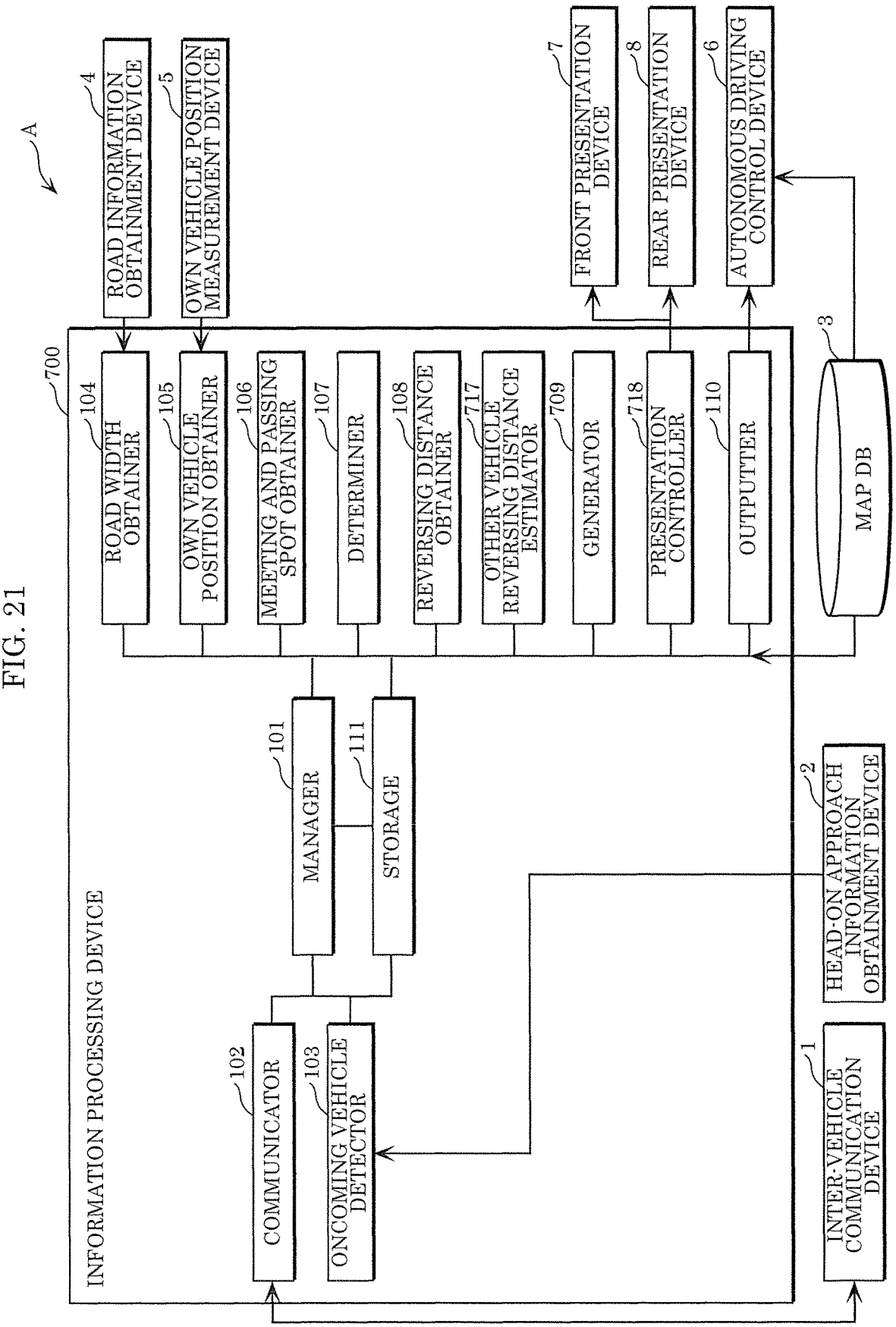
FIG. 21 is a block diagram illustrating one example of a functional configuration of a vehicle including an information processing device according to Embodiment 7.

Information processing device 700 and peripheral elements thereof according to Embodiment 7 will be described. FIG. 21 is a block diagram illustrating one example of a functional configuration of vehicle A including information processing device 700 according to Embodiment 7. As illustrated in FIG. 21, vehicle A includes inter-vehicle communication device 1, head-on approach information obtainment device 2, map DB 3, road information obtainment device 4, own vehicle position measurement device 5, autonomous driving control device 6, and information processing device 700. Furthermore, vehicle A includes front presentation device 7 and rear presentation device 8. Information processing device 700 includes, as in Embodiment 1, manager 101, communicator 102, oncoming vehicle detector 103, road width obtainer 104, own vehicle position obtainer 105, meeting and passing spot obtainer 106, determiner 107, reversing distance obtainer 108, outputter 110, and storage 111. Furthermore, information processing device 700 includes generator 709, other vehicle reversing distance estimator 717, and presentation controller 718.

Figure 22A:
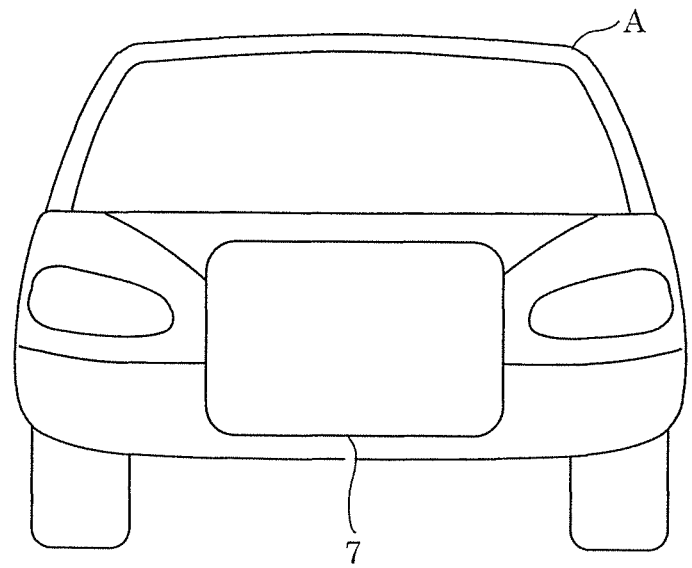
FIG. 22A is a front view illustrating an example in which a front presentation device is disposed on a vehicle.
Figure 22B:
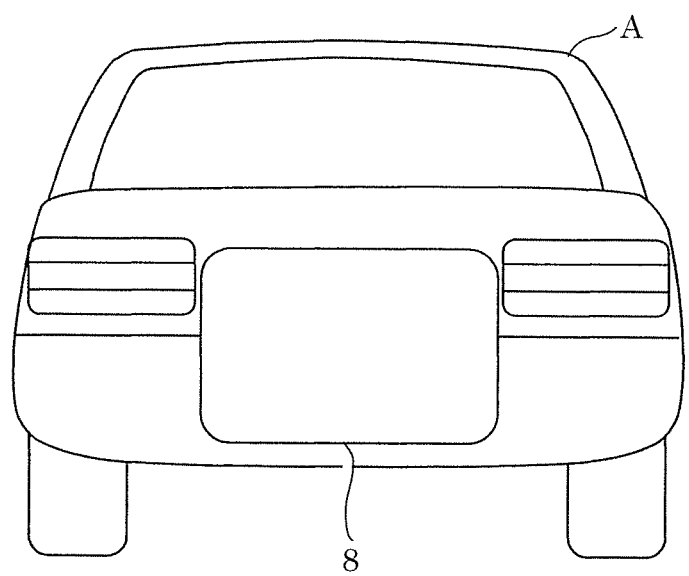
FIG. 22B is a rear view illustrating an example in which a rear presentation device is disposed on a vehicle.

Front presentation device 7 and rear presentation device 8 present output information of information processing device 700; specifically, front presentation device 7 and rear presentation device 8 at least visually display the output information of information processing device 700. Front presentation device 7 and rear presentation device 8 may aurally present the above-mentioned output content. Each of front presentation device 7 and rear presentation device 8 includes at least a display among a display and a loudspeaker. Examples of the display include a liquid crystal display (LCD) and an organic or inorganic electroluminescent (EL) display. As illustrated in FIG. 22A, front presentation device 7 is disposed on a front portion of vehicle A and displays the output information to a target such as an oncoming vehicle in front of vehicle A. As illustrated in FIG. 22B, rear presentation device 8 is disposed on a rear portion of vehicle A and displays the output information to a target such as a following vehicle behind vehicle A. Note that FIG. 22A is a front view illustrating an example in which front presentation device 7 is disposed on vehicle A. FIG. 22B is a rear view illustrating an example in which rear presentation device 8 is disposed on vehicle A.

When vehicle A and another vehicle are approaching head-on, other vehicle reversing distance estimator 717 estimates, on the basis of the map information in map DB 3, a distance the other vehicle reverses in order to resolve the head-on approach. Other vehicle reversing distance estimator 717 may obtain the position of the other vehicle by detecting the direction and the distance using a camera, other sensors, or the like on vehicle A, and use the position of the other vehicle in the estimation.

Presentation controller 718 allocates, to front presentation device 7 and rear presentation device 8, the information output by information processing device 700 so that presentation, that is, display, suitable for each of front presentation device 7 and rear presentation device 8 is given.

When vehicle A and another vehicle are approaching head-on, generator 709 generates travel control information for vehicle A according to the result determined by information processing device 700 in order to resolve the head-on approach.

The configurations of vehicle A and the other structural elements of information processing device 700 are substantially the same as those in Embodiment 1, and thus description thereof will be omitted.

7-2. Operations of Information Processing Device

Operations of information processing device 700 according to Embodiment 7 will be described with reference to FIG. 23A to FIG. 23C. Furthermore, the following description is given assuming that another vehicle facing vehicle A does not include an information processing device substantially the same as that mounted on vehicle A1 and does not accept, unlike Embodiments 1 to 6, the arbitration performed by vehicle A to avoid a head-on approach in which meeting and passing are impossible. Note that FIG. 23A to FIG. 23C are flowcharts illustrating one example of a flow of the operations of information processing device 700 according to Embodiment 7.

Figure 23A:
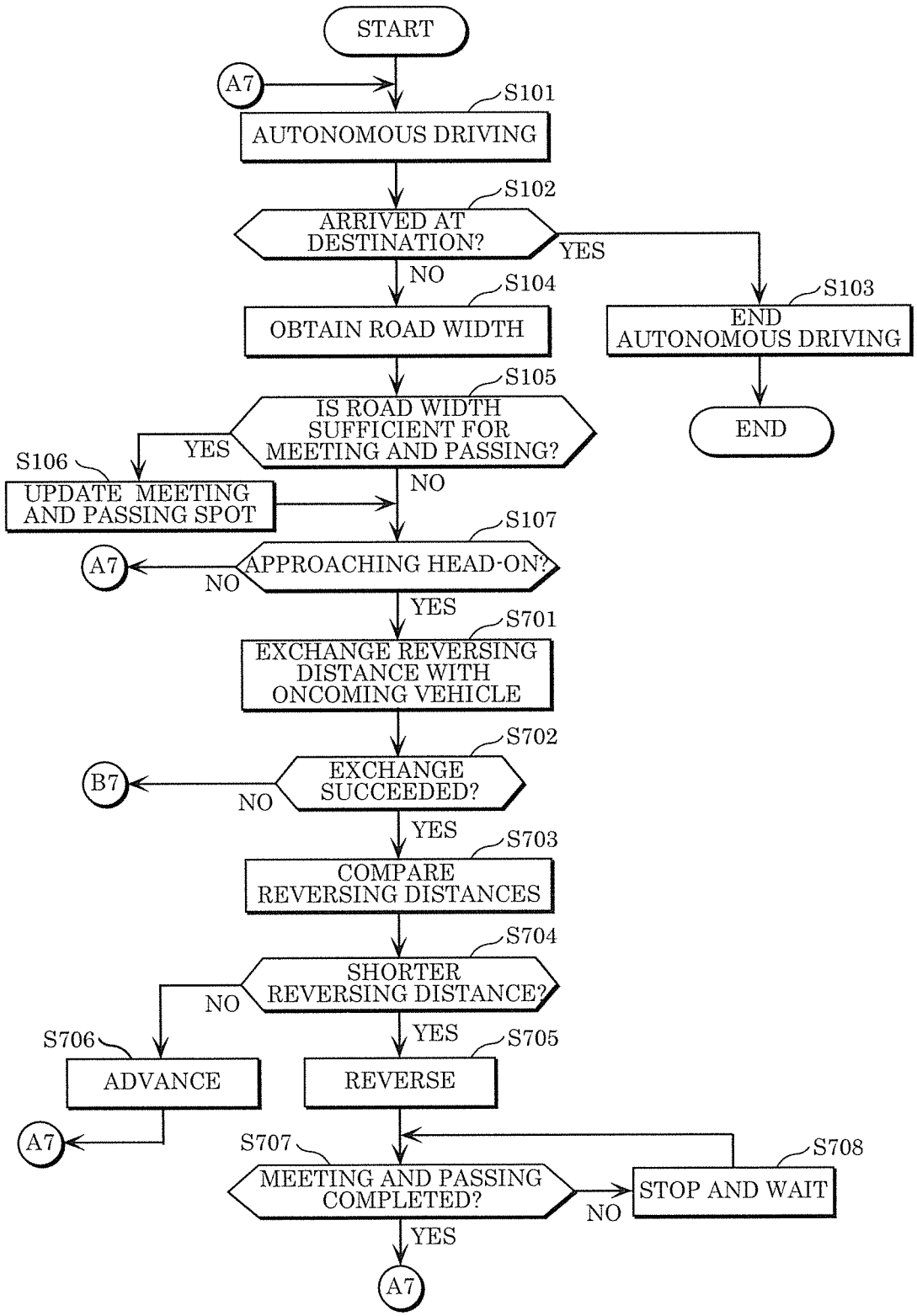
FIG. 23A is a flowchart illustrating one example of a flow of operations of an information processing device according to Embodiment 7.
Figure 23B:
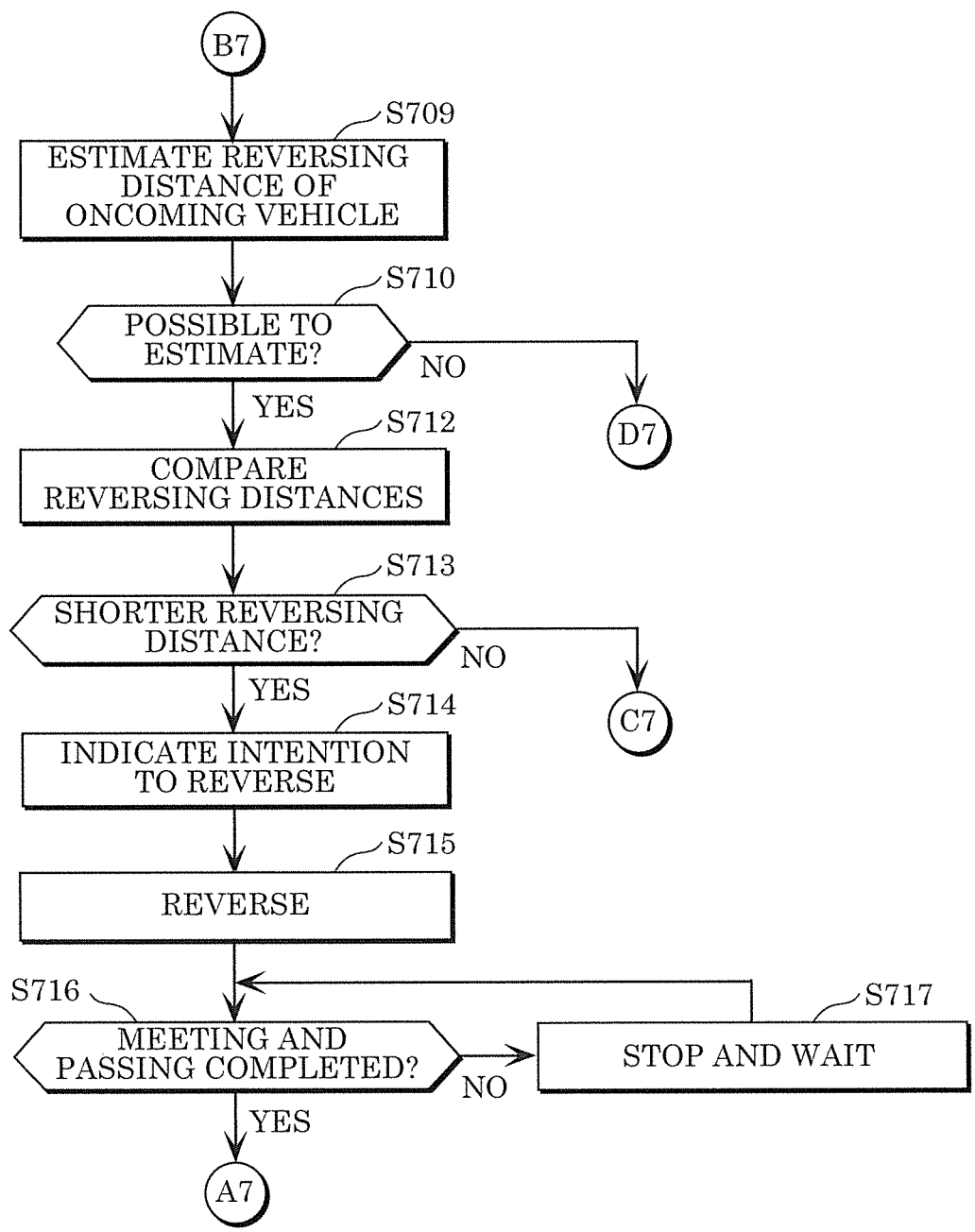
FIG. 23B is a flowchart illustrating one example of a flow of operations of an information processing device according to Embodiment 7.
Figure 23C:
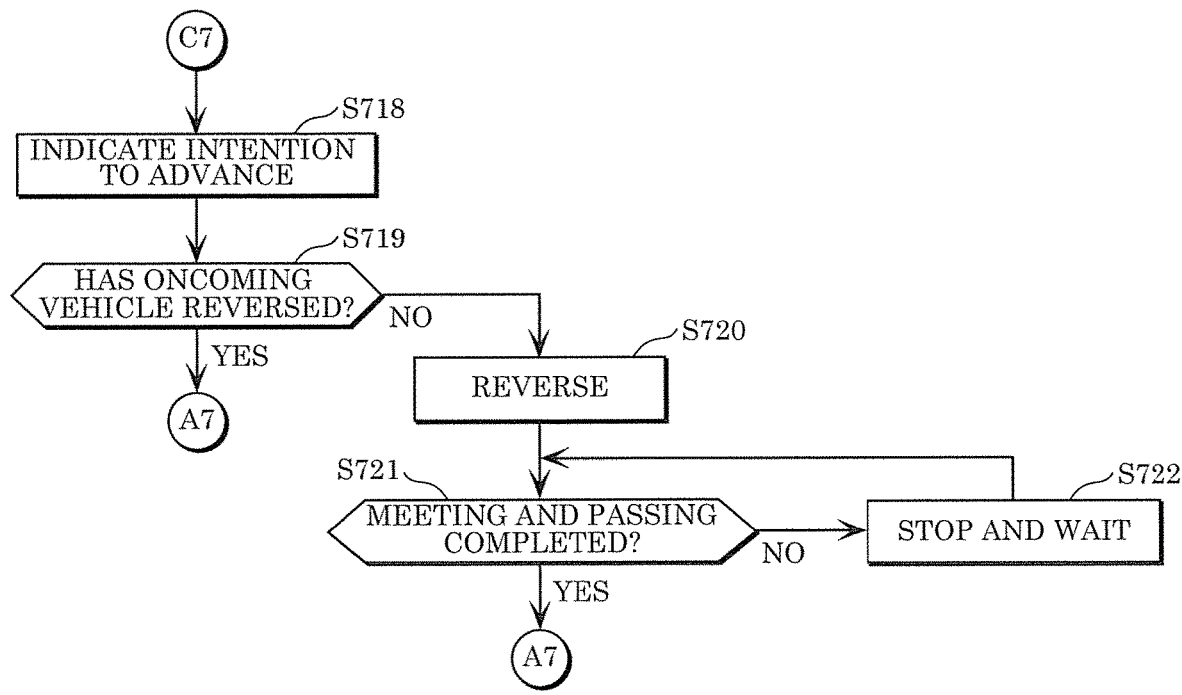
FIG. 23C is a flowchart illustrating one example of a flow of operations of an information processing device according to Embodiment 7.
Figure 23D:
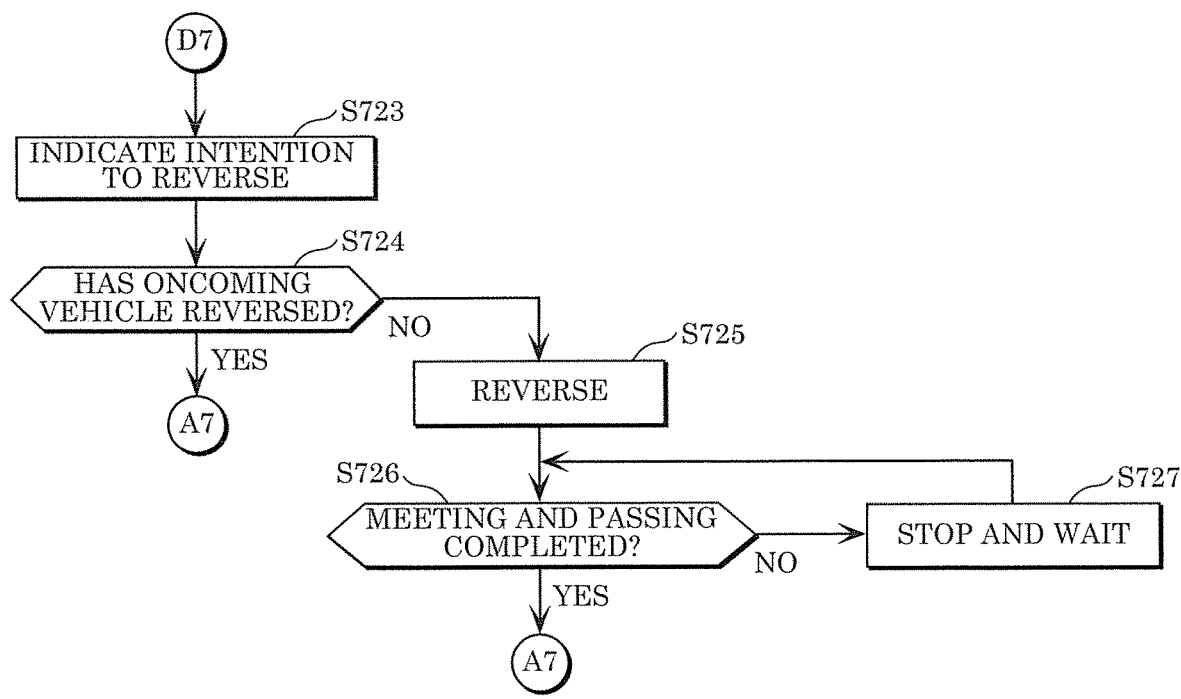
FIG. 23D is a flowchart illustrating one example of a flow of operations of an information processing device according to Embodiment 7.

As illustrated in FIG. 23A to FIG. 23C, autonomous driving control device 6 and information processing device 700 of vehicle A perform the processes in Steps S101 to S107 that are substantially the same as those in Embodiment 1.

Next, in Step S701, as in Step S108 in Embodiment 1, reversing distance obtainer 108 calculates the reversing distance between vehicle A and the meeting and passing section closest thereto. Furthermore, reversing distance obtainer 108 requests another vehicle which is an oncoming vehicle to transmit the reversing distance of the other vehicle and transmits the reversing distance of vehicle A to the other vehicle via the inter-vehicle communication. In other words, reversing distance obtainer 108 performs trial exchange of the reversing distances with the other vehicle. When the exchange of the reversing distances is successful (YES in Step S702), reversing distance obtainer 108 outputs the determination result or the like to generator 709, and proceeds to Step S703. When the exchange of the reversing distances is unsuccessful (NO in Step S702), reversing distance obtainer 108 outputs the determination result or the like to other vehicle reversing distance estimator 717, and proceeds to Step S709. The successful exchange of the reversing distances means receiving the reversing distance from the other vehicle by reversing distance obtainer 108, and the unsuccessful exchange of the reversing distances means failing to receive the reversing distance from the other vehicle by reversing distance obtainer 108.

The processes in Step S703 to S708 are substantially the same as those in Steps S109 to S114 in Embodiment 1, and thus description thereof will be omitted.

In Step S709, other vehicle reversing distance estimator 717 estimates a reversing distance when the other vehicle reverses to the closest meeting and passing section. For example, other vehicle reversing distance estimator 717 estimates the position of the other vehicle from the position of vehicle A, and estimates a reversing distance using the position of the other vehicle and the map information in map DB 3. Alternatively, other vehicle reversing distance estimator 717 may detect the position of the other vehicle using a camera, other sensors, or the like on vehicle A.

When the estimation of the reversing distance of the other vehicle is successful (YES in Step S710), other vehicle reversing distance estimator 717 outputs the estimated reversing distance to generator 709, and proceeds to Step S712. When the estimation of the reversing distance of the other vehicle is unsuccessful (NO in Step S710), other vehicle reversing distance estimator 717 proceeds to Step S723.

In Step S712, generator 709 compares the reversing distance of vehicle A and the estimated reversing distance of the other vehicle, as in Step S703. Subsequently, when the reversing distance of vehicle A is less than the estimated reversing distance of the other vehicle (YES in Step S713), generator 709 determines reversing of vehicle A, and proceeds to Step S714. When the reversing distance of vehicle A is greater than or equal to the estimated reversing distance of the other vehicle (NO in Step S713), generator 709 determines reversing of the other vehicle, and proceeds to Step S718.

In Step S714, generator 709 obtains, from storage 111, information for indicating, to the other vehicle and the like, the intention of vehicle A to reverse, and outputs the information to presentation controller 718. The aforementioned information is created in advance and stored in a storage device such as storage 111. Examples of the aforementioned information include an image, text information in an image, and audio information. The aforementioned information includes: first information which is displayed to an oncoming vehicle in front of vehicle A; and second information which is displayed to a following vehicle behind vehicle A. Presentation controller 718 outputs the first information to front presentation device 7 and causes front presentation device 7 to display the first information, and outputs the second information to rear presentation device 8 and causes rear presentation device 8 to display the second information. For example, FIG. 24 illustrates display examples of front presentation device 7 and rear presentation device 8. As illustrated in FIG. 24, the display content may include an intention about an operation of vehicle A corresponding to the travel control information and a request to another vehicle corresponding to said operation. Each of a driver of an oncoming vehicle and a driver of a following vehicle can recognize a scheduled operation of vehicle A and deal therewith by visually recognizing the display of front presentation device 7 and rear presentation device 8.

Presentation controller 718 may transmit the first information to a terminal device of an oncoming vehicle via communicator 102 and inter-vehicle communication device 1 and cause the terminal device of the oncoming vehicle to display the first information, and may transmit the second information to a terminal device of a following vehicle via communicator 102 and inter-vehicle communication device 1 and cause the terminal device of the following vehicle to display the second information. For example, FIG. 25 illustrates display examples on the terminal device of the other vehicle. As illustrated in FIG. 25, the display content may include an intention about an operation of vehicle A and a request to the other vehicle corresponding to said operation. Each of a driver of an oncoming vehicle and a driver of a following vehicle can recognize a scheduled operation of vehicle A and deal therewith by visually recognizing the display on the terminal device.

Next, in Step S715, generator 709 generates vehicle control information for causing vehicle A to reverse, and outputs the vehicle control information to outputter 110. Autonomous driving control device 6 to which the vehicle control information is input from outputter 110 causes vehicle A to reverse. The processes in Steps S716 and S717 are substantially the same as the processes in Steps S707 and S708.

In Step S718, generator 709 obtains, from storage 111, information for indicating, to the other vehicle and the like, the intention of vehicle A to advance, and outputs the information to presentation controller 718. The aforementioned information is created in advance and stored in a storage device such as storage 111. The aforementioned information includes: third information which is displayed to an oncoming vehicle in front of vehicle A; and fourth information which is displayed to a following vehicle behind vehicle A. As in Step S714, presentation controller 718 outputs the third information to front presentation device 7 and causes front presentation device 7 to display the third information, and outputs the fourth information to rear presentation device 8 and causes rear presentation device 8 to display the fourth information. Furthermore, presentation controller 718 may transmit the third information to a terminal device of an oncoming vehicle and cause the terminal device of the oncoming vehicle to display the third information, and may transmit the fourth information to a terminal device of a following vehicle and cause the terminal device of the following vehicle to display the fourth information.

When reversing of the oncoming vehicle is recognized (YES in Step S719), generator 709 returns to Step S101, and when reversing of the oncoming vehicle is not recognized (NO in Step S719), generator 709 proceeds to Step S720.

In Step S720, as in Step S715, generator 709 generates vehicle control information for causing vehicle A to reverse, and causes vehicle A to reverse. The processes in Steps S721 and S722 are substantially the same as the processes in Steps S707 and S708.

Furthermore, in Step S723, as in Step S714, generator 709 outputs, to presentation controller 718, information for indicating, to the other vehicle and the like, the intention of vehicle A to reverse, and causes front presentation device 7 and rear presentation device 8 and/or the terminal devices of the oncoming vehicle and the following vehicle to display the information. The processes in Steps S724 to S727 are substantially the same as the processes in Steps S719 to S722.

7-3. Advantageous Effects

As described above, when vehicle A and an oncoming vehicle are approaching head-on, in the case where communication for resolving the head-on approach cannot be established with the oncoming vehicle, information processing device 700 according to Embodiment 7 mounted on one of the two vehicles achieves smooth meeting and passing by displaying, to the oncoming vehicle, the intention about an operation of vehicle A corresponding to the travel control information. Furthermore, information processing device 700 achieves more smooth meeting and passing by displaying, to a following vehicle, the intention about an operation of vehicle A corresponding to the travel control information.

Furthermore, information processing device 700 according to Embodiment 7 is mounted, for example, on vehicle A which is the first vehicle. Such information processing device 700 includes presentation controller 718 which controls the information presentation to at least an oncoming vehicle which is the second vehicle. When communicator 102 cannot communicate with the oncoming vehicle, presentation controller 718 causes front presentation device 7 to present the information corresponding to the travel control information. With the above-described configuration, it is possible to smoothly resolve a head-on approach even with a vehicle incapable of establishing inter-vehicle communication.

Variation 1

Information processing device 100 according to Variation 1 will be described. In the above-described embodiments, the travel of a vehicle is only one of autonomous driving and manual driving, but in Variation 1, it is possible to switch between autonomous driving and manual driving. The following description of Variation 1 will focus on differences from the above-described embodiments.

Configuration of Information Processing Device

Figure 26:
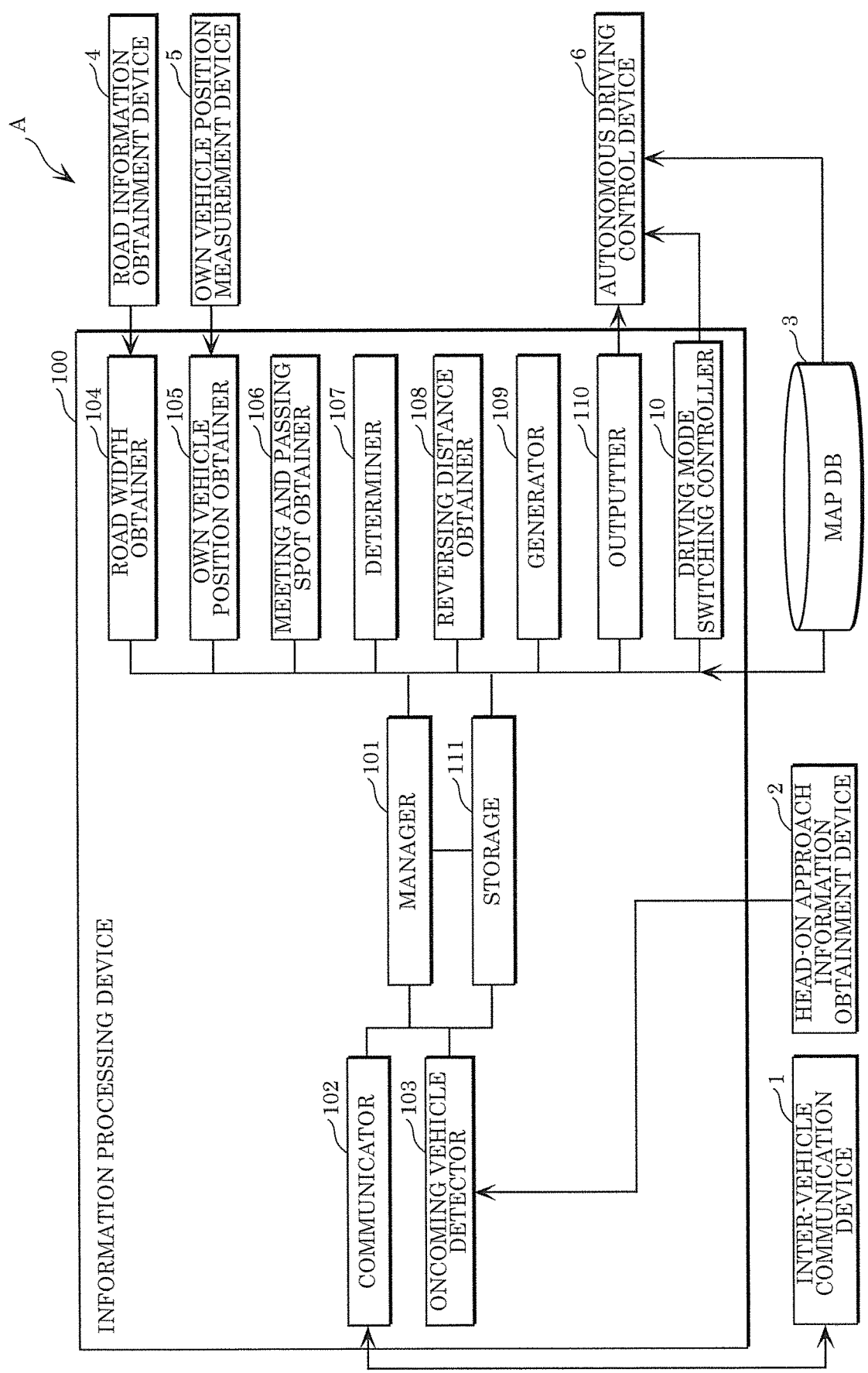
FIG. 26 is a block diagram illustrating one example of a functional configuration of a vehicle including an information processing device according to Variation 1.

Information processing device 100 and peripheral elements thereof according to Variation 1 will be described. FIG. 26 is a block diagram illustrating one example of a functional configuration of vehicle A including information processing device 100 according to Variation 1. As illustrated in FIG. 26, vehicle A further includes driving mode switching controller 10.

Driving mode switching controller 10 switches the driving mode of vehicle A between an autonomous driving mode and a manual driving mode. Vehicle A autonomously travels in the autonomous driving mode, and vehicle A travels under the driving control of an occupant in the manual driving mode. Driving mode switching controller 10 checks with an occupant via an input-output device whether or not to switch the driving mode (1) in the event of a head-on approach or (2) when vehicle A approaching head-on another vehicle reverses. Examples of the input-output device include a touch panel display. Driving mode switching controller 10 switches the driving mode according to an inquiry response from the occupant.

Specifically, when the driving mode is the autonomous driving mode, driving mode switching controller 10 checks whether to switch the autonomous driving mode to the manual driving mode. For example, in the above case (1), a screen inquiring whether or not to switch the driving mode such as that illustrated in CASE 1 in FIG. 27 is displayed on the display. Alternatively, after the reversing distances are compared, a screen including the result of comparison between the reversing distances such as that illustrated in CASE 2 in FIG. 27 is displayed on the display. In the above case (2), a screen including a message indicating that the own vehicle, that is, vehicle A, will reverse such as that illustrated in CASE 3 in FIG. 27 is displayed on the display. When there is a reply indicating switching to the manual driving mode, driving mode switching controller 10 switches the autonomous driving mode to the manual driving mode. At the time of switching of the driving mode, the occupant may be notified that the driving mode will be switched or has been switched.

Operations of Information Processing Device

Figure 28:
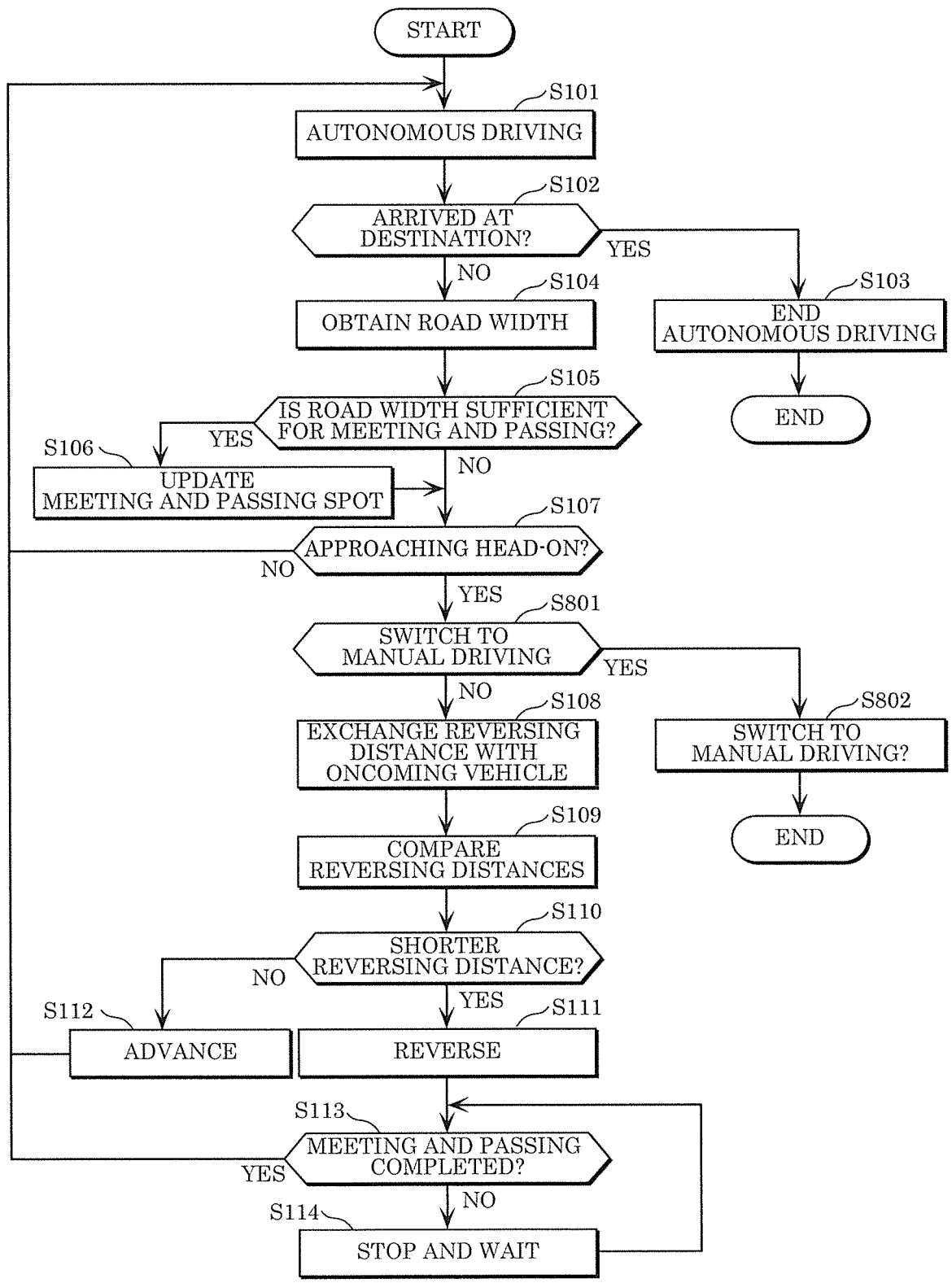
FIG. 28 is a flowchart illustrating one example of a flow of operations of an information processing device according to Variation 1.

Operations of information processing device 100 according to Variation 1 will be described with reference to FIG. 28. FIG. 28 is a flowchart illustrating one example of a flow of the operations of information processing device 100 according to Variation 1. Note that only differences from the above-described embodiments will be described.

In the above case (1), when the head-on approach is determined in Step S107, driving mode switching controller 10 determines, in Step S801, whether or not to switch the autonomous driving mode to the manual driving mode. For example, driving mode switching controller 10 checks with the occupant via the input-output device whether or not to switch the autonomous driving mode to the manual driving mode. When a reply indicating switching is obtained, driving mode switching controller 10 determines that the autonomous driving mode is switched to the manual driving mode.

When it is determined in Step S801 that the autonomous driving mode is switched to the manual driving mode, driving mode switching controller 10 switches the autonomous driving mode to the manual driving mode in Step S802. Thereafter, the manual driving mode is maintained until switching to the autonomous driving mode is instructed. Note that when it is determined in Step S801 that the autonomous driving mode is not switched to the manual driving mode, the processing proceeds to Step S108.

Alternatively, in the case where the inquiry is made after the reversing distances are compared, the processing proceeds to Step S801 after Step S109.

Specifically, in the above case (2), when the reversing distance is determined as being less than that of the oncoming vehicle in Step S110, the processing proceeds to Step S801. Note that when it is determined in Step S801 that the autonomous driving mode is not switched to the manual driving mode, the processing proceeds to Step S111.

Variation 2

Figure 29:
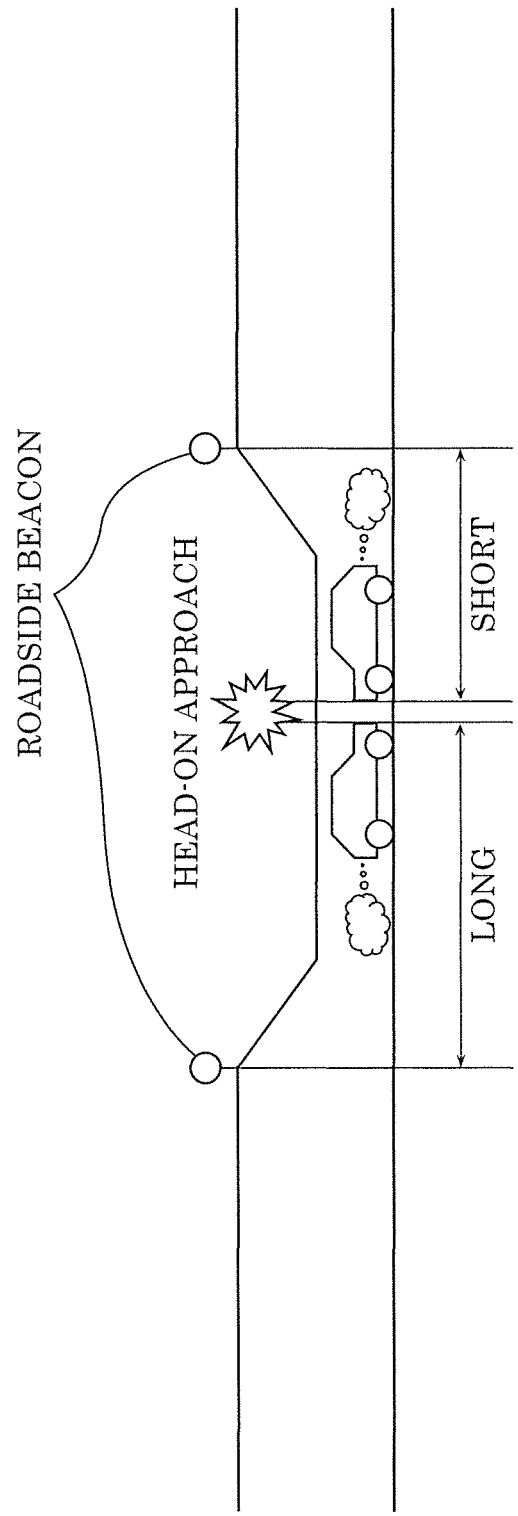
FIG. 29 is a schematic diagram illustrating one example of a beacon according to Variation 2.

Information processing device 100 according to Variation 2 will be described. In the above-described embodiments, road width obtainer 104 obtains the road width and meeting and passing spot obtainer 106 determines, using the obtained road width, whether or not the current position is a meeting and passing spot, but, in Variation 2, a beacon signal is received from an exteriorly installed beacon or the like, and meeting and passing spot obtainer 106 determines, according to the received beacon signal, whether or not the current position is a meeting and passing spot. For example, as illustrated in FIG. 29, a beacon is installed on the roadside at each of the start and end points of a section in which meeting and passing are difficult. A vehicle receives the beacon signal from the beacon, thereby detecting entry into the section in which meeting and passing are difficult. In the event of a head-on approach between vehicles, processes such as those described in the above embodiments are performed; one of the vehicles reverses, and the other vehicle advances. Thus, the vehicles can meet and pass. The following description will focus on differences from the above-described embodiments.

Configuration of Information Processing Device

Figure 30:
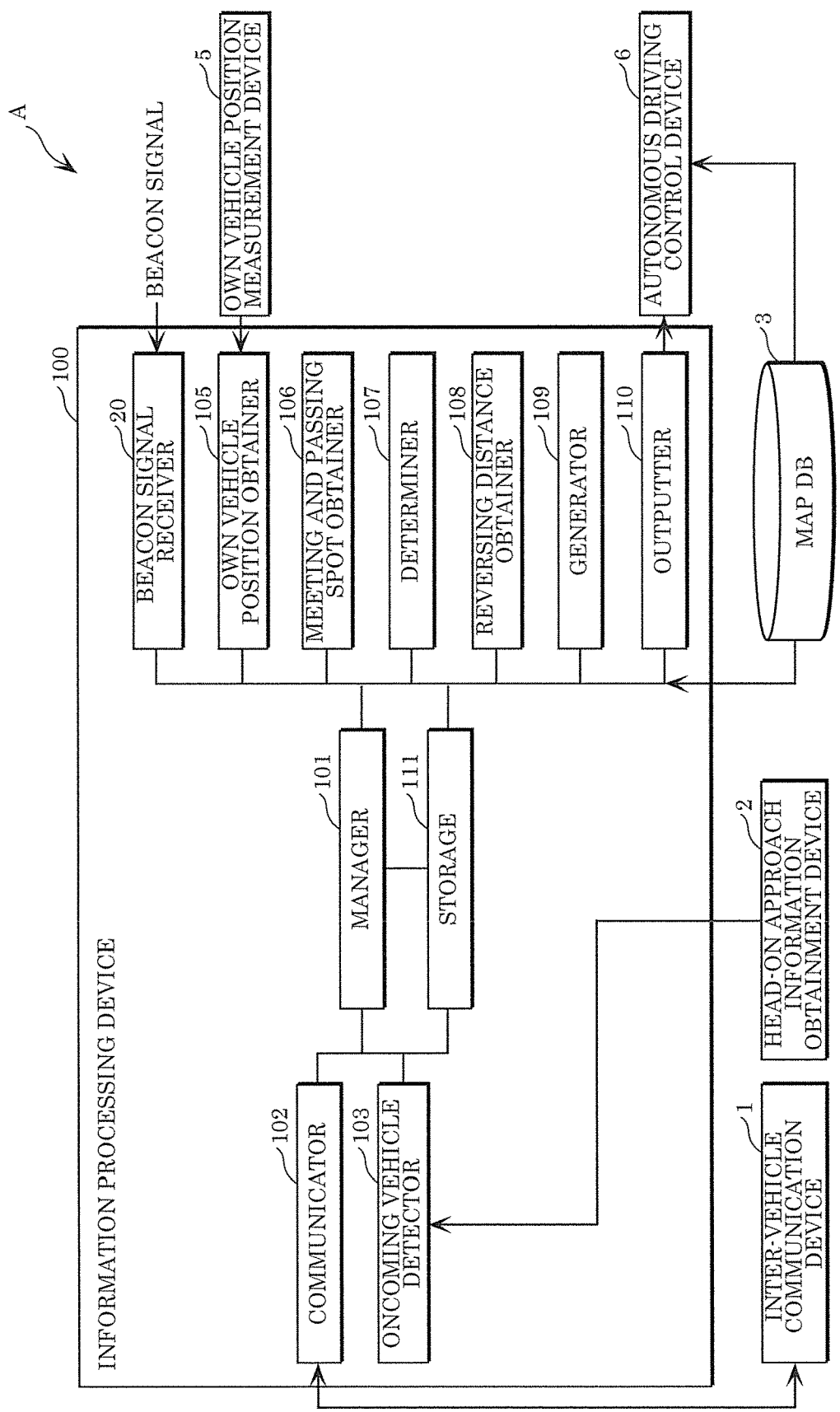
FIG. 30 is a block diagram illustrating one example of a functional configuration of a vehicle including an information processing device according to Variation 2.

Information processing device 100 and peripheral elements thereof according to Variation 2 will be described. FIG. 30 is a block diagram illustrating one example of a functional configuration of vehicle A including information processing device 100 according to Variation 2. As illustrated in FIG. 30, vehicle A includes beacon signal receiver 20 instead of road width obtainer 104.

Beacon signal receiver 20 receives a beacon signal transmitted from a beacon installed on a roadside or the like. The beacon signal transmitted from the beacon includes information indicating a meeting and passing spot or a spot at which meeting and passing are difficult.

Meeting and passing spot obtainer 106 determines a meeting and passing spot on the basis of reception of the beacon signal by the beacon signal receiver. For example, in the case where the beacon is installed only on a spot at which meeting and passing are difficult, when the beacon signal from the beacon is received, meeting and passing spot obtainer 106 determines, as the spot at which meeting and passing are difficult, a spot at which the beacon signal is received. Note that in the case where the beacon signal indicates a meeting and passing spot or a spot at which meeting and passing are difficult, meeting and passing spot obtainer 106 determines which of the spots the beacon signal indicates. For example, when the received beacon signal indicates a meeting and passing spot, the spot at which the beacon signal is received is determined as the meeting and passing spot. When the received beacon signal indicates a spot at which meeting and passing are difficult, the spot at which the beacon signal is received is determined as the spot at which meeting and passing are difficult.

Operations of Information Processing Device

Figure 31:
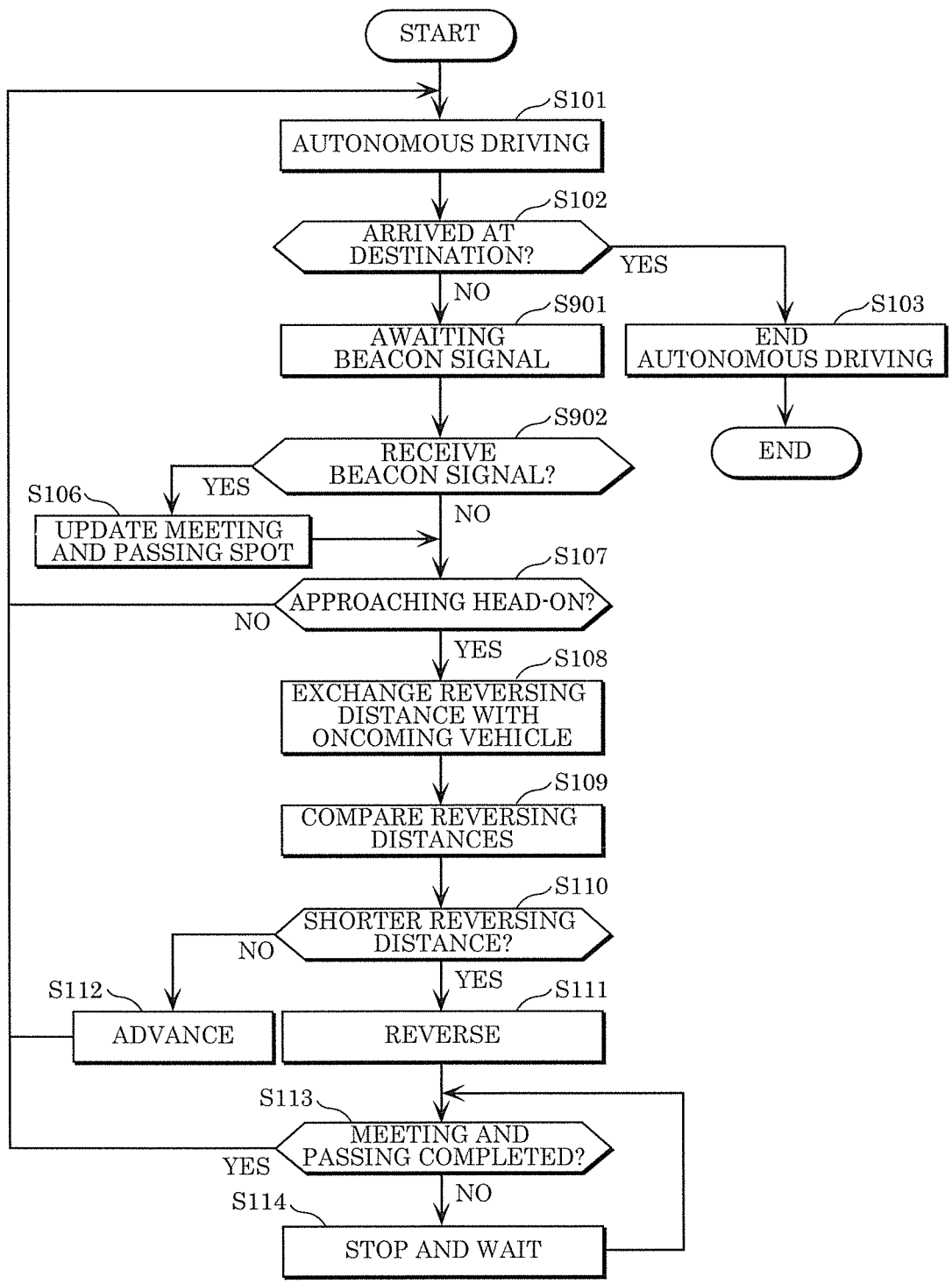
FIG. 31 is a flowchart illustrating one example of a flow of operations of an information processing device according to Variation 2.

Operations of information processing device 100 according to Variation 2 will be described with reference to FIG. 31. FIG. 31 is a flowchart illustrating one example of a flow of the operations of information processing device 100 according to Variation 2. Note that only differences from the above-described embodiments will be described.

When the arrival at the destination is not determined in Step S102, beacon signal receiver 20 awaits beacon signal reception in Step S901.

In Step S902, meeting and passing spot obtainer 106 determines whether the beacon signal has been received. For example, meeting and passing spot obtainer 106 determines whether beacon signal receiver 20 has received a beacon signal from a beacon installed at each of the start and end points of a section in which meeting and passing are difficult. When it is determined that the beacon signal has been received, the processing proceeds to Step S106. When it is not determined that the beacon signal has been received, the processing proceeds to Step S107.

Other Variations

Although the information processing devices, etc., according to one or more aspects have been described based on the embodiments, the present disclosure is not limited to these embodiments. Forms obtained by various modifications to the present embodiments that can be conceived by a person of skill in the art as well as forms obtained by combining structural elements in different embodiments which are within the scope of the essence of the present disclosure may be included in one or more aspects.

For example, the information processing device according to an embodiment may constitute a device or system that includes at least one of inter-vehicle communication device 1, head-on approach information obtainment device 2, map database 3, road information obtainment device 4, own vehicle position measurement device 5, autonomous driving control device 6, and the like.

Furthermore, as described above, that the techniques disclosed herein may be implemented using a system, a device, a method, an integrated circuit, a computer program, or a computer-readable recording medium such as a recording disc, or any combination of systems, devices, methods, integrated circuits, computer programs, or recording media. The computer-readable recording medium includes, for example, a nonvolatile recording medium such as a compact disc read-only memory (CD-ROM).

For example, each of the processors included in the above embodiments may be typically implemented as large-scale integration (LSI) which is an integrated circuit. These may be integrated into individual chips, or a portion or all of the processors may be integrated into one chip.

Moreover, the method of circuit integration is not limited to the LSI; the circuit integration may be implemented as a dedicated circuit or a general purpose processor. A field programmable gate array (FPGA) that can be programmed after manufacturing the LSI or a reconfigurable processor that allows reconfiguration of the connection or configuration of the inner circuit cells of the LSI can be used for the same purpose.

Note that in each of the above embodiments, each structural element may be configured from dedicated hardware, or may be realized by executing a software program appropriate for the structural element. Each structural element may be realized as a result of a program executor of a processor such as a CPU reading and executing a software program stored in a recording medium such as a hard disk or semiconductor memory.

Furthermore, a portion or all of the above-described structural elements may each be configured from a detachable integrated circuit (IC) card or a stand-alone module. The IC card and the module are computer systems configured from a microprocessor, ROM, and RAM, for example. The IC card and the module may include the above-described LSI or system LSI. The IC card and the module achieve their functions as a result of the microprocessor operating according to a computer program. The IC card and the module may be tamperproof.

The information processing method according to the present disclosure may be implemented using processors such as a micro processing unit (MPU) and a CPU, a circuit such as LSI, an IC card or a stand-alone module, etc.

In addition, the techniques disclosed herein may be implemented as a software program or digital signals of a software program or may be a non-transitory computer-readable recording medium on which such program is recorded. Furthermore, it should be obvious that the program can also be distributed via a transmission medium such as the Internet.

Furthermore, all the numerical figures used above such as an ordinal number and the number or amount are given as examples for describing the technique in the present disclosure in specific terms, and thus the present disclosure is not limited by such illustrative numerical figures. Moreover, the connection relationship between the structural elements is provided as an example for describing the technique in the present disclosure in specific terms, and the connection relationship for implementing the functions in the present disclosure is not limited to this.

Furthermore, the partitioning of function blocks in the block diagrams is one example; multiple function blocks may be integrated into a single function block, a single function block may be divided into two or more blocks, and part of a function may be transferred to another function block. In addition, the functions of two or more function blocks having similar functions may be processed by a single hardware or software through parallel processing or time division.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The techniques disclosed herein are useful in vehicles that perform inter-vehicle communication.

What is claimed is:

1. An information processing device provided in a first vehicle, the information processing device being configured to:
   detect a head-on approach of a second vehicle relative to the first vehicle;
   determine whether a meeting point for the first vehicle and the second vehicle is not in a first section but is instead located on a travel path after the first section in a direction of travel of the first vehicle, where road width prevents the first and second vehicles from passing each other, the first section being a section extending in the direction of travel of the first vehicle on a travel path of the first vehicle, including a position before the meeting point in the direction of travel of the first vehicle, and being wide enough for vehicles to pass each other;
   when the meeting point is determined as not being in the first section,
      calculate a first distance which is a distance between the first section and the meeting point and which is a distance on the travel path of the first vehicle in the direction of travel of the first vehicle,
      transmit the first distance to the second vehicle, and
      receive, from the second vehicle, a second distance which is a distance between the meeting point and a second section and which is a distance on a travel path of the second vehicle in a direction of travel of the second vehicle, the second section being a section extending in the direction of travel of the second vehicle on the travel path of the second vehicle, including a position before the meeting point in the direction of travel of the second vehicle, and being wide enough for vehicles to pass each other;
   compare the first distance and the second distance;
   generate, according to a comparison result, travel control information for causing the first vehicle to advance or reverse; and
   output the travel control information to a travel controller of the first vehicle.

2. The information processing device according to claim 1, wherein
the information processing device calculates the number of vehicles following the first vehicle using information obtained from the vehicles following the first vehicle,
communicates with the vehicles following the first vehicle,
obtains the information from the vehicles following the first vehicle,
transmits, to the second vehicle, the number of the vehicles following the first vehicle,
receives, from the second vehicle, the number of vehicles following the second vehicle,
performs comparison based on the first distance, the number of the vehicles following the first vehicle, the second distance, and the number of the vehicles following the second vehicle, and
generates the travel control information according to a comparison result.

3. The information processing device according to claim 2, wherein
the information processing device compares, as the comparison based on the first distance, the number of the vehicles following the first vehicle, the second distance, and the number of the vehicles following the second vehicle, a product of the first distance and the number of the vehicles following the first vehicle and a product of the second distance and the number of the vehicles following the second vehicle, and
generates the travel control information according to a comparison result.

4. The information processing device according to claim 2, wherein
the information processing device calculates a third distance between the first section and each of the vehicles following the first vehicle using the information obtained from the vehicles following the first vehicle,
transmits the third distance to the second vehicle,
receives, from the second vehicle, a fourth distance between the second section and each of the vehicles following the second vehicle,
compares a sum of the first distance and the third distance and a sum of the second distance and the fourth distance, and
generates the travel control information according to a comparison result.

5. The information processing device according to claim 1, wherein
the information processing device detects a head-on approach of the second vehicle relative to the first vehicle that occurs after a predetermined time,
the meeting point includes a meeting point after the predetermined time, and
the information processing device calculates a fifth distance between the first vehicle and an end point of the first section,
when the meeting point is determined as not being in the first section
transmits the fifth distance to the second vehicle, and
receives, from the second vehicle, a sixth distance between the second vehicle and an end point of the second section, on the travel path of the second vehicle and before the meeting point in the direction of travel of the second vehicle, which is wide enough for vehicles to pass each other,
compares the fifth distance and the sixth distance, and
generates, according to a comparison result, travel control information for causing the first vehicle to advance or stop.

6. The information processing device according to claim 1, further configured to:
control information presentation to at least the second vehicle, wherein
when communication with the second vehicle fails, the information processing device causes a presentation device to present information corresponding to the travel control information.

7. The information processing device according to claim 1, wherein
the information processing device calculates a first section length which is a length of the first section,
when the meeting point is determined as not being in the first section,
transmits the first section length to the second vehicle, and
receives, from the second vehicle, a second section length which is a length of the second section, on the travel path of the second vehicle and before the meeting point in the direction of travel of the second vehicle, which is wide enough for vehicles to pass each other,
compares the first section length and the second section length, and
generates, according to a comparison result, travel control information for causing the first vehicle to advance or reverse.

8. An information processing device provided in a first vehicle, the information processing device being configured to:
detect a head-on approach of a second vehicle relative to the first vehicle;
calculate the number of vehicles following the first vehicle using information obtained from the vehicles following the first vehicle;
communicate with the second vehicle and the vehicles following the first vehicle;
determine whether a meeting point for the first vehicle and the second vehicle is not in a first section but is instead located on a travel path after the first section in a direction of travel of the first vehicle, where road width prevents the first and second vehicles from passing each other, the first section being a section extending in the direction of travel of the first vehicle on a travel path of the first vehicle, including a position before the meeting point in the direction of travel of the first vehicle, and being wide enough for vehicles to pass each other;
when the meeting point is determined as not being in the first section,
communicate with the vehicles following the first vehicle,
obtain the information from the vehicles following the first vehicle,
transmit, to the second vehicle, the number of the vehicles following the first vehicle, and
receive, from the second vehicle, the number of vehicles following the second vehicle;
compare the number of the vehicles following the first vehicle and the number of the vehicles following the second vehicle;
generate, according to a comparison result, travel control information for causing the first vehicle to advance or reverse; and output the travel control information to a travel controller of the first vehicle.

9. The information processing device according to claim 8, wherein
the information processing device calculates a first distance which is a distance between the first section and the meeting point and which is a distance on the travel path of the first vehicle in the direction of travel of the first vehicle,
when the comparison result indicates that the number of the vehicles following the first vehicle and the number of the vehicles following the second vehicle are equal, transmits the first distance to the second vehicle, and
receives, from the second vehicle, a second distance which is a distance between the meeting point and the second section and which is a distance on a travel path of the second vehicle in a direction of travel of the second vehicle, the second section being a section extending in the direction of travel of the second vehicle on the travel path of the second vehicle including a position before the meeting point in the direction of travel of the second vehicle, and being wide enough for vehicles to pass each other,
compares the first distance and the second distance, and
generates, according to a comparison result, travel control information for causing the first vehicle to advance or reverse.

10. A non-transitory computer-readable recording medium having a program stored therein for causing a computer to:
detect a head-on approach of a second vehicle relative to a first vehicle;
determine whether a meeting point for the first vehicle and the second vehicle is not in a first section but is instead located on a travel path after the first section in a direction of travel of the first vehicle, where road width prevents the first and second vehicles from passing each other, the first section being a section extending in the direction of travel of the first vehicle on a travel path of the first vehicle, including a position before the meeting point in the direction of travel of the first vehicle, and being wide enough for vehicles to pass each other;
when the meeting point is not in the first section,
calculate a first distance which is a distance between the first section and the meeting point and which is a distance on the travel path of the first vehicle in the direction of travel of the first vehicle,
output the first distance to the second vehicle, and
obtain, from the second vehicle, a second distance which is a distance between the meeting point and a second section and which is a distance on a travel path of the second vehicle in a direction of travel of the second vehicle, the second section being a section extending in the direction of travel of the second vehicle on the travel path of the second vehicle, including a position before the meeting point in the direction of travel of the second vehicle, and being wide enough for vehicles to pass each other;
compare the first distance and the second distance;
generate, according to a comparison result, travel control information for causing the first vehicle to advance or reverse; and
output the travel control information to a travel controller of the first vehicle.

11. A non-transitory computer-readable recording medium having a program stored therein for causing a computer to:
detect a head-on approach of a second vehicle relative to a first vehicle;
determine whether a meeting point for the first vehicle and the second vehicle is not in a first section but is instead located on a travel path after the first section in a direction of travel of the first vehicle, where road width prevents the first and second vehicles from passing each other, the first section being a section extending in the direction of travel of the first vehicle on a travel path of the first vehicle, including a position before the meeting point in the direction of travel of the first vehicle, and being wide enough for vehicles to pass each other;
when the meeting point is not in the first section,
obtain, from vehicles following the first vehicle, information of the vehicles following the first vehicle,
calculate, using the information, the number of the vehicles following the first vehicle,
output, to the second vehicle, the number of the vehicles following the first vehicle, and
obtain, from the second vehicle, the number of vehicles following the second vehicle;
compare the number of the vehicles following the first vehicle and the number of the vehicles following the second vehicle;
generate, according to a comparison result, travel control information for causing the first vehicle to advance or reverse; and
output the travel control information to a travel controller of the first vehicle.

* * * * *